(12) United States Patent
Yoshida et al.

(10) Patent No.: US 10,351,964 B2
(45) Date of Patent: Jul. 16, 2019

(54) ARTIFICIAL PHOTOSYNTHESIS MODULE

(71) Applicants: FUJIFILM Corporation, Tokyo (JP); Japan Technological Research Association of Artificial Photosynthetic Chemical Process, Tokyo (JP)

(72) Inventors: Satoshi Yoshida, Ashigara-kami-gun (JP); Hiroshi Nagate, Ashigara-kami-gun (JP)

(73) Assignees: FUJIFILM Corporation, Tokyo (JP); JAPAN TECHNOLOGICAL RESEARCH ASSOCIATION OF ARTIFICIAL PHOTOSYNTHETIC CHEMICAL PROCESS, Tokyo (JP)

( * ) Notice: Subject to any disclaimer, the term of this patent is extended or adjusted under 35 U.S.C. 154(b) by 0 days.

(21) Appl. No.: 15/976,046

(22) Filed: May 10, 2018

(65) Prior Publication Data

US 2018/0258542 A1 Sep. 13, 2018

Related U.S. Application Data

(63) Continuation of application No. PCT/JP2016/083711, filed on Nov. 14, 2016.

(30) Foreign Application Priority Data

Nov. 30, 2015 (JP) ................... 2015-233014
Apr. 22, 2016 (JP) ................... 2016-085980
Apr. 22, 2016 (JP) ................... 2016-086028

(51) Int. Cl.
*C25B 11/02* (2006.01)
*C25B 1/10* (2006.01)
(Continued)

(52) U.S. Cl.
CPC ............. *C25B 11/02* (2013.01); *C25B 1/003* (2013.01); *C25B 1/10* (2013.01); *C25B 9/08* (2013.01);
(Continued)

(58) Field of Classification Search
CPC .. C25B 1/003; C25B 1/10; C25B 9/08; C25B 11/02; C25B 11/0405; C25B 9/18; Y02E 60/366
See application file for complete search history.

(56) References Cited

U.S. PATENT DOCUMENTS

2012/0080310 A1  4/2012  Nomura et al.
2012/0168318 A1*  7/2012  Ueno .................. C25B 1/003
                                                        205/340

(Continued)

FOREIGN PATENT DOCUMENTS

JP  2004-256378 A  9/2004
JP  2005-171383 A  6/2005

(Continued)

OTHER PUBLICATIONS

International Search Report (PCT/ISA/210) issued in PCT/JP2016/083711, dated Dec. 6, 2016.

(Continued)

*Primary Examiner* — Ciel P Thomas
(74) *Attorney, Agent, or Firm* — Birch, Stewart, Kolasch & Birch, LLP

(57) ABSTRACT

In an artificial photosynthesis module, a plurality of first electrode portions of a hydrogen generation electrode are disposed side by side with a gap, and each of a plurality of second electrode portions of an oxygen generation electrode is disposed at a gap between the first electrode portions of the hydrogen generation electrode as seen from the hydrogen generation electrode side with respect to the diaphragm.

(Continued)

A first photocatalyst layer of at least one first electrode portion of the hydrogen generation electrode or a second photocatalyst layer of at least one of the second electrode portions of the oxygen generation electrode is tilted with respect to a flow direction of an electrolytic aqueous solution, or a projecting part is provided on a surface of the first photocatalyst layer of at least one first electrode portion of the hydrogen generation electrode or a surface of the second photocatalyst layer of at least one second electrode portion of the oxygen generation electrode.

24 Claims, 14 Drawing Sheets

(51) Int. Cl.
    *C25B 9/08*     (2006.01)
    *C25B 11/04*     (2006.01)
    *C25B 9/18*     (2006.01)
    *C25B 1/00*     (2006.01)

(52) U.S. Cl.
    CPC ............ *C25B 9/18* (2013.01); *C25B 11/0405* (2013.01); *Y02E 60/366* (2013.01)

(56) References Cited

U.S. PATENT DOCUMENTS

| | | | |
|---|---|---|---|
| 2012/0313073 A1* | 12/2012 | McKone | C25D 3/12 257/10 |
| 2014/0318978 A1* | 10/2014 | Esposito | C25B 11/04 205/340 |
| 2016/0281242 A1 | 9/2016 | Sato et al. | |
| 2016/0281244 A1 | 9/2016 | Sato et al. | |

FOREIGN PATENT DOCUMENTS

| | | |
|---|---|---|
| JP | 2006-213932 A | 8/2006 |
| JP | 2013-253269 A | 12/2013 |
| WO | WO 2010/140353 A1 | 12/2010 |
| WO | WO 2015/087682 A1 | 6/2015 |
| WO | WO 2015/087691 A1 | 6/2015 |

OTHER PUBLICATIONS

Written Opinion of the International Searching Authority (PCT/ISA/237) issued in PCT/JP2016/083711, dated Dec. 6, 2016.

* cited by examiner

ARTIFICIAL PHOTOSYNTHESIS MODULE

CROSS-REFERENCE TO RELATED APPLICATIONS

This application is a Continuation of PCT International Application No. PCT/JP2016/083711 filed on Nov. 14, 2016, which claims priority under 35 U.S.C. § 119(a) to Japanese Patent Application No. 2015-233014 filed on Nov. 30, 2015, Japanese Patent Application No. 2016-085980 filed on Apr. 22, 2016 and Japanese Patent Application No. 2016-086028 filed on Apr. 22, 2016. Each of the above applications is hereby expressly incorporated by reference, in its entirety, into the present application.

BACKGROUND OF THE INVENTION

1. Field of the Invention

The present invention relates to an artificial photosynthesis module that decomposes an electrolytic aqueous solution into hydrogen and oxygen with light, and particularly, to an artificial photosynthesis module having electrodes in which a photocatalyst layer of an electrode portion is tilted with respect to a direction in which an electrolytic aqueous solution flows.

2. Description of the Related Art

Hydrogen generating devices that electrolyze water to generate hydrogen, with the electricity generated using fossil fuels, have been suggested in the past. Meanwhile, clean energy for not depending on fossil fuels and fossil resources is required from viewpoints of the current environmental destruction on a global basis, permanent energy problems, and the like.

Artificial photosynthesis has been learned from plant photosynthesis and is attracting much attention as a method of obtaining energy and resources with inexhaustible solar light, water, and carbon dioxide gas, without depending on fossil resources.

Devices that decompose an electrolytic aqueous solution to generate oxygen and hydrogen have been suggested in the past as one of the forms using solar light energy that is renewable energy.

For example, JP2004-256378A describes a method for producing oxygen and hydrogen from water in which an electrode, which oxidizes a reductant of the redox medium to change the reductant into an oxidant of the redox medium, is installed in an aqueous solution of a photocatalysis tank including a photocatalyst and the oxidant of the redox medium, and the reductant of the generated redox medium is electrolyzed, and oxidized to change the reductant into the oxidant of the redox medium. An electrode that oxidizes the reductant of the redox medium to change the reductant into the oxidant of the redox medium includes a comb-type electrode.

A carbon dioxide reduction device of JP2013-253269A includes a photoelectric conversion layer having a light-receiving face and a back surface, an electrolytic solution tank, first and second electrolyzing electrodes provided with the electrolytic solution being interposed therebetween in the electrolytic solution tank, and a $CO_2$ supply unit that supplies carbon dioxide into the electrolytic solution tank. The photoelectric conversion layer and the first and second electrolyzing electrodes are connected together such that a photoelectromotive force of the photoelectric conversion layer is output to the first and second electrolyzing electrodes. The first electrolyzing electrode has a carbon dioxide reducing catalyst. The second electrolyzing electrode has an oxygen generating catalyst. The first and second electrolyzing electrodes are provided such that air bubbles are movable between the first and second electrolyzing electrodes. Additionally, the first and second electrolyzing electrodes have a comb-type structure having a trunk part and a plurality of branch parts extending from the trunk part, respectively. A branch part of the first electrolyzing electrode is disposed between two branch parts of the second electrolyzing electrode. A branch part of the second electrolyzing electrode is disposed between two branch parts of the first electrolyzing electrode.

In addition to these, a hydrogen-oxygen gas generating electrode is suggested in JP2005-171383A as a device that decomposes an electrolytic aqueous solution to produce oxygen and hydrogen. A hydrogen-oxygen gas generating electrode of JP2005-171383A includes an anode group consisting of a plurality of anode plates that are separated from each other and are lined up in parallel, and a cathode group consisting of a plurality of cathode plates that face the plurality of anode plates, respectively. A gap that introduces water is secured between the anode group and the cathode group. A pair of anode segments is formed by folding back an anode plate in a substantial U-shape, a pair of cathode segment is formed by folding back a cathode plate in a substantial U-shape type, and the pair of anode segments and the pair of cathode segments are alternately inserted therebetween. In JP2005-171383A, a power source is connected to the anode group and the cathode group, respectively, and the water introduced into the gap is electrolyzed by applying positive and negative electric charges to the anode group and the cathode group, respectively.

WO2010/140353A describes photoelectrochemical cell including a first electrode that includes a conductive substrate and an optical semiconductor layer disposed on the conductive substrate, a second electrode that is disposed to face a face of the first electrode on the conductive substrate side and is electrically connected to the conductive substrate, an electrolytic solution that is in contact with a surface of the optical semiconductor layer and a surface of the second electrode and includes water, a container that accommodates the first electrode, the second electrode, and the electrolytic solution, a supply port for supplying water to the inside of the container, and an ion passage part that allows ions to move between the electrolytic solution in a first region on the surface side of the optical semiconductor layer and the electrolytic solution in a second region of the first electrode opposite to the first region. As the optical semiconductor layer is irradiated with light, the photoelectrochemical cell decomposes the water in the electrolytic solution to generate hydrogen.

JP2006-213932A describes an electrolytic bath having a membrane-electrode structure in which membrane-like electrodes for generating electrolyzed water are formed on both surfaces of an ion-permeable membrane. In JP2006-213932A, electrolyzation is performed by supplying pure water to a cathode side and an anode side and applying a voltage to between the electrodes for generating electrolyzed water, thereby generating hydrogen from the cathode side and generating oxygen from the anode side.

Additionally, JP2006-213932A describes that the electrodes for generating electrolyzed water have a mesh shape or a comb shape. JP2006-213932A describes that, in a case where the electrodes for generating electrolyzed water are formed in the comb shape, the electrodes may be provided at positions that overlap each other.

SUMMARY OF THE INVENTION

As described above, in JP2004-256378A, the comb-type electrode is used, but the comb-type electrode is only one electrode and the distance thereof from a counter electrode is far. Therefore, there is a problem that the efficiency of electrolysis is bad.

Although an electrode of the comb-type structure is shown in JP2013-253269A, the first and second electrolyzing electrodes are provided on a back surface side of the photoelectric conversion layer, and a configuration in which the electrodes are irradiated with light is not provided. Additionally, in JP2005-171383A, the power source is required for the electrolysis of water, the surfaces of the anode group and the cathode group have flat surfaces, and the surfaces are disposed parallel to a direction in which the electrolytic solution flows. For this reason, there is a problem that water stagnates on the surfaces and the efficiency of the electrolysis decreases.

Additionally, the first electrode and the second electrode of WO2010/140353A have the flat the surfaces, and the surfaces are disposed parallel to the direction in which the electrolytic solution flows. For this reason, there is a problem that the electrolytic solution stagnates on the surfaces and the efficiency of the electrolysis decreases.

Additionally, in JP2006-213932A, the electrodes for generating electrolyzed water are formed in the mesh shape or the comb shape. However, the form of the electrodes for generating electrolyzed water with respect to the flow of the pure water to be supplied is not considered at all. For this reason, there is a problem that the pure water to be supplied stagnates in the electrodes for generating electrolyzed water and the efficiency of the electrolysis decreases. Additionally, in JP2006-213932A, there is a problem that a power source for applying a voltage is required between the electrodes for generating electrolyzed water.

An object of the invention is to solve the problems based on the aforementioned related art and provide an artificial photosynthesis module having excellent energy conversion efficiency.

In order to achieve the above object, a first aspect of the invention is an artificial photosynthesis module comprising a hydrogen generation electrode that includes a first base material and a first photocatalyst layer and has a plurality of first electrode portions electrically connected to each other; an oxygen generation electrode that includes a second base material and a second photocatalyst layer and has a plurality of second electrode portions electrically connected to each other; and a diaphragm provided between the hydrogen generation electrode and the oxygen generation electrode. The hydrogen generation electrode and the oxygen generation electrode being electrically connected to each other. The oxygen generation electrode is present opposite to the hydrogen generation electrode across the diaphragm. The plurality of first electrode portions of the hydrogen generation electrode are disposed side by side with a gap. Each of the plurality of second electrode portions of the oxygen generation electrode is disposed at the gap between the first electrode portions of the hydrogen generation electrode as seen from the hydrogen generation electrode side with respect to the diaphragm. The first photocatalyst layer of at least one of the first electrode portions of the hydrogen generation electrode or the second photocatalyst layer of at least one of the second electrode portions of the oxygen generation electrode is tilted with respect to a flow direction of an electrolytic aqueous solution, or a projecting part is provided on a surface of the first photocatalyst layer of at least one of the first electrode portions of the hydrogen generation electrode or a surface of the second photocatalyst layer of at least one of the second electrode portions of the oxygen generation electrode.

Additionally, it is preferable that a tilt angle of the photocatalyst layer of at least one electrode portion of the hydrogen generation electrode or the oxygen generation electrode is 5° or more and 45° or less with respect to the flow direction of the electrolytic aqueous solution.

Additionally, it is preferable that the photocatalyst layer of 50% or more electrode portions among all the electrode portions of the hydrogen generation electrode or the oxygen generation electrode is tilted with respect to the flow direction of the electrolytic aqueous solution.

Additionally, it is preferable that, in a case where a length of a side, in the flow direction of the electrolytic aqueous solution, of the first electrode portions and the second electrode portions is a width of the electrode portions, the width of the electrode portions is 10 μm to 10 mm.

It is preferable that a height of the projecting part from the surface on which the projecting part is provided is 0.1 mm or more and less than 1.0 mm.

Additionally, it is preferable that the projecting part has a periodic structure in which a height from the surface changes periodically with respect to the flow direction of the electrolytic aqueous solution, and a pitch of the periodic structure with respect to the flow direction of the electrolytic aqueous solution is 1.0 mm or more and less than 10 mm.

It is preferable that the projecting part has a face parallel to the flow direction of the electrolytic aqueous solution.

It is preferable that the projecting part has a tilted face tilted with respect to the flow direction of the electrolytic aqueous solution, and a tilt angle of the tilted face with respect to the flow direction of the electrolytic aqueous solution is 5° or more and 45° or less.

Additionally, a second aspect of the invention is an artificial photosynthesis module comprising a hydrogen generation electrode that includes a first base material and a first photocatalyst layer and has a plurality of first electrode portions electrically connected to each other; an oxygen generation electrode that includes a second base material and a second photocatalyst layer and has a plurality of second electrode portions electrically connected to each other; and a diaphragm provided between the hydrogen generation electrode and the oxygen generation electrode. The hydrogen generation electrode and the oxygen generation electrode being electrically connected to each other. The oxygen generation electrode is present opposite to the hydrogen generation electrode across the diaphragm. The plurality of first electrode portions of the hydrogen generation electrode are disposed side by side with a gap. Each of the plurality of second electrode portions of the oxygen generation electrode is disposed at the gap between the first electrode portions of the hydrogen generation electrode as seen from the hydrogen generation electrode side with respect to the diaphragm. The first photocatalyst layer of at least one of the first electrode portions of the hydrogen generation electrode or the second photocatalyst layer of at least one of the second electrode portions of the oxygen generation electrode is tilted with respect to a diaphragm, or a projecting part is provided on a surface of the first photocatalyst layer of at least one of the first electrode portions of the hydrogen generation electrode or a surface of the second photocatalyst layer of at least one of the second electrode portions of the oxygen generation electrode.

Additionally, it is preferable that a tilt angle of the photocatalyst layer of at least one electrode portion of the hydrogen generation electrode or the oxygen generation electrode is 5° or more and 45° or less with respect to the diaphragm.

Additionally, it is preferable that the photocatalyst layer of 50% or more electrode portions among all the electrode portions of the hydrogen generation electrode or the oxygen generation electrode is tilted with respect to the diaphragm.

Additionally, it is preferable that, in a case where a length of a side, in the flow direction of the electrolytic aqueous solution, of the first electrode portions and the second electrode portions is a width of the electrode portions, the width of the electrode portions is 10 μm to 10 mm.

It is preferable that a height of the projecting part from the surface on which the projecting part is provided is 0.1 mm or more and less than 1.0 mm.

Additionally, it is preferable that the projecting part has a periodic structure in which a height from the surface changes periodically with respect to the flow direction of the electrolytic aqueous solution, and a pitch of the periodic structure with respect to the flow direction of the electrolytic aqueous solution is 1.0 mm or more and less than 10 mm.

It is preferable that the projecting part has a face parallel to the flow direction of the electrolytic aqueous solution.

It is preferable that the projecting part has a tilted face tilted with respect to the flow direction of the electrolytic aqueous solution, and a tilt angle of the tilted face with respect to the flow direction of the electrolytic aqueous solution is 5° or more and 45° or less.

A third aspect of the invention is an artificial photosynthesis module comprising an oxygen generation electrode that decomposes an electrolytic aqueous solution with light to generate oxygen and a hydrogen generation electrode that decomposes the electrolytic aqueous solution with the light to generate hydrogen. The oxygen generation electrode has a first substrate that is a flat plate, a first conductive layer provided on the first substrate, and a first photocatalyst layer provided on the first conductive layer. The hydrogen generation electrode has a second substrate that is a flat plate, a second conductive layer provided on the second substrate, and a second photocatalyst layer provided on the second conductive layer. At least a portion of at least one surface of a first surface of the first photocatalyst layer of the oxygen generation electrode or a second surface of the second photocatalyst layer of the hydrogen generation electrode is tilted with respect to a flow direction of the electrolytic aqueous solution, or at least one projecting part that protrudes with respect to a conductive layer surface of a conductive layer is provided on the at least one surface.

It is preferable that a plurality of the projecting parts are provided with respect to the flow direction of the electrolytic aqueous solution.

It is preferable that a height of the projecting part from the surface on which the projecting part is provided is 0.1 mm or more and 5.0 mm or less.

It is preferable that the projecting part has a periodic structure in which a height from the surface changes periodically with respect to the flow direction of the electrolytic aqueous solution, and a pitch of the periodic structure with respect to the flow direction of the electrolytic aqueous solution is 1.0 mm or more and 20 mm or less.

Additionally, it is preferable that the projecting part has a face parallel to the flow direction of the electrolytic aqueous solution.

Additionally, it is preferable that the projecting part has a tilted face tilted with respect to the flow direction of the electrolytic aqueous solution, and a tilt angle of the tilted face with respect to the flow direction of the electrolytic aqueous solution is 5 or more and 45° or less.

It is preferable that the projecting part is provided within a range of 50% or more of the area of the surface on which the projecting part is provided.

It is preferable that an entire surface of at least one surface of a first surface of the first photocatalyst layer of the oxygen generation electrode or a second surface of the second photocatalyst layer of the hydrogen generation electrode is tilted with respect to the flow direction of the electrolytic aqueous solution.

It is preferable that an entire surface of at least one surface of a first surface of the first photocatalyst layer of the oxygen generation electrode or a second surface of the second photocatalyst layer of the hydrogen generation electrode is tilted with respect to the flow direction of the electrolytic aqueous solution, and a tilt angle with respect to the flow direction of the electrolytic aqueous solution is 5° or more and 45° or less.

It is preferable that the oxygen generation electrode and the hydrogen generation electrode are disposed in series in a traveling direction of the light.

It is preferable that the light is incident from the oxygen generation electrode side, and the first substrate of the oxygen generation electrode is transparent.

According to the invention, the artificial photosynthesis module having excellent energy conversion efficiency can be obtained.

DESCRIPTION OF THE PREFERRED EMBODIMENTS

Hereinafter, an artificial photosynthesis module of the invention will be described in detail with reference to preferred embodiments illustrated in the attached drawings.

In addition, in the following, "to" showing a numerical range includes numerical values described on both sides thereof. For example, $\varepsilon$ being a numerical value $\varepsilon 1$ to a numerical value $\varepsilon 2$ means that the range of $\varepsilon$ is a range including the numerical value $\varepsilon 1$ and the numerical value $\varepsilon 2$, and in a case where these are expressed by mathematical symbols, $\varepsilon 1 \leq \varepsilon \leq \varepsilon 2$ is satisfied.

Angles, such as "45°", "parallel", "perpendicular" and "orthogonal" includes error ranges that are generally allowed in the technical field for exact angles unless otherwise specified. Additionally, the "same" includes the error ranges that are generally allowed in the technical field.

Figure 1:
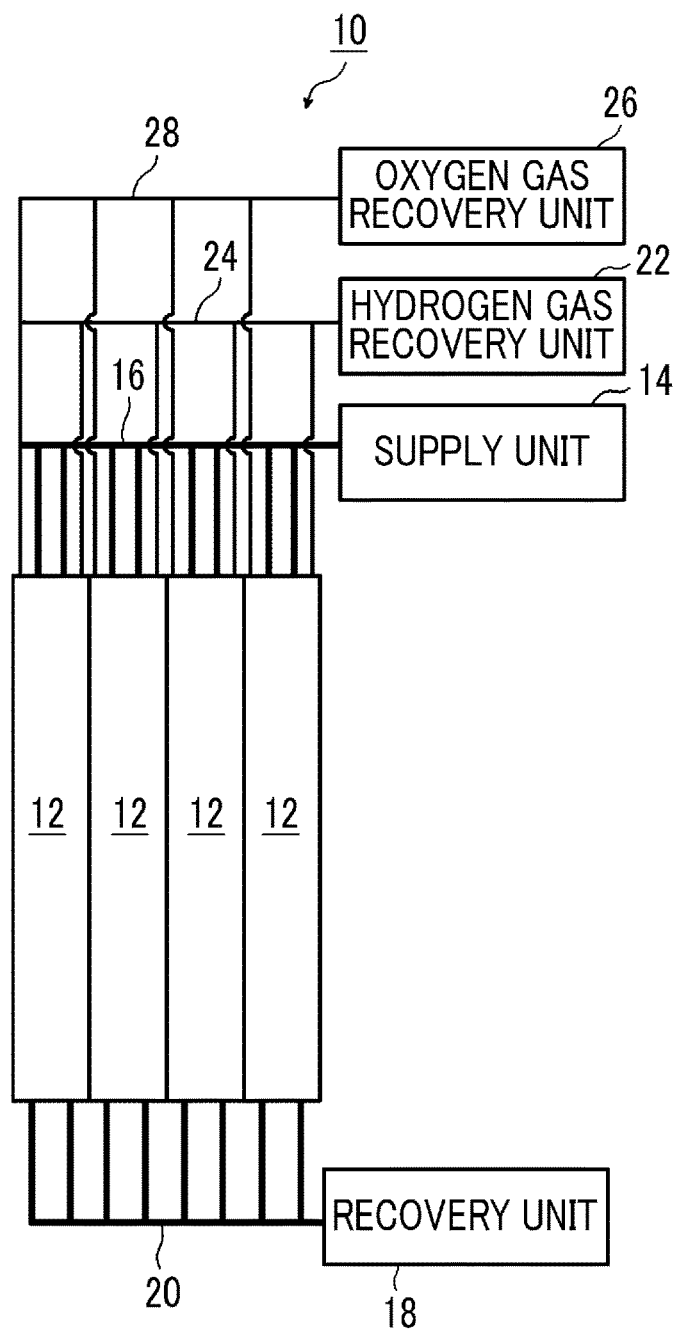
FIG. 1 is a schematic plan view illustrating a water electrolysis system having artificial photosynthesis modules of an embodiment of the invention.

FIG. 1 is a schematic plan view illustrating a water electrolysis system having artificial photosynthesis modules of an embodiment of the invention.

As illustrated in FIG. 1, the water electrolysis system 10 (hereinafter simply referred to a system 10) has, for example, a plurality of artificial photosynthesis modules 12. The artificial photosynthesis modules 12 extend the direction W, and are disposed side by side in a direction M orthogonal to the direction W. In addition, in the system 10, the number of artificial photosynthesis modules 12 is not particularly limited, and may be at least one.

The artificial photosynthesis modules 12 receive light, decompose water into hydrogen and oxygen, and generate hydrogen gas and oxygen gas. The artificial photosynthesis modules 12 will be described below in detail.

In addition, water also includes an electrolytic aqueous solution AQ. Here, the electrolytic aqueous solution AQ is, for example, a liquid having $H_2O$ as a main component, and may be distilled water, or may be an aqueous solution using water as a solvent and including a solute. The water may be, for example, an electrolytic solution that is an aqueous solution including an electrolyte or may be cooling water used in a cooling tower or the like. The electrolytic solution is, for example, an aqueous solution including an electrolyte, and for example, is strong alkali (KOH (potassium hydroxide)), an electrolytic solution including $H_2SO_4$, a sodium sulfate electrolytic solution, or the like.

The system 10 has a supply unit 14 for supplying the electrolytic aqueous solution AQ to the artificial photosynthesis modules 12, and a recovery unit 18 that recovers the electrolytic aqueous solution AQ discharged from the artificial photosynthesis modules 12.

Well-known water supply devices, such as a pump, are available for the supply unit 14, and well-known water recovery devices, such as a tank, are available for the recovery unit 18.

The supply unit 14 is connected to the artificial photosynthesis modules 12 via a supply pipe 16, and the recovery unit 18 is connected to the artificial photosynthesis modules 12 via a recovery pipe 20. The electrolytic aqueous solution AQ may be recycled by circulating the electrolytic aqueous solution AQ recovered in the recovery unit 18 to the supply unit 14.

Regarding a method of supplying the electrolytic aqueous solution AQ, the electrolytic aqueous solution AQ is made to flow parallel to the surface of a diaphragm 34, and the flow of the electrolytic aqueous solution AQ is made a laminar flow on an electrode surface. In this case, a honeycomb straightening plate may be further provided. The flow of the electrolytic aqueous solution AQ does not include a turbulent flow. The flow, in a flow direction $F_A$ (refer to FIG. 2), of the electrolytic aqueous solution AQ to be described below does not include a turbulent flow, either.

Moreover, the system 10 has a hydrogen gas recovery unit 22 that recovers the hydrogen gas generated in the artificial photosynthesis modules 12, and an oxygen gas recovery unit 26 that recovers the oxygen gas generated in the artificial photosynthesis modules 12.

The hydrogen gas recovery unit 22 is connected to the artificial photosynthesis modules 12 via a hydrogen pipe 24, and the oxygen gas recovery unit 26 is connected to the artificial photosynthesis modules 12 via an oxygen pipe 28.

The configuration of the hydrogen gas recovery unit 22 is not particularly limited in a case where the hydrogen gas can be recovered. For example, devices using an adsorption method, a diaphragm method, and the like are available.

The configuration of the oxygen gas recovery unit 26 is not particularly limited in a case where the oxygen gas can be recovered. For example, devices using an adsorption method are available.

In addition, in the system 10, the artificial photosynthesis modules 12 may be installed parallel to a horizontal plane, or may be installed to be tilted at a preset angle with respect to the horizontal plane. By installing the artificial photosynthesis modules 12 so as to be tilted with respect to the horizontal plane, the electrolytic aqueous solution AQ is apt to move to the recovery pipe 20 side, and the efficiency of generation of the hydrogen gas and the oxygen gas can be made high. The hydrogen gas and the oxygen gas are also apt to move to the supply pipe 16 side, and the hydrogen gas and the oxygen gas can be efficiently recovered.

Although the hydrogen gas recovery unit 22 and the oxygen gas recovery unit 26 are provided on the supply pipe 16 side of the supply unit 14, the invention is not limited to this, and the hydrogen gas recovery unit 22 and the oxygen gas recovery unit 26 may be provided on the recovery pipe 20 side of the recovery unit 18.

Next, an artificial photosynthesis module 12 that constitutes the system 10 will be described in detail.

Figure 2:
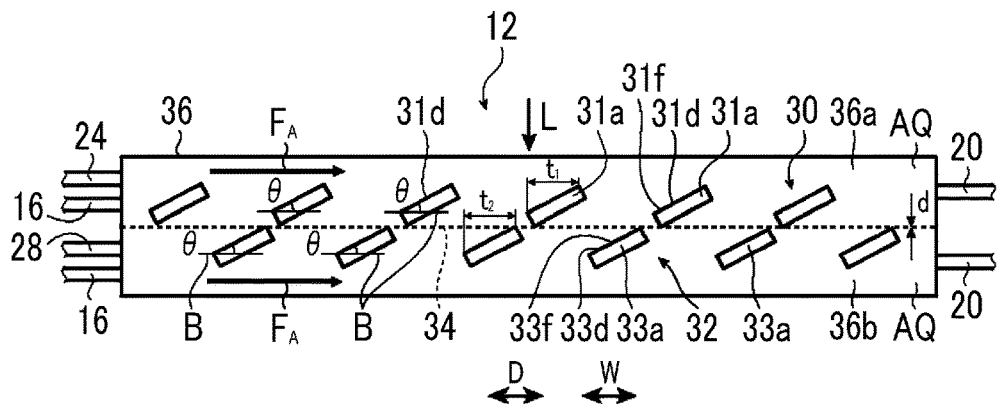
FIG. 2 is a schematic side sectional view illustrating a first example of an artificial photosynthesis module of the embodiment of the invention.
Figure 3:
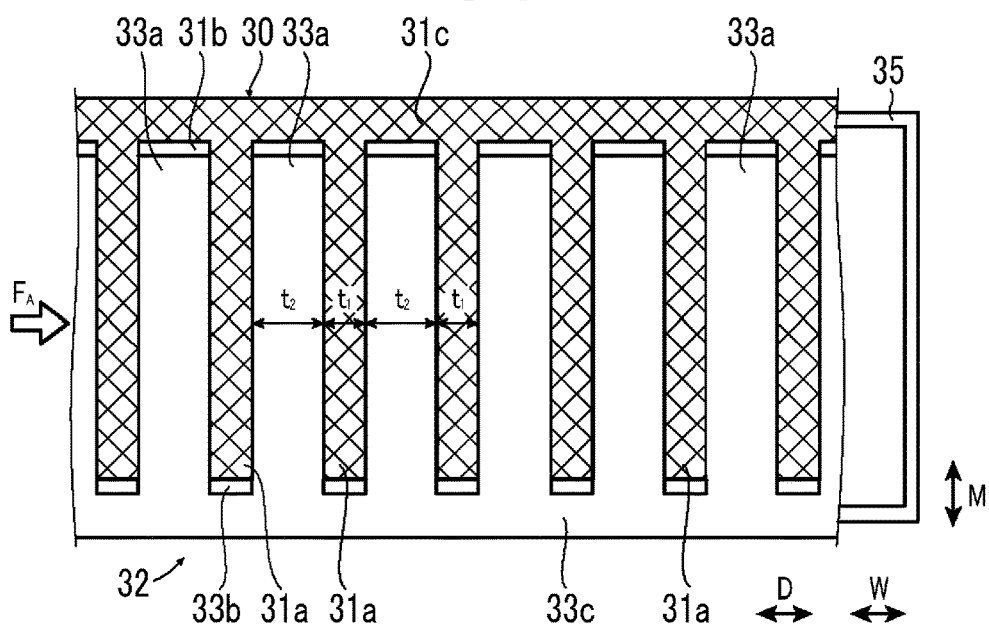
FIG. 3 is a schematic plan view illustrating an electrode configuration of the first example of the artificial photosynthesis module of the embodiment of the invention.
Figure 4:
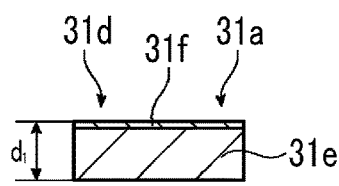
FIG. 4 is a schematic sectional view illustrating an example of the configuration of a hydrogen generation electrode of the artificial photosynthesis module of the embodiment of the invention.
Figure 5:
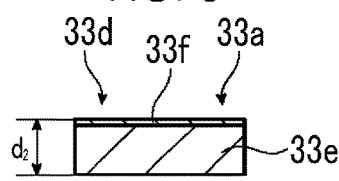
FIG. 5 is a schematic sectional view illustrating an example of the configuration of an oxygen generation electrode of the artificial photosynthesis module of the embodiment of the invention.

FIG. 2 is a schematic side sectional view illustrating a first example of the artificial photosynthesis module of the embodiment of the invention, FIG. 3 is a schematic plan view illustrating an electrode configuration of the first example of the artificial photosynthesis module of the embodiment of the invention, FIG. 4 is a schematic sectional view illustrating an example of the configuration of a hydrogen generation electrode of the artificial photosynthesis module, and FIG. 5 is a schematic sectional view illustrating an example of the configuration of an oxygen generation electrode of the artificial photosynthesis module.

As illustrated in FIG. 2, the artificial photosynthesis module 12 has a hydrogen generation electrode 30 and an oxygen generation electrode 32. The hydrogen generation electrode 30 and the oxygen generation electrode 32 are housed within a container 36, and a diaphragm 34 is disposed between the hydrogen generation electrode 30 and the oxygen generation electrode 32. The hydrogen generation electrode 30, the diaphragm 34, and the oxygen generation electrode 32 are laminated in this order from an incident ray L side, the hydrogen generation electrode 30 is disposed on a surface side of the diaphragm 34, and the oxygen generation electrode 32 is disposed on a back surface side of the diaphragm 34. The oxygen generation electrode 32 is present opposite the hydrogen generation electrode 30 across the diaphragm 34. The diaphragm 34, for example, is disposed in a planar shape in a state where the diaphragm 34 extends in a direction parallel to the direction W within the container 36.

In this case, the hydrogen generation electrode 30 and the oxygen generation electrode 32 are disposed at different positions in a direction perpendicular to the same plane, and each of a plurality of second electrode portions 33a of the oxygen generation electrode 32 is disposed in a first gap 31b between first electrode portions 31a (to be described below) of the hydrogen generation electrode 30, in a case where the diaphragm 34 is seen from the hydrogen generation electrode 30 side.

As illustrated in FIG. 3, the hydrogen generation electrode 30 is constituted of, for example, a flat plate, and has an oblong first electrode portion 31a, an oblong first gap 31b, and a base part 31c to which a plurality of the first electrode portions 31a are connected, and the first electrode portion 31a and the first gap 31b are alternately disposed in the direction D. The plurality of first electrode portions 31a are integral with the base part 31c, and the plurality of first electrode portions 31a are electrically connected to each other, respectively.

The oxygen generation electrode 32 is constituted of, for example, a flat plate, and has an oblong second electrode portion 33a, an oblong second gap 33b, and a base part 33c to which a plurality of the second electrode portions 33a are connected, and the second electrode portion 33a and the second gap 33b are alternately disposed in the direction D. The plurality of second electrode portions 33a are integral with the base part 33c, and the plurality of second electrode portions 33a are electrically connected to each other, respectively.

The direction D is an arrangement direction of the first electrode portions 31a, and is an arrangement direction of the second electrode portions 33a. In addition, the direction D is a direction parallel to the above-described direction W.

The hydrogen generation electrode 30 and the oxygen generation electrode 32 are disposed side by side, the first electrode portion 31a is disposed in the second gap 33b, and the second electrode portion 33a is disposed in the first gap 31b.

As illustrated in FIG. 3, the hydrogen generation electrode 30 and the oxygen generation electrode 32 are all comb-type electrodes, and the first electrode portion 31a and the second electrode portion 33a are equivalent to comb teeth of the comb-type electrodes. The hydrogen generation electrode 30 and the oxygen generation electrode 32 are all referred to as comb-type electrodes.

Although gaps are formed on both sides of the first electrode portion 31a in the direction D between the second gap 33b and the first electrode portion 31a, the gaps on both sides may be the same as each other or may be different from each other. Additionally, although gaps are formed on both sides of the second protrusion 33a in the direction D between the first gap 31b and the second electrode portion 33a, even in this case, the gaps on both sides may be the same as each other or may be different from each other.

In addition, a surface of the oxygen generation electrode 32 and a surface of the hydrogen generation electrode 30 do not have irregularities having a height of 0.1 mm or more, respectively. In a case where the height of the irregularities is 0.1 mm or more, the irregularities correspond to a projecting part 80 to be described below, and are not the surface of the hydrogen generation electrode 30 and the surface of the oxygen generation electrode 32. In a case where the height of the irregularities is less than 0.1 mm, even in a case where there are irregularities on a photocatalyst particle surface, irregularities on a photocatalyst layer surface, or the like, these irregularities are neglected and are regarded as the surface of the oxygen generation electrode 32 and the surface of the hydrogen generation electrode 30. The height of 0.1 mm means that the height from the surface is 0.1 mm, and means that a height h to be described below is 0.1 mm.

In the artificial photosynthesis module 12, the electrolytic aqueous solution AQ is made to flow, for example, in a direction parallel to the direction D, that is, so as to cross the first electrode portion 31a and the second electrode portion 33a. In this way, the direction in which the electrolytic aqueous solution AQ is made to flow so as to cross the first electrode portion 31a and the second electrode portion 33a is referred to as the flow direction $F_A$ of the electrolytic aqueous solution AQ. The flow direction $F_A$ of the electrolytic aqueous solution AQ is the direction parallel to the direction D. In FIG. 2, the electrolytic aqueous solution AQ is made to flow from the supply pipe 16 toward the recovery pipe 20.

The hydrogen generation electrode 30 and the oxygen generation electrode 32 are electrically connected to each other by, for example, a wiring line 35. In the hydrogen generation electrode 30, an electric potential is generated in a case where the incident ray L is radiated to a surface 31d as will be described below in detail. Accordingly, an electric current generated in the hydrogen generation electrode 30 by the radiation of the incident ray L flows to the oxygen generation electrode 32, and the electrolytic aqueous solution AQ is electrolyzed into hydrogen and oxygen in the hydrogen generation electrode 30 and the oxygen generation electrode 32, so that the hydrogen gas and the oxygen gas can be obtained.

In the first electrode portion 31a of the hydrogen generation electrode 30, for example, as illustrated in FIG. 4, a first photocatalyst layer 31f is provided on a surface of a first base material 31e. The first photocatalyst layer 31f is constituted of a hydrogen-generating photocatalyst. A surface of the first photocatalyst layer 31f becomes the surface 31d of the first electrode portion 31a. In addition, a hydrogen-generating co-catalyst (not illustrated) may be provided on the surface of the first photocatalyst layer 31f.

In this case, a surface of the hydrogen-generating co-catalyst becomes the surface 31d of the first electrode portion 31a. In the second electrode portion 33a of the oxygen generation electrode 32, for example, as illustrated in FIG. 5, a second photocatalyst layer 33f are provided on a surface of a second base material 33e. The second photocatalyst layer 33f is constituted of an oxygen-generating photocatalyst. A surface of the second photocatalyst layer 33f becomes a surface 33d of the second electrode portion 32a. In addition, an oxygen-generating co-catalyst (not illustrated) may be provided on the surface of the second photocatalyst layer 33f. In this case, a surface of the oxygen-generating co-catalyst becomes the surface 33d of the second electrode portion 33a.

The first base material 31e, the second base material 33e, the first photocatalyst layer 31f, and the second photocatalyst layer 33f will be described below in detail.

As illustrated in FIG. 2, the first photocatalyst layer 31f of the first electrode portion 31a of the hydrogen generation electrode 30 is tilted with respect to the flow direction $F_A$ of the electrolytic aqueous solution AQ. Additionally, the first photocatalyst layer 31f is also tilted with respect to the diaphragm 34.

The second photocatalyst layer 33f of the second electrode portion 33a of the oxygen generation electrode 32 is tilted with respect to the flow direction $F_A$ of the electrolytic aqueous solution AQ. Additionally, the second photocatalyst layer 33f is also tilted with respect to the diaphragm 34. The first photocatalyst layer 31f of the first electrode portion 31a of the hydrogen generation electrode 30 and the second photocatalyst layer 33f of the second electrode portion 33a of the oxygen generation electrode 32 are tilted in the same direction.

The second electrode portion 33a of the oxygen generation electrode 32 is disposed in the first gap 31b between the first electrode portions 31a of the hydrogen generation electrode 30. Accordingly, the incident ray L is radiated to the first electrode portion 31a of the hydrogen generation electrode 30 and the second electrode portion 33a of the oxygen generation electrode 32. In this case, in FIG. 2, although the electrolytic aqueous solution AQ is supplied in the flow direction $F_A$, the flow of the electrolytic aqueous solution AQ is a laminar flow and is not a turbulent flow.

A tilt angle θ of the first electrode portion 31a and a tilt angle θ of the second electrode portion 33a are the same angle.

By tilting the first electrode portion 31a and the second electrode portion 33a with respect to the flow direction $F_A$ of the electrolytic aqueous solution AQ, the flow of the electrolytic aqueous solution AQ that is the laminar flow is disturbed near the first electrode portion 31a and near the second electrode portion 33a, and becomes a turbulent flow. As a result, the electrolytic aqueous solution AQ stagnates on the surface 31d of the first electrode portion 31a and the surface 33d of the second electrode portion 33a, an electrolytic current becomes high as compared to a flat configuration in which both of the electrode portions are not tilted, and excellent energy conversion efficiency is obtained. Here, the electrolytic current is a current value in a case where light having the same light intensity is applied.

In the hydrogen generation electrode 30, the tilt angle θ is a tilt angle of the first photocatalyst layer 31f with respect to the flow direction $F_A$ of the electrolytic aqueous solution AQ, and is a tilt angle of the first photocatalyst layer 31f with respect to the diaphragm 34. In this case, since the tilt angle with respect to the flow direction $F_A$ of the electrolytic aqueous solution AQ and the tilt angle with respect to the diaphragm 34 are the same angle, both are the tilt angles θ.

As described above, the diaphragm 34 is disposed in a state where the diaphragm 34 extends in the direction parallel to the direction W. In the hydrogen generation electrode 30 illustrated in FIG. 4, the hydrogen-generating co-catalyst (not illustrated) is provided on the surface of the first photocatalyst layer 31f. The co-catalyst is the surface 31d of the first electrode portion 31a. However, the co-catalyst has a size of about 0.5 nm to about 1 μm, and the surface of the first photocatalyst layer 31f is substantially the surface 31d of the first electrode portion 31a. For this reason, the tilt angle θ is an angle formed between the surface 31d of the first electrode portion 31a and a horizontal line B.

In the oxygen generation electrode 32, the tilt angle θ is a tilt angle of the second photocatalyst layer 33f with respect to the flow direction $F_A$ of the electrolytic aqueous solution AQ, and is a tilt angle of the second photocatalyst layer 33f with respect to the diaphragm 34. In this case, since the tilt angle with respect to the flow direction $F_A$ of the electrolytic aqueous solution AQ and the tilt angle with respect to the diaphragm 34 are the same angle, both are the tilt angles θ.

In the oxygen generation electrode 32 illustrated in FIG. 5, the oxygen-generating co-catalyst (not illustrated) is provided on the surface of the second photocatalyst layer 33f. The co-catalyst is the surface 33d of the second electrode portion 33a. However, the co-catalyst has a size of about 0.5 nm to about 1 μm, and the surface of the second photocatalyst layer 33f is substantially the surface 33d of the second electrode portion 33a. For this reason, the tilt angle θ is an angle formed between the surface 33d of the second electrode portion 33a and the horizontal line B. The horizontal line B is a direction parallel to the direction W, the flow direction $F_A$ of the electrolytic aqueous solution AQ, and the direction D.

The tilt angle θ is preferably 5° or more and 45° or less, and more preferably, an upper limit value thereof is 30° or less. In a case where the tilt angle θ is 5° or more and 45° or less, a high electrolytic current can be obtained.

In a case where the tilt angle θ is large, the flow resistance of the electrolytic aqueous solution AQ increases, and the flow rate thereof becomes low. In a case where the flow rate of the electrolytic aqueous solution AQ is increased, the energy consumption of a pump or the like of the supply unit 14 for supplying the electrolytic aqueous solution AQ increases, and the energy consumption of the supply unit 14 is increased. The increased energy consumption leads to a loss of energy, and the loss increases in a case where the flow rate of the electrolytic aqueous solution AQ is increased. For this reason, the total energy conversion efficiency of the artificial photosynthesis module 12 decreases.

In addition, the faster the flow rate of the electrolytic aqueous solution AQ, the better. However, the energy consumption of the pump or the like of the supply unit 14 for supplying the electrolytic aqueous solution AQ increases. Even in this case, since the loss resulting from the energy consumption increases, the total energy conversion efficiency of the artificial photosynthesis module 12 decreases.

The tilt angle θ of the hydrogen generation electrode 30 is obtained by acquiring a digital image from a side surface direction of the hydrogen generation electrode 30, taking the digital image into a personal computer, displaying the digital image on a monitor, drawing the horizontal line B on the monitor, and finding an angle formed between the horizontal line B and the surface 31d of the first electrode portion 31a of the hydrogen generation electrode 30.

Additionally, the tilt angle θ of the oxygen generation electrode 32 is obtained by acquiring a digital image from a side surface direction of the oxygen generation electrode 32, taking the digital image into the personal computer, displaying the digital image on the monitor, drawing the horizontal line B on the monitor, and finding an angle formed between the horizontal line B and the surface 33d of the second electrode portion 33a of the oxygen generation electrode 32.

In addition, although the tilt angle θ of the first electrode portion 31a and the tilt angle θ of the second electrode portion 33a are the same angle, the invention is not limited to this, and the tilt angle θ of the first electrode portion 31a and the tilt angle θ of the second electrode portion 33a may be different angles.

Additionally, any one of the first electrode portion 31a of the hydrogen generation electrode 30 and the second electrode portion 33a of the oxygen generation electrode 32 may have the tilt angle θ of 0°, that is, may be in a tilted state. By tilting at least one electrode portion, as compared to the flat configuration in which both of the electrode portions are not tilted, the electrolytic current becomes high, and excellent energy conversion efficiency can be obtained.

Additionally, the first photocatalyst layer 31f of at least one first electrode portion 31a of the hydrogen generation electrode 30 or the second photocatalyst layer 33f of at least one second electrode portion 33a of the oxygen generation electrode 32 may be tilted with respect to the diaphragm 34 and the flow direction $F_A$ of the electrolytic aqueous solution AQ. In this case, it is preferable that at least one of the tilted first photocatalyst layer 31f and the tilted second photocatalyst layer 33f satisfies the above-described tilt angle θ of 5° or more and 45° or less.

The more the tilted photocatalyst layer is, the higher the stagnation effect of the electrolytic aqueous solution AQ is obtained. In order to obtain a sufficient stagnation effect of the electrolytic aqueous solution AQ, it is preferable that the photocatalyst layer of 50% or more electrode portions among all the electrode portions of the hydrogen generation electrode 30 or the oxygen generation electrode 32 is tilted with respect to the flow direction $F_A$ of the electrolytic aqueous solution and the diaphragm 34, and it is more preferable that the photocatalyst layer of all the electrode portions is tilted. In addition, for example, in a case where the photocatalyst layer of all the electrode portions of one electrode of the hydrogen generation electrode 30 and the oxygen generation electrode 32 is tilted, the photocatalyst layer of 50% or more electrode portions is tilted.

The container 36 is partitioned into a space 36a having the hydrogen generation electrode 30 and a space 36b having the oxygen generation electrode 32 by the diaphragm 34.

The container 36 constitutes an outer shell of the artificial photosynthesis module 12, and the configuration thereof is not particularly limited in a case where the electrolytic aqueous solution AQ can be held inside the container without leaking and the light from the outside can be transmitted through the container so that the hydrogen generation electrode 30 and the oxygen generation electrode 32 can be irradiated with the light.

The supply pipe 16 is connected to one end of the container 36 in each of the spaces 36a and 36b. Additionally, at the one end of the container, the hydrogen pipe 24 is connected to the space 36a and the oxygen pipe 28 is connected to the space 36b. The recovery pipe 20 is connected to the other end of the container.

In the artificial photosynthesis module 12, hydrogen and oxygen can be separately recovered by being partitioned into the space 36a and the space 36b by the diaphragm 34. Accordingly, a separation step and a separation membrane for hydrogen and oxygen become unnecessary, and recovery of hydrogen and oxygen can be made easy.

In addition, it is preferable that the hydrogen generation electrode 30 is disposed above the oxygen generation electrode 32. Accordingly, hydrogen can move to above the space 36a, and recovery of hydrogen can be made easier.

In addition, in a case where the hydrogen generation electrode 30 is disposed below the oxygen generation electrode 32, generated hydrogen permeates through the upper diaphragm 34, and moves to the oxygen generation electrode 32 side. However, this can be prevented by disposing the hydrogen generation electrode 30 above the oxygen generation electrode 32.

It is preferable to dispose the hydrogen generation electrode 30 and the oxygen generation electrode 32 at positions closer to each other because a higher electrolytic current is obtained. However, in a case where the hydrogen generation electrode 30 and the oxygen generation electrode 32 are brought into close contact with the diaphragm 34, generated hydrogen bubbles and oxygen bubbles are not easily removed. For this reason, it is preferable that the hydrogen generation electrode 30 and the oxygen generation electrode 32 are in contact with the diaphragm 34 to such a degree that the bubbles can move.

An ion-permeable membrane through which generated hydrogen ions permeate but bubbled hydrogen gas and oxygen gas does not permeate is used as the diaphragm 34. For example, Nafion (registered trademark) made by DIPON CO., LTD., SELEMION (registered trademark) made by AGC Engineering CO., LTD., or the like are used as the ion-permeable membrane.

As illustrated in FIG. 3, both the first electrode portion 31a of the hydrogen generation electrodes 30 and the first gap 31b, and the second electrode portion 33a of the oxygen generation electrode 32 and the second gap 33b are oblong. However, the invention is not limited to this. For example, a rectangular shape or a triangular shape other than the oblong shape may be used.

Additionally, the first electrode portion 31a is disposed in the second gap 33b, and the second electrode portion 33a is disposed in the first gap 31b. However, the invention is not limited to this, and these electrodes may be disposed. In a case where the hydrogen generation electrode 30 and the oxygen generation electrode 32 are disposed side by side, the second electrode portion 33a of the oxygen generation electrode 32 faces the first gap 31b of the hydrogen generation electrode 30 in an arrangement direction, and the first electrode portion 31a faces the second gap 33b in the arrangement direction, the arrangement form of the hydrogen generation electrode 30 and the oxygen generation electrode 32 is not particularly limited.

It is preferable that the first electrode portion 31a is disposed in the second gap 33b, and the second electrode portion 33a is disposed in the first gap 31b because the installation area of the overall electrodes can be made small.

In a case where the length of sides of the first electrode portion 31a of the hydrogen generation electrode 30 and the second electrode portion 33a of the oxygen generation electrode 32 the flow direction $F_A$ of the electrolytic aqueous solution AQ is the width of the electrode portions, it is preferable that the width of the electrode portions is 10 µm to 10 mm.

In this case, a width $t_1$ of the first electrode portion 31a of the hydrogen generation electrode 30 is the length of a side of the first electrode portion 31a in a case where the hydrogen generation electrode 30 is seen from a direction perpendicular to the direction D. A width $t_3$ of the second electrode portion 33a of the oxygen generation electrode 32 is the length of a side of the second electrode portion 33a in a case where the oxygen generation electrode 32 is seen from the direction perpendicular to the direction D. It is preferable that the width $t_1$ of the first electrode portion 31a and the width $t_3$ of the second electrode portion 33a, it is 10 µm to 10 mm, respectively.

Additionally, it is preferable that both a thickness $d_1$ (refer to FIG. 4) of the first electrode portion 31a and a thickness $d_2$ (refer to FIG. 5) of the second electrode portion 33a are 1 mm or less.

The thickness $d_1$ of the first electrode portion 31a is a distance from the back surface of the first base material 31e to a surface of a top layer, and is a length to the surface of the hydrogen-generating co-catalyst (not illustrated) on the surface of the first photocatalyst layer 31f in FIG. 4.

The thickness $d_2$ of the second electrode portion 33a is a distance from the back surface of the second base material 33e to a surface of a top layer, and is a length to the surface of the oxygen-generating co-catalyst on the surface (not illustrated) of the second photocatalyst layer 33f in FIG. 5.

In a case where the width $t_1$ of the first electrode portion 31a and the width $t_3$ of the second electrode portion 33a are within the above-described ranges, the energy conversion efficiency can be made higher. Additionally, in a case where the thickness $d_1$ of the first electrode portion 31a and the thickness $d_2$ of the second electrode portion 33a are within the above-described ranges, the energy conversion efficiency can be made higher.

The width $t_1$ of the first electrode portion 31a, the width $t_3$ of the second electrode portion 33a, the thickness $d_1$ of the first electrode portion 31a, and the thickness $d_2$ of the second electrode portion 33a can be obtained as follows.

The width $t_1$ of the first electrode portion 31a and the width $t_3$ of the second electrode portion 33a are obtained by acquiring digital images of the hydrogen generation electrode 30 and the oxygen generation electrode 32 in the direction perpendicular to the direction D from the hydrogen generation electrode 30 side, taking the digital images into the personal computer, displays the digital images on the monitor, and drawing lines on portions equivalent to the width $t_1$ of the first electrode portion 31a and the width $t_3$ of the second electrode portion 33a on the monitor. By finding the lengths of the lines, the width $t_1$ of the first electrode portion 31a and the width $t_3$ of the second electrode portion 33a are obtained.

The thickness $d_1$ of the first electrode portion 31a and the thickness $d_2$ of the second electrode portion 33a are obtained by acquiring digital images of the hydrogen generation electrode 30 and the oxygen generation electrode 32, taking the digital images into the personal computer, displays the digital images on the monitor, and drawings lines on portions equivalent to the thickness $d_1$ of the first electrode portion 31a and the thickness $d_2$ of the second electrode portion 33a on the monitor. By finding the lengths of the lines, the thickness $d_1$ of the first electrode portion 31a and the thickness $d_2$ of the second electrode portion 33a are obtained.

In the hydrogen generation electrode 30, the first photocatalyst layer 31f of the first electrode portion 31a may have at least the above-described tilt angle θ, and the base part 31c may not be tilted.

Even in the oxygen generation electrode 32, the second photocatalyst layer 33f of the second electrode portion 33a may have at least the above-described tilt angle θ, and the base part 33c may not be tilted.

Since oxygen generation efficiency is not the same as hydrogen generation efficiency, the area of the hydrogen generation electrode 30 and the area of the oxygen generation electrode 32 are not necessarily the same.

It is preferable to change the area of the hydrogen generation electrode 30 and the area of the oxygen generation electrode 32, according to the amounts of hydrogen and oxygen intended to obtain. In the invention, it is preferable that the width $t_3$ of the second electrode portion 33a of the oxygen generation electrode 32 is greater than the width $t_1$ of the first electrode portion 31a of the hydrogen generation electrode 30. Accordingly, the amounts of hydrogen and oxygen to be generated can be approximately equal amounts.

Hereinafter, the first base material 31e, the second base material 33e, the first photocatalyst layer 31f, and the second photocatalyst layer 33f will be described in detail.

<Base Material>

The first base material 31e and the second base material 33e support the photocatalyst layers. As the base materials, well-known materials may be used. For example, it is preferable to use base materials formed of metals, nonmetals such as carbon (graphite), or conductive oxides such as a conductive material. Among these, since the metal base materials have excellent workability, it is particularly preferable to use the metal base materials. As the metal base materials, single substances of atoms or alloys exhibiting excellent electrical conductivity can be used. Specifically, the single substances of the atoms may include Au, Ti, Zr, Nb, Ta, and the like. Specifically, although the alloys may include carbon steel, titanium alloys, and the like, the alloys are not limited to the exemplified materials as long as the alloys are electrochemically stable.

The shape of the base materials are not particularly limited and may be, for example, a punched metal shape, a mesh shape, a lattice shape, or a porous body having pierced pores.

Additionally, the base materials may be laminated bodies (for example, a laminated body of a glass substrate and a metal layer) in which a plurality of layers are laminated.

<Photocatalyst Layer>

The first photocatalyst layer 31f and the second photocatalyst layer 33f are layers disposed on the above-described base materials, and are layers that absorb visible light.

Among these, from a viewpoint of more excellent onset potential, higher photocurrent density, or more excellent durability against continuation irradiation (hereinafter also simply referred to as "point that the effects of the invention are more excellent"), as metallic elements, Ti, V, Nb, Ta, W, Mo, Zr, Ga, In, Zn, Cu, Ag, Cd, Cr, or Sn is preferable, and Ti, V, Nb, Ta, or W is more preferable.

Additionally, optical semiconductors include oxides, nitrides, oxynitrides, (oxy)chalcogenide, and the like, which include the above-described metallic elements.

In addition, the "absorb visible light" means absorbing light in a visible light region (450 to 800 nm).

Additionally, the optical semiconductors are usually included as a main component in the photocatalyst layers. The main component means that the optical semiconductors are equal to or more than 80 mass % with respect to the total mass of an photocatalyst layer, and preferably equal to or more than 90 mass %. Although an upper limit of the main component is not particularly limited, the upper limit is 100 mass %.

Specific examples of the optical semiconductors may include, for example, oxides, such as $Bi_2WO_6$, $BiVO_4$, $BiYWO_6$, $In_2O_3(ZnO)_3$, $InTaO_4$, and $InTaO_4$:Ni ("optical semiconductor: M" shows that the optical semiconductors are doped with M. The same applies below), $TiO_2$:Ni, $TiO_2$:Ru, $TiO_2$Rh, and $TiO_2$: Ni/Ta ("optical semiconductor: M1/M2" shows that the optical semiconductors are doped with M1 and M2. The same applies below), $TiO_2$:Ni/Nb, $TiO_2$:Cr/Sb, $TiO_2$:Ni/Sb, $TiO_2$:Sb/Cu, $TiO_2$:Rh/Sb, $TiO_2$:Rh/Ta, $TiO_2$:Rh/Nb, $SrTiO_3$:Ni/Ta, $SrTiO_3$:Ni/Nb, $SrTiO_3$:Cr, $SrTiO_3$:Cr/Sb, $SrTiO_3$:Cr/Ta, $SrTiO_3$:Cr/Nb, $SrTiO_3$:Cr/W, $SrTiO_3$:Mn, $SrTiO_3$:Ru, $SrTiO_3$:Rh, $SrTiO_3$:Rh/Sb, $SrTiO_3$:Ir, $CaTiO_3$:Rh, $La_2Ti_2O_7$:Cr, $La_2Ti_2O_7$:Cr/Sb, $La_2Ti_2O_7$:Fe, $PbMoO_4$:Cr, $RbPb_2Nb_3O_{10}$, $HPb_2Nb_3O_{10}$, $PbBi_2Nb_2O_9$, $BiVO_4$, $BiCu_2VO_6$, $BiSn_2VO_6$, $SnNb_2O_6$, $AgNbO_3$, $AgVO_3$, $AgLi_{1/3}Ti_{2/3}O_2$, $AgLi_{1/3}Sn_{2/3}O_2$, $WO_3$, $BaBi_{1-x}In_xO_3$, $BaZr_{1-x}Sn_xO_3$, $BaZr_{1-x}Ge_xO_3$, and $BaZr_{1-x}Si_xO_3$, oxynitrides, such as $LaTiO_2N$, $Ca_{0.25}La_{0.75}TiO_{2.25}N_{0.75}$, TaON, $CaNbO_2N$, $BaNbO_2N$, $CaTaO_2N$, $SrTaO_2N$, $BaTaO_2N$, $LaTaO_2N$, $Y_2Ta_2O_5N_2$, $(Ga_{1-x}Zn_x)(N_{1-x}O_x)$, $(Zn_{1+x}Ge)(N_2O_x)$ (x represents a numerical value of 0 to 1), and $TiN_xO_yF_z$, nitrides, such as NbN and $Ta_3N_5$, sulfides, such as CdS, selenide, such as CdSe, oxysulfide compounds (Chemistry Letters, 2007, 36, 854 to 855) including $Ln_2Ti_2S_2O_5$ (Ln: Pr, Nd, Sm, Gd, Tb, Dy, Ho, and Er), La, and In, the optical semiconductors are not limited to the materials exemplified here.

Among these, as the optical semiconductors, $BaBi_{1-x}In_xO_3$, $BaZr_{1-x}Sn_xO_3$, $BaZr_{1-x}Ge_xO_3$, $BaZr_{1-x}Si_xO_3$, NbN, $TiO_2$, $WO_3$, GaAs, GaInP, AlGaInP, CdTe, CuInGaSe, TaON, $BiVO_4$, or $Ta_3N_5$, AB(O, N)$_3$ {A=Li, Na, K, Rb, Cs, Mg, Ca, Sr, Ba, La, or Y, B=Ta, Nb, Sc, Y, La, or Ti} having a perovskite structure; solid solutions including AB(O, N)$_3$ having the above-described perovskite structure as a main component; doped bodies including TaON, $BiVO_4$, $Ta_3N_5$, or AB(O, N)$_3$ having the perovskite structure as a main component; or (oxy)chalcogenide-based catalysts, specifically, Cu(In, Se) Se$_2$, Cu(In, Ga) (S, Se)$_2$, CuInS$_2$, and Cu$_2$ZnSn(S, Se)$_4$ are preferable.

The shape of the optical semiconductors included in the photocatalyst layers are not particularly limited, and include a columnar shape, a particle shape, or the like.

In a case where the optical semiconductors are particle-shaped, the particle diameter of primary particles thereof is not particularly limited. However, usually, the particle diameter is preferably 0.01 μm or more, and more preferably, 0.1 μm or more, and usually, the particle diameter is preferably 50 μm or less preferably 10 μm or less.

The above-described particle diameter is an average particle diameter, and is obtained by measuring the particle diameters (diameters) of 100 certain optical semiconductors observed by a transmission electron microscope (TEM) or a scanning electron microscope (SEM) and arithmetically averaging these particle diameters. In addition, major diameters are measured in a case where the particle shape is not a true circle.

In a case where the optical semiconductors are columnar, it is preferable that the columnar optical semiconductors extend in a normal direction of surfaces of the base materials. Although the diameter of the columnar optical semiconductors is particularly limited, usually, the diameter is preferably 25 nm or more, and more preferably, 50 nm or more, and usually, the diameter is preferably 20 μm or less and preferably 10 μm or less.

The above-described diameter is an average diameter and is obtained by measuring the diameters of 100 certain columnar optical semiconductors observed by TEM (Device name: H-8100 of Hitachi High Technologies Corporation) or SEM (Device name: SU-8020 type SEM of Hitachi High Technologies Corporation) and arithmetically averaging the diameters.

The co-catalysts may be carried and supported on the above-described optical semiconductors as needed. As the co-catalysts, it is preferable to use any one of metals of groups 2 to 14, intermetallic compounds of these metals, or alloys; oxides, complex oxides, nitrides, oxynitrides, sulfides, or acid sulfides thereof or mixtures thereof. Here, the "intermetallic compounds" are compounds formed of two or more kinds of metallic elements, and means that component atom ratios constituting the intermetallic compounds are not necessarily stoichiometric ratios and have wide composition ranges. The "oxides, complex oxides, nitrides, oxynitrides, sulfides, or acid sulfides thereof" mean oxides, complex oxides, nitrides, oxynitrides, sulfides, or acid sulfides of the metals of groups 2 to 14, the intermetallic compounds of these metals, or the alloys. The "mixtures thereof" means any two or more kinds of mixtures of the compounds exemplified above.

The co-catalysts include metal of Ti, Mn, Fe, Co, Ni, Cu, Ru, Rh, Pd, Ag, In, Ta, W, Ir, or Pt, or oxides or complex oxides thereof, more preferably metal of Mn, Co, Ni, Ru, Rh, or Ir, or oxides or complex oxide thereof, and still more preferably, Ir, MnO, $MnO_2$, $Mn_2O_3$, $Mn_3O_4$, CoO, $Co_3O_4$, $NiCo_2O_4$, $RuO_2$, $Rh_2O_3$, or $IrO_2$.

Although the carried and supported amounts of the co-catalysts are not limited, with the optical semiconductor (100 mass %) as a reference, 0.01 to 10 mass % is preferable, 0.01 to 7 mass % is more preferable, and 0.05 to 5 mass % is still more preferable.

Although the thicknesses of the photocatalyst layers are not limited, from a viewpoint of more excellent water decomposition efficiency of optical electrodes for decomposing water, 0.01 to 3.0 μm is preferable, and 0.1 to 2.0 μm more preferable.

The above-described method for forming the photocatalyst layers is not limited, and well-known methods (for example, a method for depositing particle-shaped optical semiconductors on the base materials) can be adopted. More specifically, there are a transfer method described in Chem. Sci., 2013, 4, and 1120 to 1124 and a method described in Adv. Mater., 2013, 25, and 125 to 131.

In addition, another layer (for example, an adhesive layer) may be included between a base material and a photocatalyst layer as needed.

The hydrogen generation electrode 30 and the oxygen generation electrode 32 can be formed using a screen printing method, an ink jet method, or a photo-etching method. In a case where the hydrogen generation electrode and the oxygen generation electrode are thin, these electrodes may be formed by vapor phase film deposition or pattern printing, and in a case where the hydrogen generation electrode and the oxygen generation electrode are thick, an electrode base material made of conductive metals is machined, and a photocatalyst and a co-catalyst are carried and supported thereon. As methods of carrying and supporting the photocatalyst and the co-catalyst in the hydrogen generation electrode 30 and the oxygen generation electrode 32, for example, there are plating, a vacuum vapor deposition method, a vacuum sputtering method, a particle transfer method, an optical electrodeposition method, an electrophoresis method, a cast method, and the like. In the electrophoresis method, a catalyst can be carried and supported by applying a voltage to the hydrogen generation electrode 30 and the oxygen generation electrode 32 in a state where the hydrogen generation electrode 30 and the oxygen generation electrode 32 are incorporated into the artificial photosynthesis module 12. For this reason, as the hydrogen generation electrode 30 and the oxygen generation electrode 32, comb teeth structures are excellent.

The configuration of the hydrogen generation electrode 30 and the oxygen generation electrode 32 may be a configuration to be shown below without being limited to the above-described one.

Next, another example of the configuration of the hydrogen generation electrode 30 will be described in detail.

Figure 6:
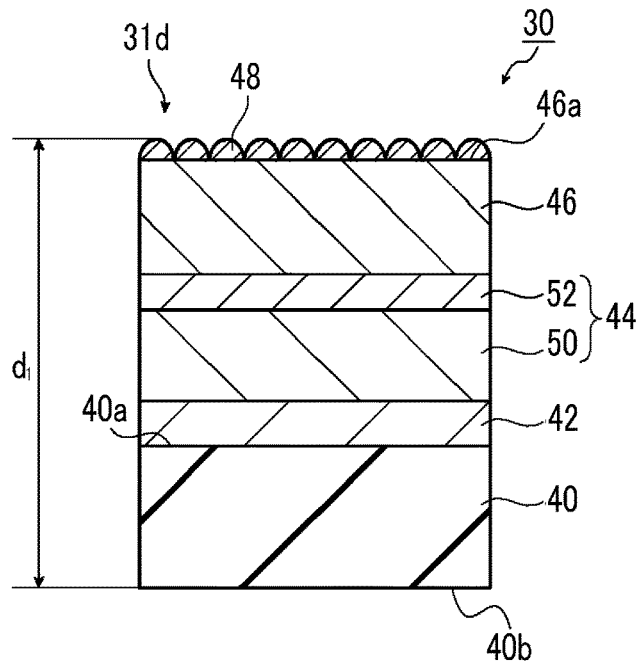
FIG. 6 is a schematic sectional view illustrating another example of the configuration of the hydrogen generation electrode of the artificial photosynthesis module of the embodiment of the invention.

FIG. 6 is a schematic sectional view illustrating another example of the configuration of the hydrogen generation electrode of the artificial photosynthesis module of the embodiment of the invention.

The hydrogen generation electrode 30 is not limited to the configuration illustrated in FIG. 4, and may have a configuration illustrated in FIG. 6. The hydrogen generation electrode 30 illustrated in FIG. 6 is formed on an insulating substrate 40, and has a conductive layer 42, a first photocatalyst layer 44, and a functional layer 46. At the time of hydrogen generation, hydrogen is generated with the hydrogen generation electrode 30 in contact with the electrolytic aqueous solution AQ. The insulating substrate 40 of the hydrogen generation electrode 30 is equivalent to a first base material 31e.

The insulating substrate 40 is configured to support the hydrogen generation electrode 30 and have electrical insulation. Although the insulating substrate 40 is not particularly limited, for example, a soda lime glass substrate (hereinafter referred to as an SLG substrate) or a ceramic substrate can be used. Additionally, an insulating substrate in which an insulating layer is formed on a metal substrate can be used as the insulating substrate 40. Here, as the metal substrate, a metal substrate, such as an Al substrate or a steel use stainless (SUS) substrate, or a composite metal substrate, such as a composite Al substrate made of a composite material of Al, and for example, other metals, such as SUS, is available. In addition, the composite metal substrate is a kind of the metal substrate, and the metal substrate and the composite metal substrate are collectively and simply referred to as a metal substrate. Moreover, a metal substrate with an insulating film having an insulating layer formed by anodizing a surface of the Al substrate or the like can also be used as the insulating substrate 40. The insulating substrate 40 may be flexible or may not be flexible. In addition, in addition to the above-described substrates, for example, a glass plate made of high strain point glass, non-alkali glass, or the like, or a polyimide substrate can also be used as the insulating substrate 40.

The thickness of the insulating substrate 40 is not particularly limited, may be about 20 to 20000 μm, is preferably 100 to 10000 μm, and is more preferably 1000 to 5000 μm. In addition, in a case where one including a copper indium gallium (di) selenide (CIGS) compound semiconductor is used as a p-type semiconductor layer 50, photoelectric conversion efficiency is improved in a case where alkali ions (for example, sodium (Na) ions: $Na^+$) are supplied to the insulating substrate 40 side. Thus, it is preferable to provide an alkali supply layer that supplies the alkali ions to a surface 40a of the insulating substrate 40. In addition, in the case of the SLG substrate, the alkali supply layer is unnecessary.

In the hydrogen generation electrode 30 illustrated in FIG. 6, a co-catalyst 48 is formed on a surface 46a of the functional layer 46. The co-catalyst 48 may be formed, for example, in the shape of islands so as to be scattered.

As the hydrogen-generating co-catalyst 48, it is preferable to use single substances constituted of, for example, Pt, Pd, Ni Au, Ag, Ru Cu, Co, Rh, Ir, Mn, or the like, alloys obtained by combining these single substances, and oxides of these single substances, for example, NiOx, and $RuO_2$, even among the above exemplified co-catalysts. Additionally, the size of the co-catalyst 48 is not particularly limited, and is preferably 0.5 nm to 1 μm.

In addition, methods for forming the co-catalyst 48 are not particularly limited, and the co-catalyst 48 can be formed by a coating baking method, an optical electrodeposition method, a sputtering method, an impregnating method, and the like.

Although it is preferable to provide the co-catalyst 48 on the surface 46a of the functional layer 46, the co-catalyst 48 may not be provided in a case where generation of sufficient hydrogen gas is possible.

The conductive layer 42 applies a voltage to the first photocatalyst layer 44. Although the conductive layer 42 is not particularly limited as long as the conductive layer has conductivity, the conductive layer 42 is made of, for example, metals, such as Mo, Cr, and W, or combinations thereof. The conductive layer 42 may have a single-layer structure, or may have a laminated structure, such as a two-layer structure. Among these, it is preferable that the conductive layer 42 is made of Mo. Although the film thickness of the conductive layer 42 is generally about 800 nm, it is preferable that the thickness of the conductive layer 42 is preferably 400 nm to 1 μm.

The first photocatalyst layer 44 generates an electric potential. The first photocatalyst layer 44 has the p-type semiconductor layer 50 and an n-type semiconductor layer 52, and the p-type semiconductor layer 50 forms a pn junction at an interface between the p-type semiconductor layer 50 and the n-type semiconductor layer 52.

The first photocatalyst layer 44 is a layer that absorbs the light which has been transmitted through the functional layer 46 and the n-type semiconductor layer 52 and has reached the photocatalyst layer, and generates holes on a p side and electrons on an n side. The p-type semiconductor layer 50 has a photoelectric conversion function. In the p-type semiconductor layer 50, holes generated in the pn junction are moved from the p-type semiconductor layer 50 to the conductive layer 42 side, and electrons generated in the pn junction are moved from the n-type semiconductor layer 52 to the functional layer 46 side. As for the film thickness of the p-type semiconductor layer 50, 0.5 to 3.0 μm is preferable, and 1.0 to 2.0 μm is particularly preferable.

It is preferable that the p-type semiconductor layer 50 is constituted of, for example, a CIGS compound semiconductor or a copper zinc tin sulfide (CZTS) compound semiconductor of $Cu_2ZnSnS_4$ or the like, which has a chalcopyrite crystal structure. The CIGS compound semiconductor layer may be constituted of $CuInSe_2$ (CIS), $CuGaSe_2$ (CGS), or the like as well as $Cu(In, Ga)Se_2$ (CIGS).

In addition, as methods for forming the CIGS layer, 1) a multi-source vapor deposition method, 2) a selenide method, 3) a sputtering method, 4) a hybrid sputtering method, 5) a mechanochemical process method, and the like are known.

Other methods for forming the CIGS layer include a screen printing method, a proximity sublimating method, a metal organic chemical vapor deposition (MOCVD) method, a spraying method (wet film-forming method), and the like. For example, in the screen printing method (wet film-forming method), a spraying method (wet film-forming method), a molecular beam epitaxy (MBE) method, or the like, crystal having a desired composition can be obtained by forming a particulate film including an 11 group element, a 13 group element, and a 16 group element on a substrate, and executing thermal decomposition processing (may be thermal decomposition processing in a 16 group element atmosphere in this case) or the like (JP1997-74065A(JP-H09-74065A), JP1997-74213A (JP-H09-74213A), or the like).

The n-type semiconductor layer 52 forms the pn junction at the interface between the n-type semiconductor layer 52 and the p-type semiconductor layer 50 as described above. Additionally, light is transmitted through the n-type semiconductor layer 52 in order to make the light incident on the functional layer 46 reach the p-type semiconductor layer 50.

It is preferable that the n-type semiconductor layer 52 is formed of one including metal sulfide including at least one kind of metallic element selected from a group consisting of, for example, Cd, Zn, Sn, and In, such as CdS, ZnS, Zn(S, O), and/or Zn (S, O, OH), SnS, Sn(S, O), and/or Sn(S, O, OH), InS, In (S, O), and/or In (S, O, OH). The film thickness of the n-type semiconductor layer 52 is preferably 10 nm to 2 μM, and more preferably, 15 to 200 nm. The n-type semiconductor layer 52 is formed by, for example, a chemical bath deposition method.

In addition, a window layer, for example, may be provided between the n-type semiconductor layer 52 and the functional layer 46. This window layer is constituted of, for example, a ZnO layer with a thickness of about 10 nm.

In a case where a pn junction consisting of an inorganic semiconductor can be formed, a photolysis reaction of water can be caused, and hydrogen can be generated, the configuration of the first photocatalyst layer 44 is not particularly limited.

For example, photoelectric conversion elements used for solar battery cells that constitute a solar battery are preferably used. As such photoelectric conversion elements, in addition to those using the above-described CIGS compound semiconductor or CZTS compound semiconductor such as $Cu_2ZnSnS_4$, thin film silicon-based thin film type photoelectric conversion elements, CdTe-based thin film type photoelectric conversion elements, dye-sensitized thin film type photoelectric conversion elements, or organic thin film type photoelectric conversion elements can be used.

The functional layer 46 prevents entering of moisture into the inside of the first photocatalyst layer 44, and inhibits the formation of bubbles inside the first photocatalyst layer 44. Transparency, water resistance, water impermeability, and conductivity are required for the functional layer 46. The durability of the hydrogen generation electrode 30 improves by the functional layer 46.

The functional layer 46 supplies electrons to hydrogen ions (protons) $H^+$ ionized from moisture molecules to generate hydrogen molecules, that is hydrogen gas ($2H^+ + 2e^- \rightarrow H_2$), and the surface 46a thereof functions as a hydrogen gas generation surface. Hence, the functional layer 46 constitutes a hydrogen gas generation region.

It is preferable that the functional layer 46 is formed of, for example, metals, conductive oxides (of which the overvoltage is equal to or lower than 0.5 V), or composites thereof. More specifically, transparent electroconductive films made of ZnO that is doped with indium tin oxide (ITO), Al, B, Ga, In, or the like, or IMO (In$_2$O$_3$ to which Mo is added) can be used for the functional layer 46. The functional layer 46 may have a single-layer structure, or may have a laminated structure, such as a two-layer structure. Additionally, the thickness of the functional layer 46 is not particularly limited, and is preferably 10 to 1000 nm and more preferably 50 to 500 nm.

In addition, methods for forming the functional layer 46 are not particularly limited, and the functional layer 46 can be formed by gaseous phase film-forming methods, such as an electron beam deposition method, a sputtering method, or a chemical vapor deposition (CVD) method, or a coating method. The functional layer 46 is not necessarily provided.

Next, another example of the configuration of the oxygen generation electrode 32 will be described.

Figure 7:
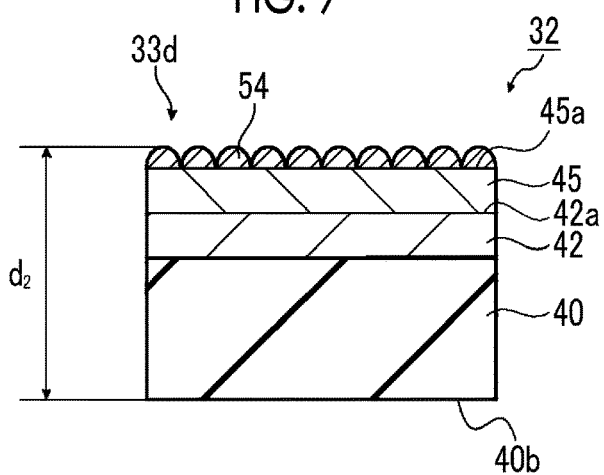
FIG. 7 is a schematic sectional view illustrating another example of the configuration of the oxygen generation electrode of the artificial photosynthesis module of the embodiment of the invention.

FIG. 7 is a schematic sectional view illustrating another example of the configuration of the oxygen generation electrode of the artificial photosynthesis module of the embodiment of the invention.

The oxygen generation electrode 32 is not limited to the configuration illustrated in FIG. 5, and may have a configuration illustrated in FIG. 7. In the oxygen generation electrode 32 illustrated in FIG. 7, the conductive layer 42 is formed on the insulating substrate 40, a second photocatalyst layer 45 is formed on a surface 42a of the conductive layer 42, and an oxygen-generating co-catalyst 54 is formed on a surface 45a of the second photocatalyst layer 45. In this case, the co-catalyst 54 may be formed, for example, in the shape of islands so as to be scattered. The insulating substrate 40 of the oxygen generation electrode 32 is equivalent to a second base material 33e.

It is preferable that the second photocatalyst layer 45 of the oxygen generation electrode 32 is made of, for example, BiVO$_4$, SnNb$_2$O$_6$, Ta$_3$N$_5$, LaTiO$_2$N, or the like.

As the oxygen-generating co-catalyst 54, it is preferable to use, for example, IrO$_2$, CoO$_x$, or the like even among the above exemplified co-catalysts. Additionally, the size of the oxygen-generating co-catalyst 54 is not particularly limited, and is preferably 0.5 nm to 1 µm. In addition, methods for forming the oxygen-generating co-catalyst 54 are not particularly limited, and the co-catalyst can be formed by a coating baking method, a dipping method, an impregnating method, a sputtering method, a vapor deposition method, and the like. In addition, the co-catalyst 54 may not be formed in a case where sufficient generation of oxygen gas is possible.

Additionally, as described above, it is preferable that both the thickness d$_1$ (refer to FIG. 6) of the first electrode portion 31a and the thickness d$_2$ (refer to FIG. 7) of the second electrode portion 33a are 1 mm or less.

In FIG. 6, the thickness d$_1$ of the first electrode portion 31a is a length from a back surface 40b of the insulating substrate 40 to the surface of the hydrogen-generating co-catalyst 48. In FIG. 7, the thickness d$_2$ of the second electrode portion 33a is a length from a back surface 40b of the insulating substrate 40 to the surface of the oxygen-generating co-catalyst 54.

Next, another example of the electrode configuration of the artificial photosynthesis module 12 will be described.

Figure 8:
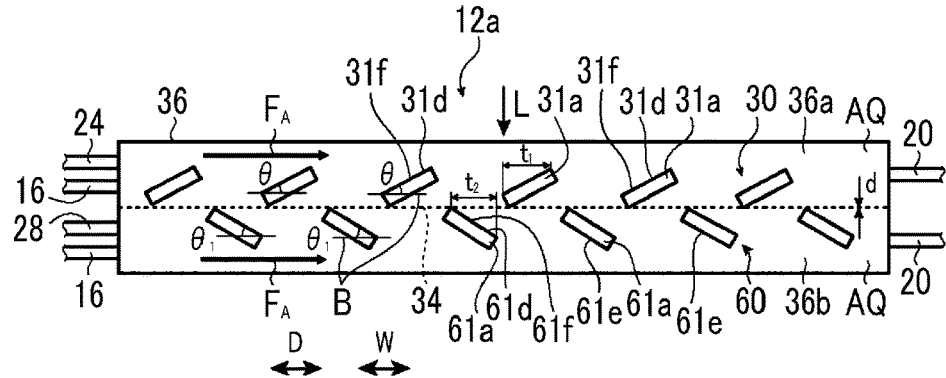
FIG. 8 is a schematic side sectional view illustrating a second example of the artificial photosynthesis module of the embodiment of the invention.
Figure 9:
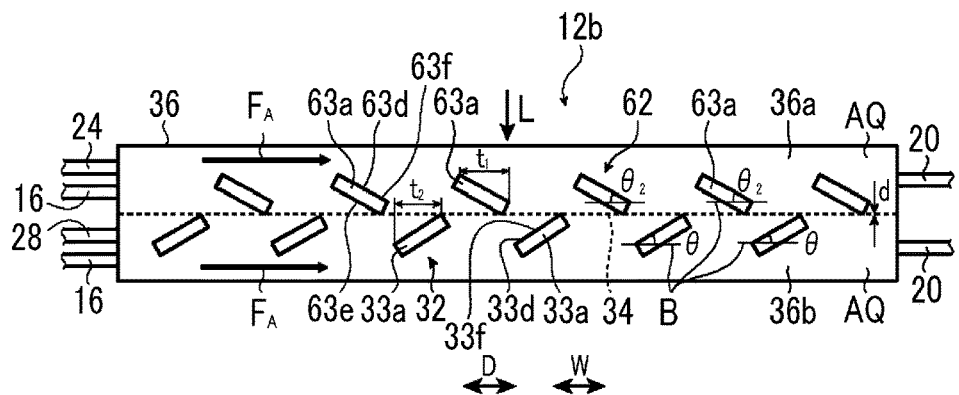
FIG. 9 is a schematic side sectional view illustrating a third example of the artificial photosynthesis module of the embodiment of the invention.

The electrode configuration of the artificial photosynthesis module 12 is not limited to one illustrated in FIGS. 2 and 3, and may be a configuration illustrated in FIGS. 8 and 9.

Here, FIG. 8 is a schematic side sectional view illustrating a second example of the artificial photosynthesis module of the embodiment of the invention, and FIG. 9 is a schematic side sectional view illustrating a third example of the artificial photosynthesis module of the embodiment of the invention. In addition, in an artificial photosynthesis module 12a illustrated in FIG. 8 and an artificial photosynthesis module 12b illustrated in FIG. 9, the same components as those of the artificial photosynthesis module 12 illustrated in FIGS. 2 and 3 will be designated by the same reference signs, and the detailed description thereof will be omitted.

The artificial photosynthesis module 12a illustrated in FIG. 8 is different from the artificial photosynthesis module 12 illustrated in FIGS. 2 and 3 in the configuration of an oxygen generation electrode 60, and is the same as that of the artificial photosynthesis module 12 illustrated in FIG. 2 in the other configuration.

The oxygen generation electrode 60 is a comb-type electrode, a direction in which a second photocatalyst layer 61f of a second electrode portion 61a is tilted is opposite to that of the second photocatalyst layer 33f of the second electrode portion 33a of the oxygen generation electrode 32 illustrated in FIG. 2, in the direction D, and a back surface 61e of the second electrode portion 61a is directed to the diaphragm 34 and the flow direction F$_A$ of the electrolytic aqueous solution AQ. The first electrode portion 31a of the hydrogen generation electrode 30 and the second electrode portion 61a of the oxygen generation electrode 60 are tilted in different directions with respect to the flow direction F$_A$ of the electrolytic aqueous solution AQ. In addition, the oxygen generation electrode 60 has the same configuration as the oxygen generation electrode 32 except that the directions thereof are different from each other. The oxygen-generating co-catalyst (not illustrated) is provided on a surface of the second photocatalyst layer 61f. In the oxygen generation electrode 60, the surface of the second photocatalyst layer 61f is substantially a surface 61d of the second electrode portion 61a.

A tilt angle θ$_1$ of the second electrode portion 61a is the same angle as the tilt angle θ of the first electrode portion 31a of the hydrogen generation electrode 30. However, similar to the hydrogen generation electrode 30 and the oxygen generation electrode 32 that are illustrated in the above-described FIG. 2, the tilt angle θ of the first electrode portion 31a of the hydrogen generation electrode 30 may be different from the tilt angle θ$_1$ of the second electrode portion 61a of the oxygen generation electrode 60.

The tilt angle θ$_1$ is a tilt angle of the second photocatalyst layer 61f with respect to the flow direction F$_A$ of the electrolytic aqueous solution AQ and a tilt angle of the second photocatalyst layer 61f to the diaphragm 34, similar to the tilt angle θ, and is an angle formed between the horizontal line B and the surface 61d of the second electrode portion 61a. The tilt angle θ$_1$ is found similarly to the above-described tilt angle θ.

Similar to the tilt angle θ, the tilt angle θ$_1$ is preferably 5° or more and 45° or less, and more preferably, an upper limit value thereof is 30° or less. A lower limit value of the tilt angle θ$_1$ is, for example, 5°. In a case where the tilt angle θ$_1$ is 5° or more and 45° or less, a high electrolytic current can be obtained.

Additionally, in FIG. 8, any one of the first electrode portion 31a of the hydrogen generation electrode 30 and the second electrode portion 61a of the oxygen generation electrode 60 may be in a tilted state. That is, any one of the first electrode portion 31a of the hydrogen generation electrode 30 and the second electrode portion 61a of the oxygen generation electrode 60 may be constituted of, for example, a flat plate electrode. By tilting at least one electrode portion, as compared to the flat configuration in which both of the electrode portions are not tilted, the electrolytic current becomes high, and excellent energy conversion efficiency can be obtained.

The artificial photosynthesis module 12b illustrated in FIG. 9 is different from the artificial photosynthesis module 12 illustrated in FIGS. 2 and 3 in the configuration of a hydrogen generation electrode 62 and in a direction in which a first electrode portion 63a of the hydrogen generation electrode 62 is tilted, and is the same as that of the artificial photosynthesis module 12 illustrated in FIG. 2 in the other configuration.

The hydrogen generation electrode 62 is a comb-type electrode, the direction in which the first electrode portion 63a is tilted is opposite to that of the first electrode portion 31a of the hydrogen generation electrode 30 illustrated in FIG. 2, and a back surface 63e of the first electrode portion 63a is directed to the flow direction $F_A$ of the electrolytic aqueous solution AQ. The first electrode portion 63a of the hydrogen generation electrode 62 and the second electrode portion 33a of the oxygen generation electrode 32 are tilted in different directions with respect to the flow direction $F_A$ of the electrolytic aqueous solution AQ.

A tilt angle $\theta_2$ of the first electrode portion 63a is the same angle as the tilt angle $\theta$ of the first electrode portion 31a of the hydrogen generation electrode 30. However, similar to the hydrogen generation electrode 30 and the oxygen generation electrode 32 that are illustrated in the above-described FIG. 2, the tilt angle $\theta_2$ of the first electrode portion 63a of the hydrogen generation electrode 62 may be different from the tilt angle $\theta$ of the second electrode portion 33a of the oxygen generation electrode 32. The tilt angle $\theta_2$ is a tilt angle of the first photocatalyst layer 63f with respect to the flow direction $F_A$ of the electrolytic aqueous solution AQ and a tilt angle of the first photocatalyst layer 63f to the diaphragm 34, similar to the tilt angle $\theta$, and is an angle formed between the horizontal line B and a surface 63d of the first electrode portion 63a. Additionally, the tilt angle $\theta_2$ is found similarly to the above-described tilt angle $\theta$.

Similar to the tilt angle $\theta$, the tilt angle $\theta_2$ is preferably 5° or more and 45° or less, and more preferably, an upper limit value thereof is 30° or less. A lower limit value of the tilt angle $\theta_2$ is, for example, 5°. In a case where the tilt angle $\theta_2$ is 45° or less, a high electrolytic current can be obtained.

Additionally, in FIG. 9, any one of the first electrode portion 63a of the hydrogen generation electrode 62 and the second electrode portion 33a of the oxygen generation electrode 32 may be in a tilted state. That is, any one of the first electrode portion 63a of the hydrogen generation electrode 62 and the second electrode portion 33a of the oxygen generation electrode 32 may be constituted of, for example, a flat plate electrode. By tilting at least one electrode portion, as compared to the flat configuration in which both of the electrode portions are not tilted, the electrolytic current becomes high, and excellent energy conversion efficiency can be obtained.

In the configuration of FIG. 8, the first photocatalyst layer 31f of at least one first electrode portion 31a of the hydrogen generation electrode 30 or the second photocatalyst layer 61f of at least one second electrode portion 61a of the oxygen generation electrode 60 may be tilted with respect to the diaphragm 34 and the flow direction $F_A$ of the electrolytic aqueous solution AQ.

Even in the configuration of FIG. 8, it is preferable that the photocatalyst layer of 50% or more electrode portions among all the electrode portions of the hydrogen generation electrode 30 and the oxygen generation electrode 60 is tilted with respect to the flow direction $F_A$ of the electrolytic aqueous solution and the diaphragm 34. For example, in a case where the photocatalyst layer of all the electrode portions of one electrode of the hydrogen generation electrode 30 and the oxygen generation electrode 60 is tilted, the photocatalyst layer of 50% or more electrode portions is tilted.

Additionally, in the configuration of FIG. 9, the first photocatalyst layer 63f of at least one first electrode portion 63a of the hydrogen generation electrode 62 or the second photocatalyst layer 33f of at least one second electrode portion 33a of the oxygen generation electrode 32 may be tilted with respect to the diaphragm 34 and the flow direction $F_A$ of the electrolytic aqueous solution AQ.

Even in the configuration of FIG. 9, it is preferable that the photocatalyst layer of 50% or more electrode portions among all the electrode portions of the hydrogen generation electrode 62 and the oxygen generation electrode 32 is tilted with respect to the flow direction $F_A$ of the electrolytic aqueous solution AQ and the diaphragm 34. For example, in a case where the photocatalyst layer of all the electrode portions of one electrode of the hydrogen generation electrode 62 and the oxygen generation electrode 32 is tilted, the photocatalyst layer of 50% or more electrode portions is tilted.

As illustrated in FIG. 2, the first electrode portion 31a of the hydrogen generation electrode 30 and the second electrode portion 33a of the oxygen generation electrode 32 are formed in the flat plate shape. However, the invention is not limited to this, and a sectional shape may be a polygonal shape or may be a shape having a curved face.

Figure 10:
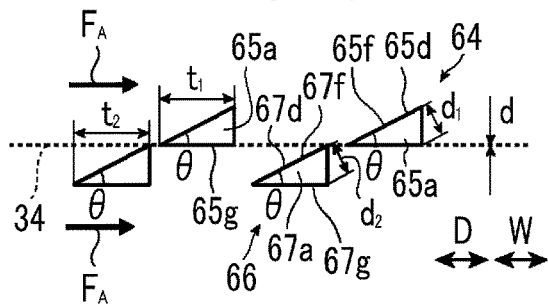
FIG. 10 is a schematic side view illustrating a first example of the electrode configuration of the artificial photosynthesis module of the embodiment of the invention.
Figure 11:
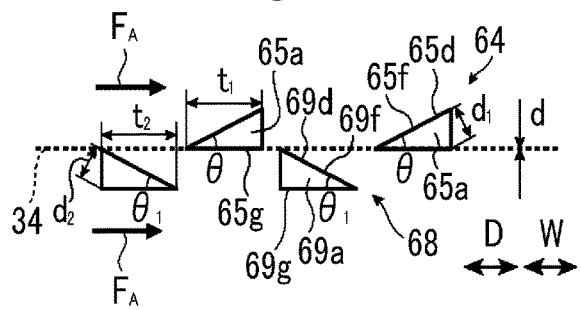
FIG. 11 is a schematic side view illustrating a second example of the electrode configuration of the artificial photosynthesis module of the embodiment of the invention.
Figure 12:
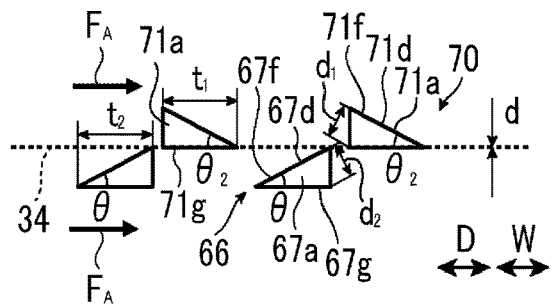
FIG. 12 is a schematic side view illustrating a third example of the electrode configuration of the artificial photosynthesis module of the embodiment of the invention.

Here, FIG. 10 is a schematic side view illustrating a first example of the electrode configuration of the artificial photosynthesis module of the embodiment of the invention here, FIG. 11 is a schematic side view illustrating a second example of the electrode configuration of the artificial photosynthesis module of the embodiment of the invention, and FIG. 12 is a schematic side view illustrating a third example of the electrode configuration of the artificial photosynthesis module of the embodiment of the invention.

In addition, in FIGS. 10 to 12, the same components as those of the artificial photosynthesis module 12 illustrated in FIGS. 2 and 3 will be designated by the same reference signs, and the detailed description thereof will be omitted.

A hydrogen generation electrode 64 and an oxygen generation electrode 66 illustrated in FIG. 10 correspond to the hydrogen generation electrode 30 and the oxygen generation electrode 32 of the artificial photosynthesis module 12 illustrated in FIG. 2.

The hydrogen generation electrode 64 is a comb-type electrode, and is the same as the hydrogen generation electrode 30 illustrated in FIG. 2 except that the configuration of a first electrode portion 65a is a right-angled triangular prism shape, as compared to the hydrogen generation electrode 30 illustrated in FIG. 2.

The oxygen generation electrode 66 is a comb-type electrode, and is the same as the oxygen generation electrode 32 illustrated in FIG. 2 except that the configuration of a second electrode portion 67a is a right-angled triangular prism shape, as compared to the oxygen generation electrode 32 illustrated in FIG. 2.

The hydrogen generation electrode 64 includes a first photocatalyst layer 65f, and the hydrogen-generating co-catalyst (not illustrated) is provided on a surface of the first photocatalyst layer 65f. In the hydrogen generation electrode 64, the surface of the first photocatalyst layer 65f is substantially a surface 65d of the first electrode portion 65a. The oxygen generation electrode 66 includes a second photocatalyst layer 67f, and the oxygen-generating co-catalyst (not illustrated) is provided on a surface of the second photocatalyst layer 67f. In the oxygen generation electrode 66, the surface of the second photocatalyst layer 67f is substantially a surface 67d of the second electrode portion 67a.

The first photocatalyst layer 65f of the first electrode portion 65a of the hydrogen generation electrode 64 and the second photocatalyst layer 67f of the second electrode portion 67a of the oxygen generation electrode 32 are tilted at the tilt angle θ with respect to the diaphragm 34 and the flow direction $F_A$ of the electrolytic aqueous solution AQ. The tilt angle θ of the hydrogen generation electrode 64 is an angle formed between a base 65g and the surface 65d.

The tilt angle θ of the oxygen generation electrode 32 is an angle formed between a base 67g and the surface 67d. The base 65g and the base 67g are equivalent to the above-described horizontal line B.

A hydrogen generation electrode 64 and an oxygen generation electrode 68 illustrated in FIG. 11 correspond to the hydrogen generation electrode 64 and the oxygen generation electrode 60 of the artificial photosynthesis module 12a illustrated in FIG. 8.

The hydrogen generation electrode 64 is a comb-type electrode, and is the same as the hydrogen generation electrode 30 illustrated in FIG. 8 except that the configuration of the first electrode portion 65a is a right-angled triangular prism shape, as compared to the hydrogen generation electrode 30 illustrated in FIG. 8.

The oxygen generation electrode 68 is a comb-type electrode, and is the same as the oxygen generation electrode 60 illustrated in FIG. 8 except that the configuration of a second electrode portion 69a is a right-angled triangular prism shape, as compared to the oxygen generation electrode 60 illustrated in FIG. 8.

The oxygen generation electrode 68 includes a second photocatalyst layer 69f, and the oxygen-generating co-catalyst (not illustrated) is provided on a surface of the second photocatalyst layer 69f. In the oxygen generation electrode 68, the surface of the second photocatalyst layer 69f is substantially a surface 69d of the second electrode portion 69a.

The direction of the first photocatalyst layer 65f of the first electrode portion 65a of the hydrogen generation electrode 64 and the direction of the second photocatalyst layer 69f of the second electrode portion 69a of the oxygen generation electrode 68 are opposite to each other in the direction D.

The first photocatalyst layer 65f of the first electrode portion 65a of the hydrogen generation electrode 64 is tilted at the tilt angle θ with respect to the diaphragm 34 and the flow direction $F_A$ of the electrolytic aqueous solution AQ. The tilt angle θ of the hydrogen generation electrode 64 is an angle formed between the base 65g and the surface 65d. The base 65g is equivalent to the above-described horizontal line B.

The second photocatalyst layer 69f of the second electrode portion 69a of the oxygen generation electrode 68 is tilted at the tilt angle $θ_1$ with respect to the diaphragm 34 and the flow direction $F_A$ of the electrolytic aqueous solution AQ. The second photocatalyst layer 69f of the second electrode portion 69a is disposed in the direction opposite to the flow direction $F_A$ of the electrolytic aqueous solution AQ in the direction D.

The tilt angle $θ_1$ of the oxygen generation electrode 68 is an angle formed between a base 69g and the surface 69d. The base 69g is equivalent to the above-described horizontal line B.

A tilt angle $θ_1$ of the second electrode portion 69a is the same angle as the tilt angle θ of the first electrode portion 65a of the hydrogen generation electrode 64. However, similar to the hydrogen generation electrode 64 and the oxygen generation electrode 32 that are illustrated in the above-described FIG. 2, the tilt angle θ of the first electrode portion 65a of the hydrogen generation electrode 64 may be different from the tilt angle $θ_1$ of the second electrode portion 69a of the oxygen generation electrode 68.

A hydrogen generation electrode 70 and an oxygen generation electrode 66 illustrated in FIG. 12 correspond to the hydrogen generation electrode 64 and the oxygen generation electrode 60 of the artificial photosynthesis module 12a illustrated in FIG. 9.

The hydrogen generation electrode 70 is a comb-type electrode, and is the same as the hydrogen generation electrode 62 illustrated in FIG. 9 except that the configuration of a first electrode portion 71a is a right-angled triangular prism shape, as compared to the hydrogen generation electrode 62 illustrated in FIG. 9.

The oxygen generation electrode 66 is a comb-type electrode, and is the same as the oxygen generation electrode 32 illustrated in FIG. 9 except that the configuration of the second electrode portion 67a is a right-angled triangular prism shape, as compared to the oxygen generation electrode 32 illustrated in FIG. 9.

The hydrogen generation electrode 70 includes a first photocatalyst layer 71f, and the hydrogen-generating co-catalyst (not illustrated) is provided on a surface of the first photocatalyst layer 71f. In the hydrogen generation electrode 70, the surface of the first photocatalyst layer 71f is substantially a surface 71d of the first electrode portion 71a.

The direction of the surface 71d of the first electrode portion 71a of the hydrogen generation electrode 70 and the direction of the surface 67d of the second electrode portion 67a of the oxygen generation electrode 66 are opposite to each other in the direction D.

The first photocatalyst layer 71f of the first electrode portion 71a of the hydrogen generation electrode 70 is tilted at the tilt angle $θ_2$ with respect to the diaphragm 34 and the flow direction $F_A$ of the electrolytic aqueous solution AQ. The first photocatalyst layer 71f of the first electrode portion 71a is disposed in the direction opposite to the flow direction $F_A$ of the electrolytic aqueous solution AQ in the direction D. The tilt angle $θ_2$ of the hydrogen generation electrode 70 is an angle formed between a base 71g and the surface 71d. The base 71g is equivalent to the above-described horizontal line B.

The second photocatalyst layer 67f of the second electrode portion 67a of the oxygen generation electrode 66 is tilted at the tilt angle θ with respect to the diaphragm 34 and the flow direction $F_A$ of the electrolytic aqueous solution AQ. The tilt angle θ of the oxygen generation electrode 66 is an angle formed between the base 67g and the surface 67d as described above. The base 67g is equivalent to the above-described horizontal line B.

The tilt angle $θ_2$ of the first photocatalyst layer 71f of the first electrode portion 71a is the same angle as the tilt angle θ of the first electrode portion 63a of the hydrogen generation electrode 62. However, similar to the hydrogen generation electrode 30 and the oxygen generation electrode 32 that are illustrated in the above-described FIG. 2, the tilt angle $θ_2$ of the first electrode portion 71a of the hydrogen generation electrode 70 may be different from the tilt angle θ of the second electrode portion 66a of the oxygen generation electrode 66.

In FIGS. 10 to 12, the width $t_1$ of a first electrode portion and the width $t_2$ of a second electrode portion are the lengths of surfaces, respectively. Additionally, since the first electrode portion and the second electrode portion have the right-angled triangular prism shape, the thickness $d_1$ of the first electrode portion and the thickness $d_2$ of the second electrode portion are equivalent to the height of a right-angled triangular shape.

In FIGS. 10 to 12, any one of the first electrode portion of the hydrogen generation electrode and the second electrode portion of the oxygen generation electrode may be in a tilted state. That is, any one of the first electrode portion of the hydrogen generation electrode and the second electrode portion of the oxygen generation electrode may be constituted of, for example, a flat plate electrode. By tilting at least one electrode portion, as compared to the flat configuration in which both of the electrode portions are not tilted, the electrolytic current becomes high, and excellent energy conversion efficiency can be obtained.

In addition, in the configurations of FIGS. 10 to 12, the first photocatalyst layer of at least one first electrode portion of the hydrogen generation electrode or the second photocatalyst layer of at least one second electrode portion of the oxygen generation electrode may be tilted with respect to the diaphragm 34 and the flow direction $F_A$ of the electrolytic aqueous solution AQ.

There are configurations shown below in addition to the configurations illustrated in the above FIGS. 10 to 12.

Figure 13:
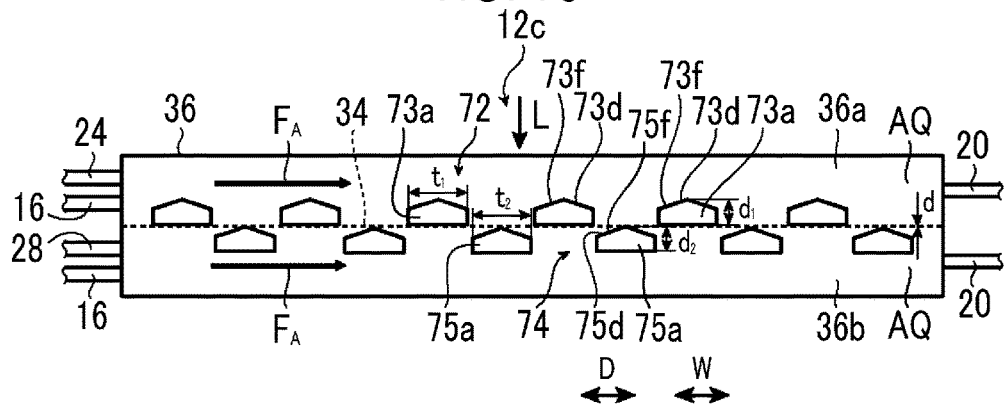
FIG. 13 is a schematic side sectional view illustrating a fourth example of the artificial photosynthesis module of the embodiment of the invention.
Figure 14:
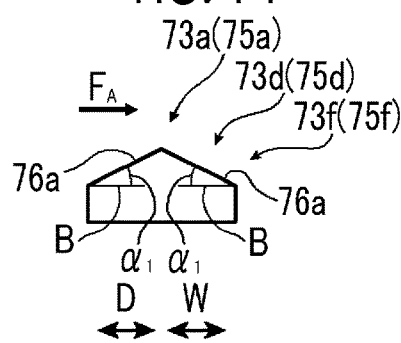
FIG. 14 is a schematic view illustrating an electrode configuration of the fourth example of the artificial photosynthesis module of the embodiment of the invention.
Figure 15:
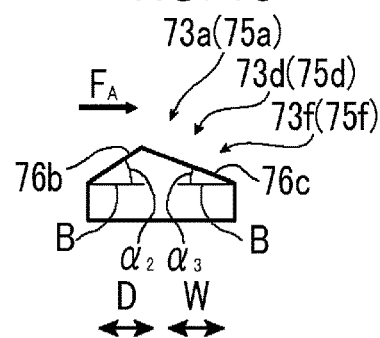
FIG. 15 is a schematic view illustrating a first example of the electrode configuration of the fourth example of the artificial photosynthesis module of the embodiment of the invention.
Figure 16:
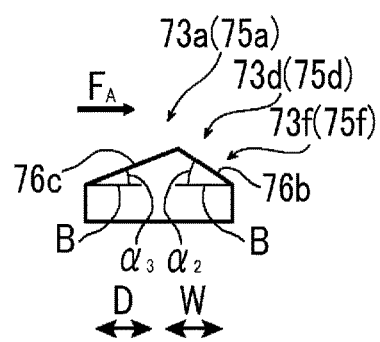
FIG. 16 is a schematic view illustrating a second example of the electrode configuration of the fourth example of the artificial photosynthesis module of the embodiment of the invention.
Figure 17:
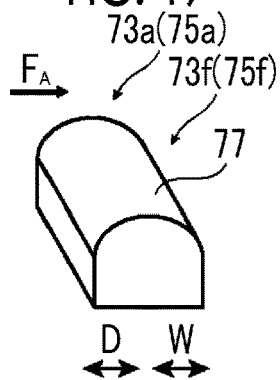
FIG. 17 is a schematic perspective view illustrating a third example of the electrode configuration of the fourth example of the artificial photosynthesis module of the embodiment of the invention.
Figure 18:
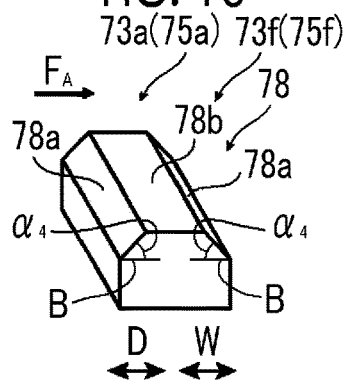
FIG. 18 is a schematic perspective view illustrating a fourth example of the electrode configuration of the fourth example of the artificial photosynthesis module of the embodiment of the invention.
Figure 19:
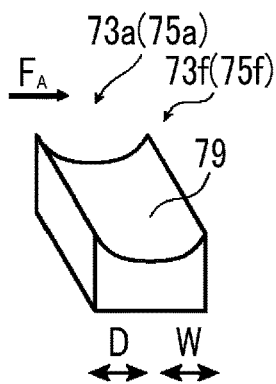
FIG. 19 is a schematic perspective view illustrating a fifth example of the electrode configuration of the fourth example of the artificial photosynthesis module of the embodiment of the invention.
Figure 20:
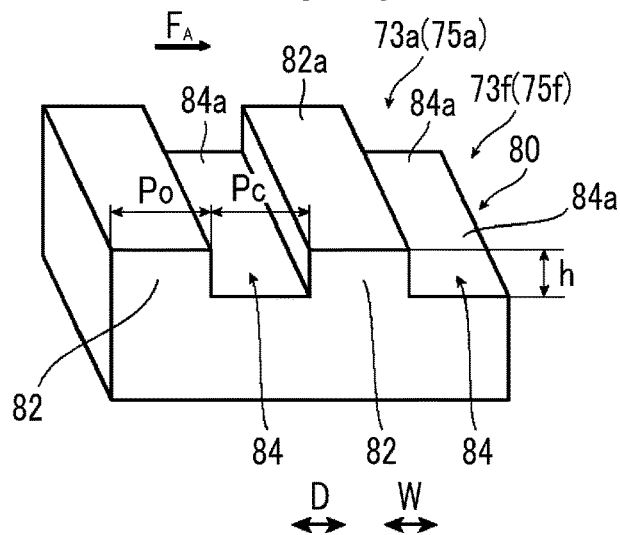
FIG. 20 is a schematic perspective view illustrating a sixth example of the electrode configuration of the fourth example of the artificial photosynthesis module of the embodiment of the invention.
Figure 21:
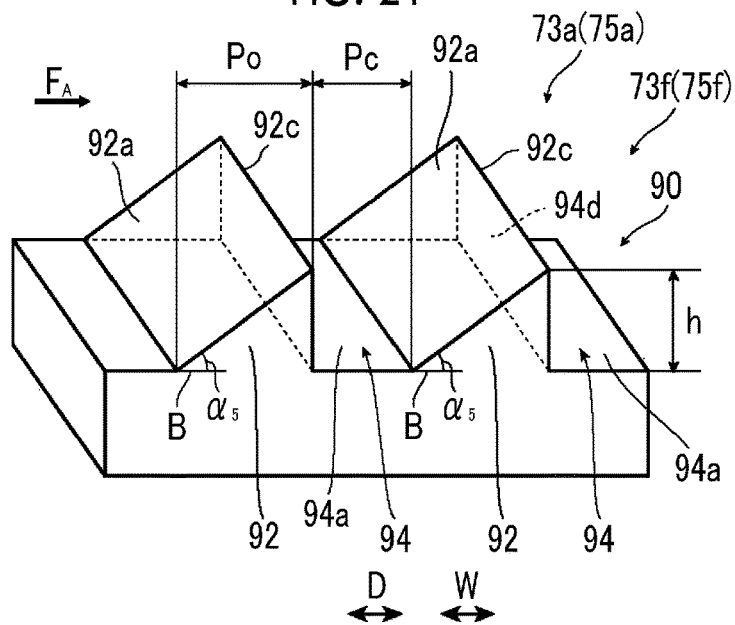
FIG. 21 is a schematic perspective view illustrating a seventh example of the electrode configuration of the fourth example of the artificial photosynthesis module of the embodiment of the invention.

FIG. 13 is a schematic side sectional view illustrating a fourth example of the artificial photosynthesis module of the embodiment of the invention. FIG. 14 is a schematic view illustrating an electrode configuration of the fourth example of the artificial photosynthesis module of the embodiment of the invention, FIG. 15 is a schematic view illustrating a first example of the electrode configuration of the fourth example of the artificial photosynthesis module, FIG. 16 is a schematic view illustrating a second example of the electrode configuration of the fourth example of the artificial photosynthesis module, FIG. 17 is a schematic perspective view illustrating a third example of the electrode configuration of the fourth example of the artificial photosynthesis module, FIG. 18 is a schematic perspective view illustrating a fourth example of the electrode configuration of the fourth example of the artificial photosynthesis module, FIG. 19 is a schematic perspective view illustrating a fifth example of the electrode configuration of the fourth example of the artificial photosynthesis module, FIG. 20 is a schematic perspective view illustrating a sixth example of the electrode configuration of the fourth example of the artificial photosynthesis module of the embodiment of the invention, and FIG. 21 is a schematic perspective view illustrating a seventh example of the electrode configuration of the fourth example of the artificial photosynthesis module of the embodiment of the invention.

In addition, in an artificial photosynthesis module 12c illustrated in FIG. 13, the same components as those of the artificial photosynthesis module 12 illustrated in FIGS. 2 and 3 will be designated by the same reference signs, and the detailed description thereof will be omitted.

Additionally, in FIGS. 14 to 21, the same components as those of the artificial photosynthesis module 12 illustrated in FIGS. 2 and 3 will be designated by the same reference signs, and the detailed description thereof will be omitted.

A hydrogen generation electrode 72 includes a first photocatalyst layer 73f, and a surface 73d of a first electrode portion 73 is a surface of the first photocatalyst layer 73f. An oxygen generation electrode 74 includes a second photo-catalyst layer 75f, and a surface 75d of a second electrode portion 75a is a surface of the second photocatalyst layer 75f.

The artificial photosynthesis module 12c illustrated in FIG. 13 is different from the artificial photosynthesis module 12 illustrated in FIGS. 2 and 3 in the configuration of the hydrogen generation electrode 72 and the oxygen generation electrode 74, and is the same as the artificial photosynthesis module 12 illustrated in FIG. 2 in the other configuration.

Although the hydrogen generation electrode 72 is a comb-type electrode, the hydrogen generation electrode 72 is not constituted of a flat plate shape but has an isosceles triangular prism shape on the incident ray L side of a first electrode portion 73a. The first electrode portion 73a of the hydrogen generation electrode 72 has the surface 73d that is not flat, protrudes, for example, in an isosceles triangular prism shape, and is an electrode portion that is convex with respect to the flow direction $F_A$ of the electrolytic aqueous solution AQ. That is, the surface of the first photocatalyst layer 73f is convex.

A tilted face 76a of the isosceles triangular prism is equivalent to the surface 31d of the hydrogen generation electrode 30 of the artificial photosynthesis module 12 illustrated in FIGS. 2 and 3.

A tilt angle $\alpha_1$ is an angle formed between the horizontal line B and each tilted face 76a, similar to the tilt angle $\theta$.

The tilt angle $\alpha_1$ of the tilted face 76a of the isosceles triangular prism illustrated in FIG. 14 is equivalent to the tilt angle $\theta$ of the first photocatalyst layer 31f of the hydrogen generation electrode 30. Similar to the tilt angle $\theta$, each tilt angle $\alpha_1$ is preferably 5° or more and 45° or less, and more preferably, an upper limit value thereof is 30° or less. A lower limit value of the tilt angle $\alpha_1$ is, for example, 5°. In a case where the tilt angle $\alpha_1$ is 45° or less, a high electrolytic current can be obtained.

Although the oxygen generation electrode 74 is a comb-type electrode, the oxygen generation electrode 74 is not constituted of a flat plate shape but has an isosceles triangular prism shape on the incident ray L side of a second electrode portion 75a. The second electrode portion 75a of the oxygen generation electrode 74 has the surface 75d that is not flat, protrudes, for example, in an isosceles triangular prism shape, and is an electrode portion that is convex with respect to the flow direction $F_A$ of the electrolytic aqueous solution AQ. That is, the surface of the second photocatalyst layer 75f is convex.

The tilted face 76a of the isosceles triangular prism is equivalent to the surface 33d of the oxygen generation electrode 32 of the artificial photosynthesis module 12 illustrated in FIGS. 2 and 3.

The tilt angle $\alpha_1$ of the tilted face 76a of the isosceles triangular prism is equivalent to the tilt angle $\theta$ of the surface 33d of the hydrogen generation electrode 30. Similar to the tilt angle $\alpha$, each tilt angle $\alpha_1$ is preferably 5° or more and 45° or less, and more preferably, an upper limit value thereof is 30° or less. A lower limit value of the tilt angle $\alpha_1$ is, for example, 5°. In a case where the tilt angle $\alpha_1$ is 45° or less, a high electrolytic current can be obtained.

In the hydrogen generation electrode 72 and the oxygen generation electrode 74, in a case where the width of the first electrode portion 73a is defined as $t_1$ and the width of the second electrode portion 75a is defined as $t_3$, it is preferable that the width $t_1$ of the first electrode portion 73a and the width $t_3$ of the second electrode portion 75a are 10 μm to 10 mm.

Additionally, it is preferable that both the thickness $d_1$ of the first electrode portion 73a and the thickness $d_2$ of the second electrode portion 75a are 1 mm or less.

In addition, since the width $t_1$ of the first electrode portion 73a is the same as the width $t_1$ of the above-described first electrode portion 31a, the detailed description thereof will be omitted. Since the width $t_3$ of the second electrode portion 75a is the same as the width $t_2$ of the above-described second electrode portion 33a, the detailed description thereof will be omitted.

In the first electrode portion 73a of the hydrogen generation electrode 72 and the second electrode portion 75a of the oxygen generation electrode 74 illustrated in FIG. 14, the tilt angles $\alpha_1$ of the tilted faces 76a are the same as each other. However, the invention is not limited to this. As illustrated in FIGS. 15 and 16, a tilted face 76b of a tilt angle $\alpha_2$ and the tilted face 76c of a tilt angle $\alpha_3$ that is a different angle may be used in combination. In addition, in FIG. 14, the tilted face 76a is equivalent to the first photocatalyst layer 73f and is equivalent to the second photocatalyst layer 75f. In FIGS. 15 and 16, tilted faces 76b and 76c are equivalent to the first photocatalyst layer 73f and is equivalent to the second photocatalyst layer 75f.

The tilt angles $\alpha_2$ and $\alpha_3$ are the same as the tilt angle $\theta$, and the tilt angles $\alpha_2$ and $\alpha_3$ are angles formed between the horizontal line B and the tilted face 76a.

Similar to the tilt angle $\theta$, the tilt angles $\alpha_2$ and $\alpha_3$ are preferably 5° or more and 45° or less, and more preferably, upper limit values thereof are 30° or less. Lower limit values of the tilt angles $\alpha_2$ and $\alpha_3$ are, for example, 5°. In a case where the tilt angles $\alpha_2$ and $\alpha_3$ is 45° or less, a high electrolytic current can be obtained.

As illustrated in FIG. 17, a surface of the first photocatalyst layer 73f of the hydrogen generation electrode 72 and a surface of the second photocatalyst layer 75f of the oxygen generation electrode 74 may be a convexly curved face 77. The curved face 77 is equivalent to the surface 31d of the first electrode portion 31a of the hydrogen generation electrode 30 and the surface 33d of the second electrode portion 33a of the oxygen generation electrode 32 in the artificial photosynthesis module 12 illustrated in FIG. 2.

Additionally, as illustrated in FIG. 18, the first photocatalyst layer 73f of the hydrogen generation electrode 72 and the second photocatalyst layer 75f of the oxygen generation electrode 74 may be constituted of a polygonal prism 78, and may have three or more faces. In this case, the polygonal prism 78 is constituted of two tilted faces 78a and a plane 78b, and the tilted faces 78a are equivalent to the surface 31d of the first electrode portion 31a of the hydrogen generation electrode 30 and the surface 33d of the second electrode portion 33a of the oxygen generation electrode 32 in the artificial photosynthesis module 12 illustrated in FIG. 2.

A tilt angle $\alpha_4$ is an angle formed between the horizontal line B and each tilted face 78a, similar to the tilt angle $\theta$.

Moreover, the surfaces may be concave with respect to the flow direction $F_A$ of the electrolytic aqueous solution AQ. As illustrated in FIG. 19, the surface of the first photocatalyst layer 73f of the hydrogen generation electrode 72 and the surface of the second photocatalyst layer 75f of the oxygen generation electrode 74 may be a concave surface 79. The concave surface 79 is equivalent to the surface 31d of the first electrode portion 31a of the hydrogen generation electrode 30 and the surface 33d of the second electrode portion 33a of the oxygen generation electrode 32 in the artificial photosynthesis module 12 illustrated in FIG. 2.

A configuration in which a projecting part is provided on the surface of the first photocatalyst layer 73f of at least one first electrode portion 73a of the hydrogen generation electrode 72 or the surface of the second photocatalyst layer 75f of at least one second electrode portion 75a of the oxygen generation electrode 74 may be adopted. Hereinafter, the projecting part will be described. The projecting part may have a periodic structure in which the height from the surface changes periodically with respect to the flow direction $F_A$ of the electrolytic aqueous solution AQ.

The projecting part 80 illustrated in FIG. 20 has protrusions 82 and recesses 84 are repeatedly provided with respect to the flow direction $F_A$ of the electrolytic aqueous solution AQ, and has a rectangular irregular structure. A surface 82a of each protrusion 82 is a face parallel to the flow direction $F_A$ of the electrolytic aqueous solution AQ. A surface 84a of each recess 84 is a face parallel to the flow direction $F_A$ of the electrolytic aqueous solution AQ. An outer surface including the surface 82a of the protrusion 82 and the surface 84a of the recess 84 are equivalent to the first photocatalyst layer 73f and the second photocatalyst layer 75f in FIG. 20.

In the projecting part 80, the protrusions 82 are disposed on an upstream side in the flow direction $F_A$. However, the invention is not limited to this, the protrusions 82 and the recesses 84 may be replaced with each other, and the recesses 84 may be disposed on the upstream side in the flow direction $F_A$.

The numbers of protrusions 82 and recesses 84 in the projecting part 80 may be at least one, respectively, and the number of protrusions 82 and the number of recesses 84 may be the same as each other or may be different from each other. Additionally, a length Po of each protrusion 82 in the flow direction $F_A$ of the electrolytic aqueous solution AQ and a length Pc of each recess 84 in the flow direction $F_A$ of the electrolytic aqueous solution AQ may be the same as each other or may be different from each other. The length Po of the protrusion 82 in the flow direction $F_A$ of the electrolytic aqueous solution AQ and the length Pc of the recess 84 in the flow direction $F_A$ of the electrolytic aqueous solution AQ are the pitch of the projecting part 80 with respect to the flow direction $F_A$ of the electrolytic aqueous solution AQ. It is preferable that at least one of the length Po or the length Pc is 1.0 mm or more and less than 10 mm.

In a case where at least one of the length Po of the protrusion 82 in the flow direction $F_A$ of the electrolytic aqueous solution AQ or the length Pc of the recess 84 in the flow direction $F_A$ of the electrolytic aqueous solution AQ is 1.0 mm or more and less than 10 mm, a high electrolytic current can be obtained.

Additionally, a height h of the projecting part 80 from the surface 84a of the recess 84 is 0.1 mm or more and less than 1.0 mm. One in which the height of the irregularities, that is, the height h is 0.1 mm or more is the projecting part 80. The above-described height h is a distance from the surface 84a of the recess 84 to the surface 82a of the protrusion 82. In a case where the height h is 0.1 mm or more and less than 1.0 mm, a high electrolytic current can be obtained.

A method of measuring the length Po of the protrusion 82 of the projecting part 80 in the flow direction $F_A$ of the electrolytic aqueous solution AQ, the length Pc of the recess 84 of the projecting part 80 in the flow direction $F_A$ of the electrolytic aqueous solution AQ, and the above-described height h will be described. First, a digital image is acquired from a side surface direction of the projecting part 80, the digital image is taken into the personal computer and displayed on the monitor, lines of locations corresponding to the length Po, the length Pc, and the above-described height h on the monitor are drawn, and the lengths of the respective lines are found. Accordingly, the length Po, the length Pc, and the above-described height h can be obtained.

Additionally, one having the periodic structure in which the height from the surface changes periodically with respect to the flow direction $F_A$ of the electrolytic aqueous solution AQ may be a projecting part 90 illustrated in FIG. 21.

In the projecting part 90, protrusions 92 and recesses 94 are repeatedly provided with respect to the flow direction $F_A$ of the electrolytic aqueous solution AQ. Each protrusion 92 has a tilted face 92a tilted with respect to the flow direction $F_A$ of the electrolytic aqueous solution AQ. A surface 94a of each recess 94 is a face parallel to the flow direction $F_A$ of the electrolytic aqueous solution AQ. The tilted face 92a and a face 94d of the protrusion 92, and the surface 94a of the recess 94 are equivalent to the first photocatalyst layer 73f and the second photocatalyst layer 75f in FIG. 21. Although the face 94d is a face perpendicular to the surface 94a of the recess 94, the invention is not limited to this, and the face 94d may not be perpendicular.

In the projecting part 90, the tilted face 92a tilted with respect to the flow direction $F_A$ of the electrolytic aqueous solution AQ is adopted. However, the invention is not limited to this, and the face 94d perpendicular to the protrusion 92 may be disposed toward the flow direction $F_A$.

The numbers of protrusions 92 and recesses 94 in the projecting part 90 may be at least one, respectively, and the number of protrusions 92 and the number of recesses 94 may be the same as each other or may be different from each other. Additionally, the length Po of each protrusion 92 in the flow direction $F_A$ of the electrolytic aqueous solution AQ and the length Pc of each recess 94 in the flow direction $F_A$ of the electrolytic aqueous solution AQ may be the same as each other or may be different from each other. The length Po of the protrusion 92 in the flow direction $F_A$ of the electrolytic aqueous solution AQ and the length Pc of the recess 94 in the flow direction $F_A$ of the electrolytic aqueous solution AQ are the pitch with respect to the flow direction $F_A$ of the electrolytic aqueous solution AQ. It is preferable that at least one of the length Po or the length Pc is 1.0 mm or more and less than 10 mm.

In a case where at least one of the length Po of the protrusion 92 in the flow direction $F_A$ of the electrolytic aqueous solution AQ or the length Pc of the recess 94 in the flow direction $F_A$ of the electrolytic aqueous solution AQ is 1.0 mm or more and less than 10 mm, a high electrolytic current can be obtained.

The height h of the projecting part 90 from the surface 94a of the recess 94 is 0.1 mm or more and less than 1.0 mm. One in which the height of the irregularities, that is, the height h is 0.1 mm or more is the projecting part 90. The above-described height h is a distance from the surface 94a of the recess 94 to a side 92c of the tilted face 92a of the protrusion 92. In a case where the height h is 0.1 mm or more and less than 1.0 mm, a high electrolytic current can be obtained.

Additionally, a tilt angle as of the tilted face 92a is the same as the tilt angle θ, and the tilt angle $α_5$ is an angle formed between the horizontal line B and the tilted face 92a. Similar to the tilt angle θ, the tilt angle as is preferably 5° or more and 45° or less, and more preferably, an upper limit value thereof is 30° or less. A lower limit value of the tilt angle $α_5$ is, for example, 5°. In a case where the tilt angle as is 45° or less, a high electrolytic current can be obtained.

In addition, since a method of measuring the length Po of the protrusion 92 of the projecting part 90 in the flow direction $F_A$ of the electrolytic aqueous solution AQ, the length Pc of the recess 94 of the projecting part 90 in the flow direction $F_A$ of the electrolytic aqueous solution AQ, and the above-described height h will be described is the same as that of the length Po, the length Pc and the above-described height h of the above-described projecting part 80, the detailed description thereof will be omitted.

Additionally, a periodic structure in which a plurality of electrode portions in each of the electrode configurations illustrated in the above FIGS. 14 to 19 are disposed side by side in the flow direction $F_A$ of the electrolytic aqueous solution AQ, and the height from the surface changes periodically with respect to the flow direction $F_A$ of the above-described electrolytic aqueous solution AQ may be adopted.

Electrode portions in each of the electrode configurations illustrated in the above FIGS. 13 to 21 may be configured to be tilted with respect with respect to the flow direction $F_A$ of the electrolytic aqueous solution AQ.

In FIG. 13, the width $t_1$ of the first electrode portion 73a and the width $t_2$ of the second electrode portion 75a are respectively the same as the width $t_1$ of the above-described first electrode portion 31a, and the width $t_2$ of the above-described second electrode portion 33a, and are lengths in the flow direction $F_A$ of the electrolytic aqueous solution AQ. Additionally, the thickness $d_1$ of the first electrode portion 73a and the thickness $d_2$ of the second electrode portion 75a are maximum lengths in the direction orthogonal to the flow direction $F_A$ of the electrolytic aqueous solution AQ.

In addition, in all the above-described first electrode portions and second electrode portions, as a micro surface shape of the surfaces of the first electrode portions and the surfaces of the second electrode portions that are in contact with the electrolytic aqueous solution AQ, it is preferable that the surfaces are rough rather than being flat such that a plurality of projections are present on the surfaces. Due to the rough surfaces, the flow of the electrolytic aqueous solution AQ on the surfaces can be disturbed, a high electrolytic current can be obtained, and excellent energy conversion efficiency can be obtained. In addition, the surfaces of the first electrode portions and the surfaces of the second electrode portion not including the above-described projecting parts 80 and 90 and the surfaces of the above-described first electrode portions and the surfaces of the above-described second electrode portion being rough means that the height of the irregularities is less than 0.1 mm even though there are irregularities. Regarding a boundary between the irregularities of the shape and the irregularities of the roughness, the height of the irregularities is 0.1 mm. Additionally, as compared to a curved face, corner parts, such as edges, have a significant effect of disturbing the flow of the electrolytic aqueous solution AQ and easily obtain a high electrolytic current. Therefore, in all the above-described first electrode portions and second electrode portions, it is preferable that there are corner parts with respect to the flow direction $F_A$ of the electrolytic aqueous solution AQ.

Next, a fifth example of the artificial photosynthesis module will be described in detail.

Figure 22:
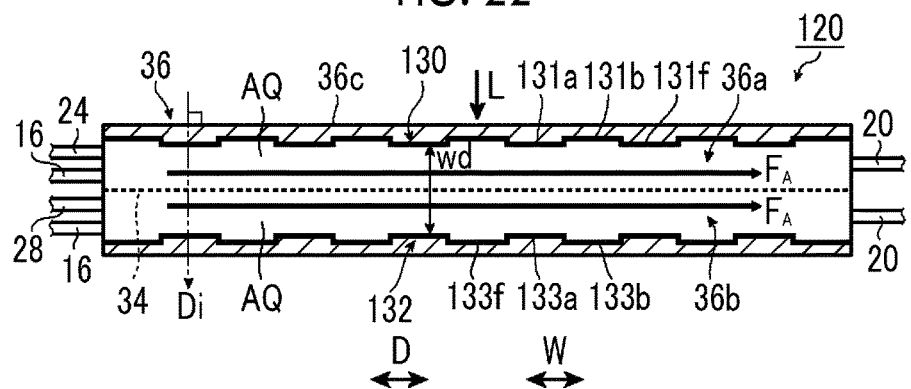
FIG. 22 is a schematic side sectional view illustrating a fifth example of the artificial photosynthesis module of the embodiment of the invention.
Figure 23:
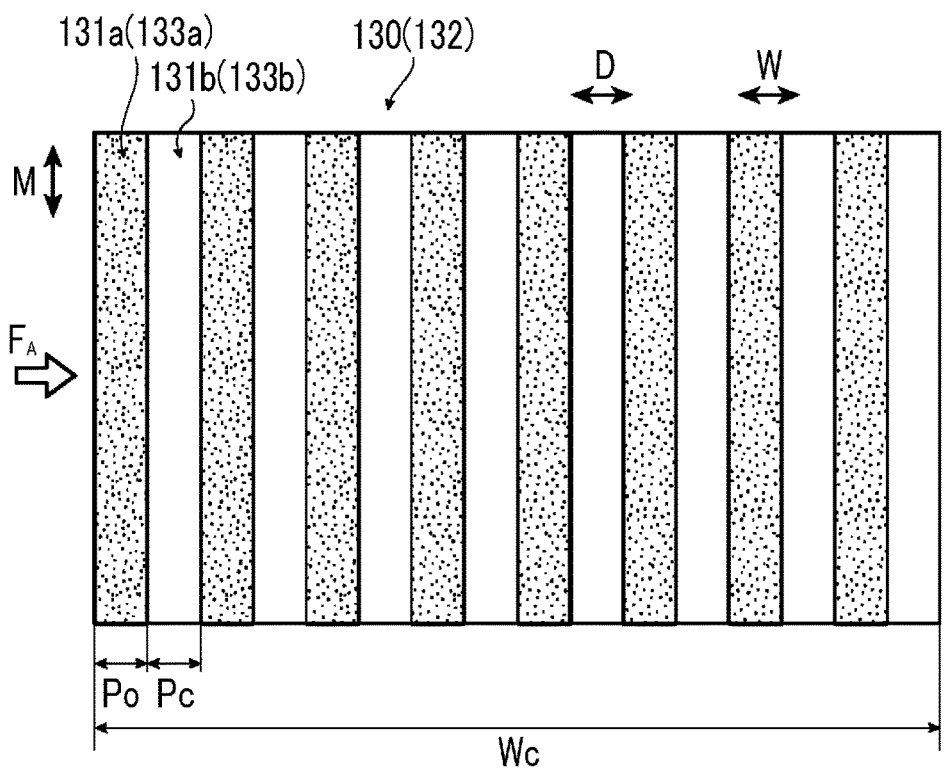
FIG. 23 is a schematic plan view illustrating an electrode configuration of the fifth example of the artificial photosynthesis module of the embodiment of the invention.
Figure 24:
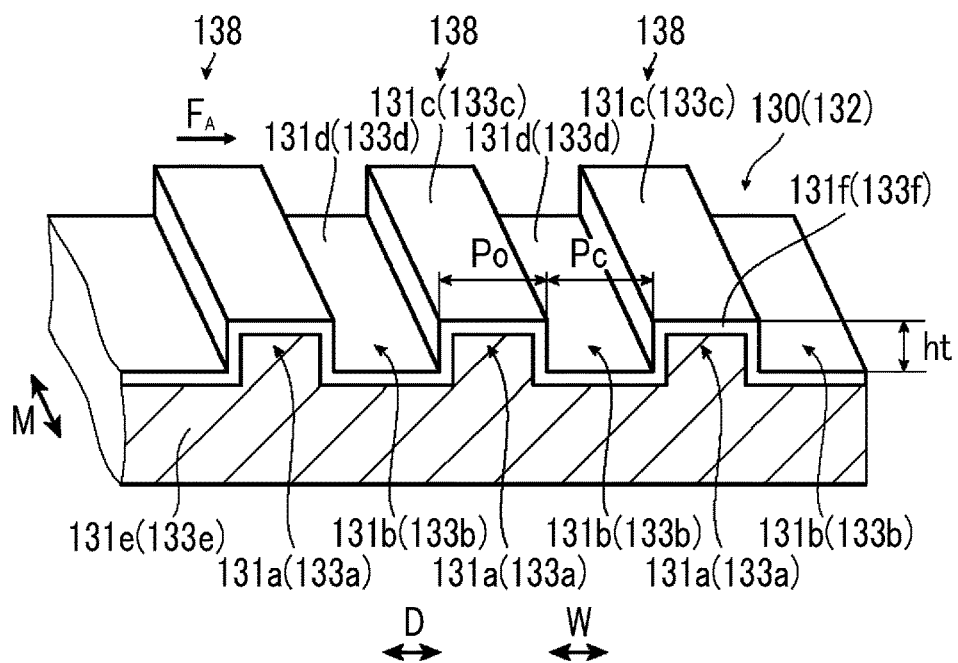
FIG. 24 is a schematic perspective view illustrating the electrode configuration of the fifth example the artificial photosynthesis module of the embodiment of the invention.

FIG. 22 is a schematic side sectional view illustrating the fifth example of the artificial photosynthesis module of the embodiment of the invention, FIG. 23 is a schematic plan view illustrating an electrode configuration of the fifth example of the artificial photosynthesis module of the embodiment of the invention, and FIG. 24 is a schematic perspective view illustrating the electrode configuration of the fifth example of the artificial photosynthesis module of the embodiment of the invention.

In addition, in an artificial photosynthesis module 120 illustrated in FIG. 22, the same components as those of the artificial photosynthesis module 12 illustrated in FIG. 2 will be designated by the same reference signs, and the detailed description thereof will be omitted.

As illustrated in FIG. 22, the artificial photosynthesis module 120 has a hydrogen generation electrode 130 and an oxygen generation electrode 132. The container 36 is disposed, for example, on the horizontal plane.

The hydrogen generation electrode 130 and the oxygen generation electrode 132 are housed within the container 36, and the hydrogen generation electrode 130 and the oxygen generation electrode 132 are disposed in series in a traveling direction Di of the incident ray L. The diaphragm 34 is disposed between the hydrogen generation electrode 130 and the oxygen generation electrode 132. The diaphragm 34, for example, is disposed in a planar shape in a state where the diaphragm 34 extends in the direction parallel to the direction W within the container 36. The hydrogen generation electrode 130, the diaphragm 34, and the oxygen generation electrode 132 are disposed in this order from the incident ray L side. The traveling direction Di of the incident ray L is a direction perpendicular to a surface 36c of the container 36.

It is preferable that a spacing Wd between the hydrogen generation electrode 130 and the oxygen generation electrode 132 is narrower because efficiency becomes higher as the spacing is narrower. Specifically, it is preferable that the spacing Wd is 1 mm to 20 mm.

As illustrated in FIG. 23, both the hydrogen generation electrode 130 and the oxygen generation electrode 132 are planar electrodes, and are referred to as so-called solid electrodes although there is a surface structure. The hydrogen generation electrode 130 and the oxygen generation electrode 132 have almost the same size. As seen from the incidence side of the incident ray L, the oxygen generation electrode 132 and the hydrogen generation electrode 130 overlap each other.

In addition, a surface of the oxygen generation electrode 132 and a surface of the hydrogen generation electrode 130 do not have irregularities having a height of 0.1 mm or more, respectively. In a case where the height of the irregularities is 0.1 mm or more, the irregularities correspond to a projecting part 138 to be described below, and are not the surface of the hydrogen generation electrode 130 and the surface of the oxygen generation electrode 132. In a case where the height of the irregularities is less than 0.1 mm, even in a case where there are irregularities on a photocatalyst particle surface, irregularities on a photocatalyst layer surface, or the like, these irregularities are neglected and are regarded as the surface of the oxygen generation electrode 132 and the surface of the hydrogen generation electrode 130. The height of 0.1 mm means that the height from the surface is 0.1 mm, and means that a height ht to be described below is 0.1 mm.

The hydrogen generation electrode 130 and the oxygen generation electrode 132 are provided with, for example, at least one projecting part that protrudes with respect to a conductive layer surface of a conductive layer. A plurality of the projecting parts may be provided with respect to the flow direction $F_A$ (to be described below) of the electrolytic aqueous solution AQ. The projecting part may have a periodic structure in which the height from the surface changes periodically with respect to the flow direction $F_A$ of the electrolytic aqueous solution AQ.

As illustrated in FIGS. 22 and 23, in the hydrogen generation electrode 130, for example, protrusions 131a and recesses 131b that are the projecting part 138 are alternately disposed with respect to the direction D. Additionally, in the oxygen generation electrode 132, for example, protrusions 133a and recesses 133b that are the projecting part 138 are alternately disposed with respect to the direction D. The direction D is an arrangement direction of the protrusions 131a and the recesses 131b, and is an arrangement direction of the protrusions 133a and the recesses 133b. In addition, the direction D is a direction parallel to the above-described direction W.

The protrusions 131a and the recesses 131b of the hydrogen generation electrode 130, and the protrusions 133a and the recesses 133b of the oxygen generation electrode 132 can be formed, for example, as follows.

First, irregular grooves are formed in a surface of a titanium or Ni electrode base material by machining, such as cutting, and irregularities are formed in the electrode base material. Thereafter, a photocatalyst layer is formed on the irregularities by sputtering, vapor deposition, combination of plating and sintering, or coating. Accordingly, photocatalyst electrodes of the hydrogen generation electrode 130 having the protrusions 131a and the recesses 131b and the oxygen generation electrode 132 having the protrusions 133a and the recesses 133b are obtained. In addition, irregularities may be formed in an electrode base material by performing attachment, such as depositing a titanium or Ni thin plate, of which a section becomes the thickness of a protrusion, or welding a rod material having the thickness of a protrusion, on a surface of the electrode base material, thereby forming protrusions.

In the hydrogen generation electrode 130, as illustrated in FIG. 24, the protrusions 131a and the recesses 131b are repeatedly provided with respect to the flow direction $F_A$ of the electrolytic aqueous solution AQ, and have a rectangular irregular structure. A surface 131c of each protrusion 131a is a face parallel to the flow direction $F_A$ of the electrolytic aqueous solution AQ. A surface 131d of each recess 131b is a face parallel to the flow direction $F_A$ of the electrolytic aqueous solution AQ. An outer surface including the surface 131c of the protrusion 131a and the surface 131d of the recess 131b are equivalent to a first photocatalyst layer 131f. The surface 131d of the recess 131b is surfaces on which the projecting part 138 is provided, and is equivalent to a first surface of a first photocatalyst layer of an oxygen generation electrode and a second surface of a second photocatalyst layer of a hydrogen generation electrode.

Since the hydrogen generation electrode 130 and the oxygen generation electrode 132 has the same structure, the detailed description thereof will be omitted. In the oxygen generation electrode 132, an outer surface including a surface 133c of the protrusion 133a and a surface 133d of the recess 133b are equivalent to a second photocatalyst layer 133f. The surface 133d of the recess 133b is a surface on which the projecting part 138 is provided.

The protrusions 131a are disposed on the upstream side in the flow direction $F_A$. However, the invention is not limited to this, the protrusions 131a and the recesses 131b may be replaced with each other, and the recesses 131b may be disposed on the upstream side in the flow direction $F_A$.

The numbers of protrusions 131a and recesses 131b in the projecting part 138 may be at least one, respectively, and the number of protrusions 131a and the number of recesses 131b may be the same as each other or may be different from each other. Additionally, the length Po of each protrusion 131a in the flow direction $F_A$ of the electrolytic aqueous solution AQ and the length Pc of each recess 131b in the flow direction $F_A$ of the electrolytic aqueous solution AQ may be the same as each other or may be different from each other. The length Po of the protrusion 131a in the flow direction $F_A$ of the electrolytic aqueous solution AQ is the pitch of the projecting part 138 with respect to the flow direction $F_A$ of the electrolytic aqueous solution AQ. It is preferable that the length Po is 1.0 mm or more and less than 20 mm.

In a case where the length Po of the protrusion 131a in the flow direction $F_A$ of the electrolytic aqueous solution AQ is 1.0 mm or more and 20 mm or less, a high electrolytic current can be obtained.

Although the length Pc of the recess 131b in the flow direction $F_A$ of the electrolytic aqueous solution AQ is not particularly limited, the length Pc may be the same as the length Po, for example, may be 1.0 mm or more and 20 mm or less.

Additionally, it is preferable that the height ht of the projecting part 138 from the surface 131d of the recess 131b is 0.1 mm or more and 5.0 mm or less. One in which the height of the irregularities, that is, the height ht is 0.1 mm or more is the projecting part 138. The above-described height ht is a distance from the surface 131d of the recess 131b to the surface 131c of the protrusion 131a. In a case where the height ht is 0.1 mm or more and 5.0 nm or less, a high electrolytic current can be obtained.

A method of measuring the length Po of the protrusion 131a or 133a of the projecting part 138 in the flow direction $F_A$ of the electrolytic aqueous solution AQ, the length Pc of the recess 84 in the flow direction $F_A$ of the electrolytic aqueous solution AQ, and the above-described height ht will be described. First, a digital image is acquired from a side surface direction of the projecting part 138, the digital image is taken into the personal computer and displayed on the monitor, lines of locations corresponding to the length Po, the length Pc, and the above-described height ht on the monitor are drawn, and the lengths of the respective lines are found. Accordingly, the length Po, the length Pc, and the above-described height ht can be obtained.

In addition, in the hydrogen generation electrode 130 and the oxygen generation electrode 132, the length Po, the length Pc, and the above-described height ht may be the same as each other or may be different from each other.

It is preferable that the protrusions 131a and the protrusions 133a of the projecting part 138 are provided within a range of 50% or more of the area of the surface on which the projecting part 138 is provided. For example, in FIG. 23, it is preferable that the protrusions 131a and the protrusions 133a are equal to or more than half of a length Wc of the hydrogen generation electrode 130 and the oxygen generation electrode 132. In this case, it is preferable that the total of the lengths Po of the protrusions 131a or 133a is more than half of the length Wc. For this reason, the protrusions 131a and the protrusions 133a can be provided within a range of 50% or more of the area of the surface on which the projecting part 138 is provided by making the total number of the protrusions 131a or 133a more than the total number of the recesses 131b or 133b.

In the artificial photosynthesis module 120, the electrolytic aqueous solution AQ is made to flow, for example, in the direction parallel to the direction D. The flow direction $F_A$ of the electrolytic aqueous solution AQ is the direction parallel to the direction D. The flow direction $F_A$ of the electrolytic aqueous solution AQ is a direction crossing the protrusion 131a or 133a and the recess 131b or 133b. In FIG. 22, the electrolytic aqueous solution AQ is made to flow from the supply pipe 16 toward the recovery pipe 20.

The hydrogen generation electrode 130 and the oxygen generation electrode 132 are electrically connected to each other by, for example, a wiring line (not illustrated). In addition, in a case where the hydrogen generation electrode 130 and the oxygen generation electrode 132 are electrically connected to each other, a connection form is not particularly limited and is not limited to the wiring line (not illustrated). Additionally, the hydrogen generation electrode 130 and the oxygen generation electrode 132 may be electrically connected to each other, and a connection method is not particularly limited.

In the hydrogen generation electrode 130, as illustrated in FIG. 24, for example, the first photocatalyst layer 131f is provided on a first base material 131e that is a flat plate. The first photocatalyst layer 131f is constituted of the hydrogen-generating photocatalyst. A surface of the first photocatalyst layer 131f becomes the surface 131c of the protrusion 131a and the surface 131d of the recess 131b in the hydrogen generation electrode 130. In addition, the hydrogen-generating co-catalyst (not illustrated) may be provided on the surface of the first photocatalyst layer 131f. In this case, the surface of hydrogen-generating co-catalyst becomes the surface 131c of the protrusion 131a and the surface 131d of the recess 131b in the hydrogen generation electrode 130.

In the oxygen generation electrode 132, for example, the second photocatalyst layer 133f is provided on a second base material 133e that is a flat plate. The second photocatalyst layer 133f is constituted of the oxygen-generating photocatalyst. A surface of the second photocatalyst layer 133f becomes the surface 133c of the protrusion 133a and the surface 133d of the recess 133b in the oxygen generation electrode 132. In addition, the oxygen-generating co-catalyst (not illustrated) may be provided on the second photocatalyst layer 133f. In this case, the surface of the oxygen-generating co-catalyst becomes the surface 133c of the protrusion 133a and the surface 133d of the recess 133b in the oxygen generation electrode 132.

The first base material 131e has the same configuration as the first base material 31e illustrated in the above-described FIG. 4, and the second base material 133e has the same configuration as the second base material 33e illustrated in the above-described FIG. 5. The first photocatalyst layer 131f has the same configuration as the first photocatalyst layer 31f illustrated in the above-described FIG. 4, and the second photocatalyst layer 133f are the same configuration as the second photocatalyst layer 33f illustrated in the above-described FIG. 5.

The container 36 is partitioned into the space 36a having the hydrogen generation electrode 130 and the space 36b having the oxygen generation electrode 132 by the diaphragm 34.

The container 36 constitutes an outer shell of the artificial photosynthesis module 120, and the configuration thereof is not particularly limited in a case where the electrolytic aqueous solution AQ can be held inside the container without leaking and the light from the outside can be transmitted through the container so that the hydrogen generation electrode 130 and the oxygen generation electrode 132 can be irradiated with the light.

In the artificial photosynthesis module 120, hydrogen and oxygen can be separately recovered by being partitioned into the space 36a and the space 36b by the diaphragm 34. Accordingly, a separation step and a separation membrane for hydrogen and oxygen become unnecessary, and recovery of hydrogen and oxygen can be made easy.

In addition, it is preferable that the hydrogen generation electrode 130 is disposed above the oxygen generation electrode 132. Accordingly, hydrogen can move to above the space 36a, and recovery of hydrogen can be made easier.

In addition, in a case where the hydrogen generation electrode 130 is disposed below the oxygen generation electrode 132, generated hydrogen permeates through the upper diaphragm 34, and moves to the oxygen generation electrode 132 side. However, this can be prevented by disposing the hydrogen generation electrode 130 above the oxygen generation electrode 132.

It is preferable to dispose the hydrogen generation electrode 130 and the oxygen generation electrode 132 at positions closer to each other because a higher electrolytic current is obtained. However, in a case where the hydrogen generation electrode 130 and the oxygen generation electrode 132 are brought into close contact with the diaphragm 34, generated hydrogen bubbles and oxygen bubbles are not easily removed. For this reason, it is preferable that the hydrogen generation electrode 130 and the oxygen generation electrode 132 are in contact with the diaphragm 34 to such a degree that the bubbles can move.

In the artificial photosynthesis module 120, the ion-permeable membrane through which generated hydrogen ions permeate but bubbled hydrogen gas and oxygen gas does not permeate is used as the diaphragm 34. For example, Nafion (registered trademark) made by DIPON CO., LTD., SELEMION (registered trademark) made by AGC Engineering CO., LTD., or the like are used as the ion-permeable membrane.

Additionally, it is preferable that both the thickness $d_1$ (refer to FIG. 4) of the hydrogen generation electrode 130 and the thickness $d_2$ (refer to FIG. 5) of the oxygen generation electrode 132 are 5.0 mm or less.

The thickness $d_1$ of the hydrogen generation electrode 130 is a distance from a back surface of the first base material 131e to a surface of a top layer, and is a length to the surface of the hydrogen-generating co-catalyst (not illustrated) on the surface of the first photocatalyst layer 131f equivalent to the first base material 31e of FIG. 4. The thickness $d_1$ is a height from the back surface of the first base material 131e to the highest point of the projecting part 138.

The thickness $d_2$ of the oxygen generation electrode 132 is a distance from a back surface of the second base material 133e to a surface of a top layer, and is a length to the surface of the oxygen-generating co-catalyst (not illustrated) on the surface of the second photocatalyst layer 133f equivalent to the second photocatalyst layer 33f illustrated in FIG. 5. The thickness $d_2$ is a height from the back surface of the second base material 133e to the highest point of the projecting part 138.

In a case where the thickness $d_1$ of the hydrogen generation electrode 130 and the thickness $d_2$ of the oxygen generation electrode 132 are within the above-described ranges, the energy conversion efficiency can be made higher.

The thickness $d_1$ of the hydrogen generation electrode 130 and the thickness $d_2$ of the oxygen generation electrode 132 can be obtained as follows.

The thickness $d_1$ of the hydrogen generation electrode 130 and the thickness $d_2$ of the oxygen generation electrode 132 are obtained by acquiring digital images of the hydrogen generation electrode 130 and the oxygen generation electrode 132, taking the digital images into the personal computer, displays the distal images on the monitor, and drawing lines on portions equivalent to the thickness $d_1$ of the hydrogen generation electrode 130 and the thickness $d_2$ of the oxygen generation electrode 132 on the monitor. By finding the lengths of the lines, the thickness $d_1$ of the hydrogen generation electrode 130 and the thickness $d_2$ of the oxygen generation electrode 132 are obtained.

The configuration of the hydrogen generation electrode 130 and the oxygen generation electrode 132 is not particularly limited. The hydrogen generation electrode 130 may have the configuration illustrated in FIG. 4, similar to the above-described hydrogen generation electrode 30. The hydrogen generation electrode 130 is not limited to the configuration illustrated in FIG. 4, and may have a configuration illustrated in the above-described FIG. 6. The description of the hydrogen generation electrode 30 illustrated in FIG. 6 is as described above, and will be omitted.

Additionally, the first base material 131e is a second substrate that is a flat plate of a hydrogen generation electrode, and the second base material 133e is a first substrate of an oxygen generation electrode. The first photocatalyst layer 131f is a second photocatalyst layer of a hydrogen generation electrode, and the second photocatalyst layer 133f is a first photocatalyst layer of an oxygen generation electrode.

In addition, in a case where the hydrogen generation electrode 130 has the configuration illustrated in FIG. 4 and the oxygen generation electrode 132 has the configuration illustrates in FIG. 5, the hydrogen generation electrode 130 allows the incident ray L to be transmitted therethrough in order to make the incident ray L incident on the oxygen generation electrode 132. In order to irradiate the hydrogen generation electrode 130 I with the incident ray L, the incident ray L does not need to be transmitted through the oxygen generation electrode 132, and the second base material 133e is transparent. In the hydrogen generation electrode 130, the first base material 131e does not need to be transparent.

The oxygen generation electrode 132 may have the configuration illustrated in FIG. 5, similar to the above-described oxygen generation electrode 32. The oxygen generation electrode 132 is not limited to the configuration illustrated in FIG. 5, and may have a configuration illustrated in the above-described FIG. 7. The description of the oxygen generation electrode 32 illustrated in FIG. 7 is as described above, and will be omitted.

Additionally, as described above, it is preferable that both the thickness $d_1$ (refer to FIG. 6) of the hydrogen generation electrode 130 and the thickness $d_2$ (refer to FIG. 7) of the oxygen generation electrode 132 are 1 mm or less.

The thickness $d_1$ (refer to FIG. 6) of the hydrogen generation electrode 130 is a length from the back surface 40b (refer to FIG. 6) of the insulating substrate 40 (refer to FIG. 6) to the surface of the hydrogen-generating co-catalyst 48 (refer to FIG. 6). The thickness $d_2$ (refer to FIG. 7) of the oxygen generation electrode 132 is a length from the back surface 40b (refer to FIG. 7) of the insulating substrate 40 (refer to FIG. 7) to the surface of the oxygen-generating co-catalyst 54 (refer to FIG. 7).

In addition, in a case where the hydrogen generation electrode 130 has the configuration illustrated in the above-described FIG. 6 and the oxygen generation electrode 132 has the configuration illustrates in the above-described FIG. 7, the oxygen generation electrode 132 allows the incident ray L to be transmitted therethrough in order to make the incident ray L incident on the hydrogen generation electrode 130 in a case where the incident ray L is incident from the oxygen generation electrode 132 side. In order to irradiate the hydrogen generation electrode 130 with the incident ray L, the incident ray L does not need to be transmitted through the oxygen generation electrode 132, and the insulating substrate 40 (refer to FIG. 7) of the oxygen generation electrode 132 is transparent. In the hydrogen generation electrode 130, the insulating substrate 40 (refer to FIG. 6) does not need to be transparent. Meanwhile, in a case where the incident ray L is incident from the hydrogen generation electrode 130 side, the hydrogen generation electrode 130 allows the incident ray L to be transmitted in order to make the incident ray L incident on the oxygen generation electrode 132. In this case, the insulating substrate 40 (refer to FIG. 6) of the hydrogen generation electrode 130 is transparent, and the insulating substrate 40 (refer to FIG. 7) of the oxygen generation electrode 132 does not need to be transparent.

The insulating substrate 40 (refer to FIG. 7) of the oxygen generation electrode 132 is a first substrate of an oxygen generation electrode, and the conductive layer 42 (refer to FIG. 7) of the oxygen generation electrode 132 is a first conductive layer of an oxygen generation electrode.

In the artificial photosynthesis module 120 illustrated in FIG. 22, the incident ray L is incident from the oxygen generation electrode 132 side, and the second photocatalyst layer 45 (refer to FIG. 7) of the oxygen generation electrode 132 is provided on a side opposite to an incidence side of the incident ray L. Since the incident ray L is incident from a back surface through the insulating substrate 40 (refer to FIG. 7) by providing the second photocatalyst layer 45 (referring to FIG. 7) on the side opposite to the incidence side of the incident ray L, a damping effect obtained by the second photocatalyst layer 45 (refer to FIG. 7) can be suppressed. In the hydrogen generation electrode 130, the co-catalyst 48 (refer to FIG. 6) is provided on the incidence side of the incident ray L.

In the artificial photosynthesis module 120, by supplying the electrolytic aqueous solution AQ into the space 36*a* of the container 36 via the supply pipe 16, supplying the electrolytic aqueous solution AQ into the space 36*b* of the container 36 via the supply pipe 16, and making the incident ray L incident from the surface 36*c* side of the container 36, oxygen is generated by the co-catalyst 54 from the oxygen generation electrode 132, and hydrogen is generated by the co-catalyst 48 from the hydrogen generation electrode 130 due to the light transmitted through the oxygen generation electrode 132. Then, the electrolytic aqueous solution AQ including the oxygen is discharged from the recovery pipe 20, and the oxygen is recovered from the electrolytic aqueous solution AQ including the discharged oxygen. Then, the electrolytic aqueous solution AQ including the hydrogen is discharged from the recovery pipe 20, and the hydrogen is recovered from the electrolytic aqueous solution AQ including the discharged hydrogen. In this case, although the electrolytic aqueous solution AQ is supplied in the flow direction $F_A$, the flow of the electrolytic aqueous solution AQ is a laminar flow, and is not a turbulent flow. The flow of the electrolytic aqueous solution AQ is disturbed by the hydrogen generation electrode 130 and the oxygen generation electrode 132, and becomes a turbulent flow.

In the artificial photosynthesis module 120, the oxygen generation electrode 132 and the hydrogen generation electrode 130 are disposed in series in the traveling direction Di of the incident ray L, and the water of the electrolytic aqueous solution AQ is decomposed to generate oxygen in the oxygen generation electrode 132 on which the incident ray L is first incident. In the hydrogen generation electrode 130, the incident ray L transmitted through the oxygen generation electrode 132 is radiated, and the water of the electrolytic aqueous solution AQ is decomposed to generate hydrogen. In the artificial photosynthesis module 120, oxygen and hydrogen can be obtained in this way. Moreover, in the artificial photosynthesis module 120, by using the incident ray L by the oxygen generation electrode 132 and the hydrogen generation electrode 130, the utilization efficiency of the incident ray L can be made high and reaction efficiency is high. That is, the current density showing water decomposition can be made high.

Additionally, in the artificial photosynthesis module 120, the reaction efficiency can be made high without increasing the installation area of the oxygen generation electrode 132 and the hydrogen generation electrode 130.

An absorption end of the first photocatalyst layer 44 (refer to FIG. 6) of the hydrogen generation electrode 130 is, for example, about 600 to 1300 nm. An absorption end of the second photocatalyst layer 45 (refer to FIG. 7) of the oxygen generation electrode 132 is, for example, about 500 to 800 nm.

Here, the absorption end is a portion or its end where an absorption factor decreases abruptly in a case where the wavelength becomes longer than this in a continuous absorption spectrum, and the unit of the absorption end is nm.

In a case where the absorption end of the second photocatalyst layer 45 (refer to FIG. 7) of the oxygen generation electrode 132 is defined as $\lambda_1$ and the absorption end of the first photocatalyst layer 44 (refer to FIG. 6) of the hydrogen generation electrode 130 is defined as $\lambda_2$, it is preferable that the absorption ends are $\lambda_1 < \lambda_2$ and $\lambda_2 - \lambda_1 \geq 100$ nm. Accordingly, in a case where the incident ray L is solar light, even in a case where light having a specific wavelength is previously absorbed by the second photocatalyst layer 45 (refer to FIG. 7) of the oxygen generation electrode 132 and is used for generation of oxygen, the incident ray L can be absorbed by the first photocatalyst layer 44 (refer to FIG. 6) of the hydrogen generation electrode 130 and can be used for generation of hydrogen, and a required carrier generation amount can be obtained in the hydrogen generation electrode 130. Accordingly, the utilization efficiency of the incident ray L can be further enhanced.

In the artificial photosynthesis module 120 illustrated in FIG. 22, any one of the hydrogen generation electrode 130 and the oxygen generation electrode 132 may be configured to have the projecting part 138 illustrated in FIG. 23, and the other remaining hydrogen generation electrode 130 or the other remaining oxygen generation electrode 132 may have the configuration of the so-called solid electrode having no projecting part 138. Even in this configuration, the same effects as those of the above-described artificial photosynthesis module 120 can be obtained.

Next, another example of the electrode configuration of the artificial photosynthesis module 120 will be described.

Figure 25:
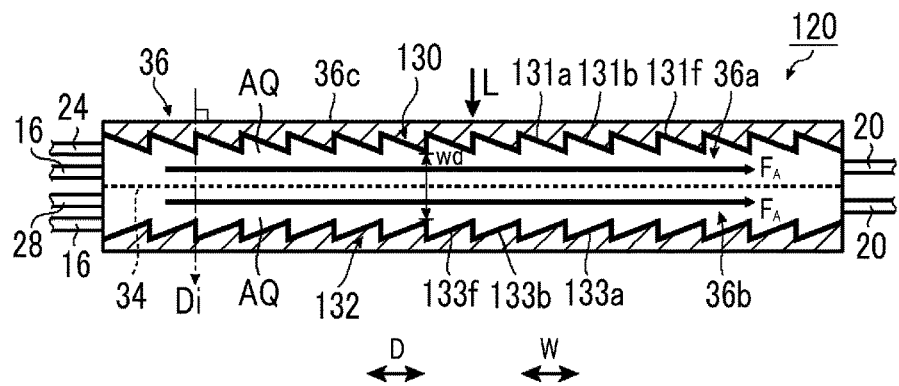
FIG. 25 is a schematic side sectional view illustrating a sixth example of the artificial photosynthesis module of the embodiment of the invention.
Figure 26:
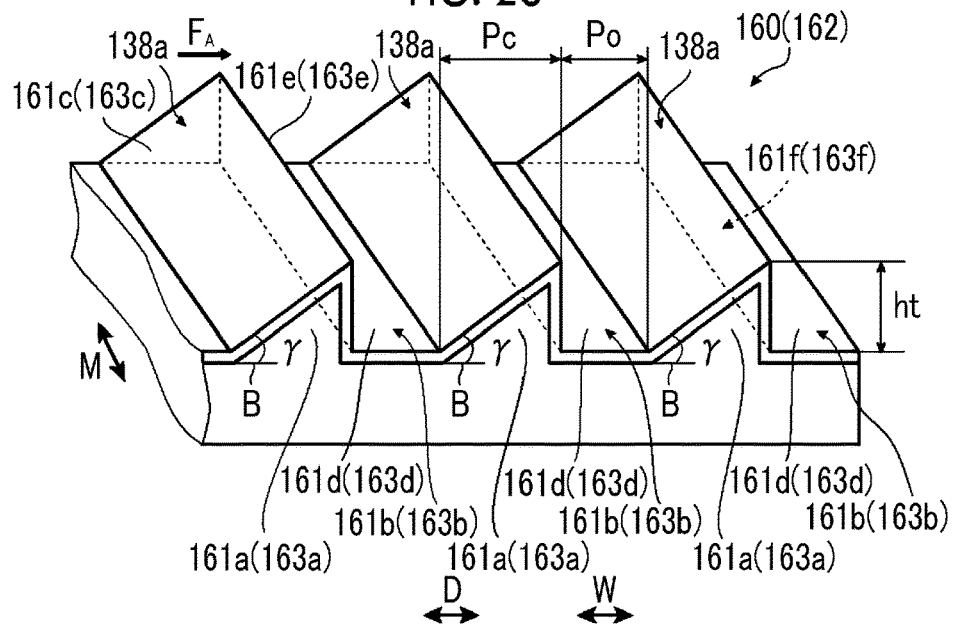
FIG. 26 is a schematic perspective view illustrating an electrode configuration of the sixth example of the artificial photosynthesis module of the embodiment of the invention.

The electrode configuration of the artificial photosynthesis module 120 is not limited to one illustrated in FIGS. 22 to 24, and may be a configuration illustrated in FIGS. 25 and 26.

Here, FIG. 25 is a schematic side sectional view illustrating a sixth example of the artificial photosynthesis module of the embodiment of the invention, and FIG. 26 is a schematic perspective view illustrating an electrode configuration of the sixth example of the artificial photosynthesis module of the embodiment of the invention. In addition, in the artificial photosynthesis module 120 illustrated in FIG. 25 and the hydrogen generation electrode 130 and the oxygen generation electrode 132 that are illustrated in FIG. 26, the same components as those of the artificial photosynthesis module 120 illustrated in FIG. 22 and the hydrogen generation electrode 130 and the oxygen generation electrode 132 that are illustrated in FIGS. 23 and 24 will be designated by the same reference signs and the detailed description thereof will be omitted.

The artificial photosynthesis module 120 illustrated in FIG. 25 is different from the artificial photosynthesis module 120 illustrated in FIG. 22 and the hydrogen generation electrode 130 and the oxygen generation electrode 132 that are illustrated in FIGS. 23 and 24, in the configuration of a hydrogen generation electrode 160 and an oxygen generation electrode 162.

Since the hydrogen generation electrode 160 and the oxygen generation electrode 162 has the same structure, the hydrogen generation electrode 160 will be representatively described and the detailed description of the oxygen generation electrode 162 will be omitted.

One having the periodic structure in which the height from the surface changes periodically with respect to the flow direction $F_A$ of the electrolytic aqueous solution AQ may have a configuration in which protrusions 161a and recesses 161b are repeatedly provided with respect to the flow direction $F_A$ of the electrolytic aqueous solution AQ as illustrated in FIGS. 25 and 26.

A projecting part 138a of the hydrogen generation electrode 160 is constituted of, for example, a triangular columnar protrusion 161a, and the protrusion 161a has a tilted face 161c tilted with respect to the flow direction $F_A$ of the electrolytic aqueous solution AQ, and a face 161f continuously connected the tilted face 161c. A surface 161d of a recess 161b is a face parallel to the flow direction $F_A$ of the electrolytic aqueous solution AQ. The face 161f is perpendicular to the surface 161d.

In FIG. 26, the tilted face 161c and the face 161f of the protrusion 161a and the surface 161d of the recess 161b are equivalent to the first photocatalyst layer 131f of the hydrogen generation electrode 160. The tilted face 161c and the face 161f of the protrusion 161a and the surface 161d of the recess 161b are equivalent to the second photocatalyst layer 133f of the oxygen generation electrode 162.

Although the face 161f is a face perpendicular to the surface 161d of the recess 161b, the invention is not limited to this, and the face 161f may not be perpendicular.

In the projecting part 138a, the tilted face 161c tilted with respect to the flow direction $F_A$ of the electrolytic aqueous solution AQ is adopted. However, the invention is not limited to this, and the face 161f perpendicular to the protrusion 161a may be disposed toward the flow direction $F_A$.

The protrusions 161a and the recesses 161b of the hydrogen generation electrode 160, and the protrusions 163a and the recesses 163b of the oxygen generation electrode 162 can be formed, for example, as follows.

First, irregular grooves having triangular sections are formed in a surface of a titanium or Ni electrode base material by machining, such as cutting, and irregularities having triangular sections are formed in the electrode base material. Thereafter, a photocatalyst layer is formed on the irregularities by sputtering, vapor deposition, combination of plating and sintering, or coating. Accordingly, photocatalyst electrodes of the hydrogen generation electrode 160 having the protrusions 161a and the recesses 161b and the oxygen generation electrode 162 having the protrusions 163a and the recesses 163b are obtained. In addition, irregularities having triangular sections may be formed in a flat-plate-shaped titanium or Ni electrode base material by performing attachment, such as welding a titanium or Ni rod material having triangular sections, on a surface of the electrode base material, thereby forming protrusions having triangular sections.

The numbers of protrusions 161a and recesses 161b in the projecting part 138a may be at least one, respectively, similar to the above-described projecting part 138, and the number of protrusions 161a and the number of recesses 161b may be the same as each other or may be different from each other. Additionally, the length Po of each protrusion 161a in the flow direction $F_A$ of the electrolytic aqueous solution AQ and the length Pc of each recess 161b in the flow direction $F_A$ of the electrolytic aqueous solution AQ may be the same as each other or may be different from each other. The length Po of the protrusion 161a in the flow direction $F_A$ of the electrolytic aqueous solution AQ and the length Pc of the recess 161b in the flow direction $F_A$ of the electrolytic aqueous solution AQ are the pitch with respect to the flow direction $F_A$ of the electrolytic aqueous solution AQ. It is preferable that at least one of the length Po or the length Pc is 1.0 mm or more and less than 20 mm.

In a case where at least one of the length Po of the protrusion 161a in the flow direction $F_A$ of the electrolytic aqueous solution AQ or the length Pc of the recess 161b in the flow direction $F_A$ of the electrolytic aqueous solution AQ is 1.0 mm or more and less than 20 mm, a high electrolytic current can be obtained.

It is preferable that the height ht of the projecting part 138a from the surface 161d of the recess 161b is 0.1 mm or more and 5.0 mm or less. One in which the height of the irregularities, that is, the height ht is 0.1 mm or more is the projecting part 138a. The above-described height ht is a distance from the surface 161d of the recess 161b to a side 161e of the tilted face 161c of the protrusion 161a. In a case where the height ht is 0.1 mm or more and 5.0 mm or less, a high electrolytic current can be obtained.

Figure 27:
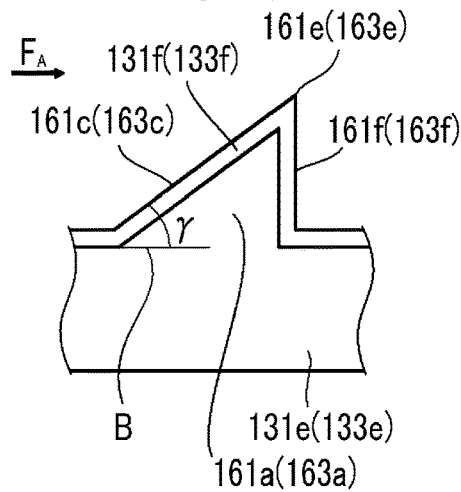
FIG. 27 is a schematic view illustrating a tilt angle.

Additionally, a tilt angle γ of the tilted face 161c is an angle formed between the horizontal line B and the tilted face 161c, as illustrated in FIG. 27. A surface of the tilted face 161c is the surface of the first photocatalyst layer 131f. Additionally, in a case where the hydrogen-generating co-catalyst is provided, the surface of the hydrogen-generating co-catalyst becomes the surface of the tilted face 161c.

In a case where the tilt angle γ is large, the flow resistance of the electrolytic aqueous solution AQ increases, and the flow rate thereof becomes low. In a case where the flow rate of the electrolytic aqueous solution AQ is increased, the energy consumption of a pump or the like of the supply unit 14 (refer to FIG. 14) for supplying the electrolytic aqueous solution AQ increases, and the energy consumption of the supply unit 14 (refer to FIG. 14) is increased. The increased energy consumption leads to a loss of energy, and the loss increases in a case where the flow rate of the electrolytic aqueous solution AQ is increased. For this reason, the total energy conversion efficiency of the artificial photosynthesis module 120 decreases.

Thus, the tilt angle γ is preferably 5° or more and 45° or less, and more preferably, an upper limit value thereof is 30° or less. A lower limit value of the tilt angle γ is, for example, 5°. In a case where the tilt angle γ is 45° or less, a high electrolytic current can be obtained.

Additionally, it is preferable that the protrusions 161a of the projecting part 138a are provided within a range of 50% or more of the area of the surface on which the projecting part 138a is provided, similar to the above-described projecting part 138.

In addition, the faster the flow rate of the electrolytic aqueous solution AQ, the better. However, the energy consumption of the pump or the like of the supply unit 14 (refer to FIG. 1) for supplying the electrolytic aqueous solution AQ increases. Even in this case, since the loss resulting from the energy consumption increases, the total energy conversion efficiency of the artificial photosynthesis module 120 decreases.

The tilt angle γ of the hydrogen generation electrode 160 is obtained by acquiring a digital image from a side surface direction of the hydrogen generation electrode 160, taking the digital image into a personal computer, displaying the digital image on a monitor, drawing the horizontal line B on the monitor, and finding an angle formed between the horizontal line B and the surface of the tilted face 161c of the hydrogen generation electrode 160.

Additionally, the tilt angle γ of the oxygen generation electrode 162 is obtained by acquiring a digital image from a side surface direction of the oxygen generation electrode 162, taking the digital image into a personal computer, displaying the digital image on a monitor, drawing the horizontal line B on the monitor, and finding an angle formed between the horizontal line B and the surface of the tilted face 163c of the oxygen generation electrode 162.

In addition, since a method of measuring the length Po of the protrusion 161a of the projecting part 138a in the flow direction $F_A$ of the electrolytic aqueous solution AQ, the length Pc of the recess 161b of the projecting part 138a in the flow direction $F_A$ of the electrolytic aqueous solution AQ, and the above-described height h will be described is the same as that of the length Po, the length Pc and the above-described height ht of the above-described projecting part 138, the detailed description thereof will be omitted.

In addition, in the hydrogen generation electrode 160 and the oxygen generation electrode 162, the length Po, the length Pc, and the above-described height ht may be the same as each other or may be different from each other.

In the artificial photosynthesis module 120 illustrated in FIG. 25, any one of the hydrogen generation electrode 160 and the oxygen generation electrode 162 may be configured to have the projecting part 138a illustrated in FIG. 26, and the other remaining hydrogen generation electrode 160 or the other remaining oxygen generation electrode 162 may have the configuration of a so-called solid electrodes having no projecting part 138a. Even in this configuration, the same effects as those of the above-described artificial photosynthesis module 120 can be obtained.

Figure 28:
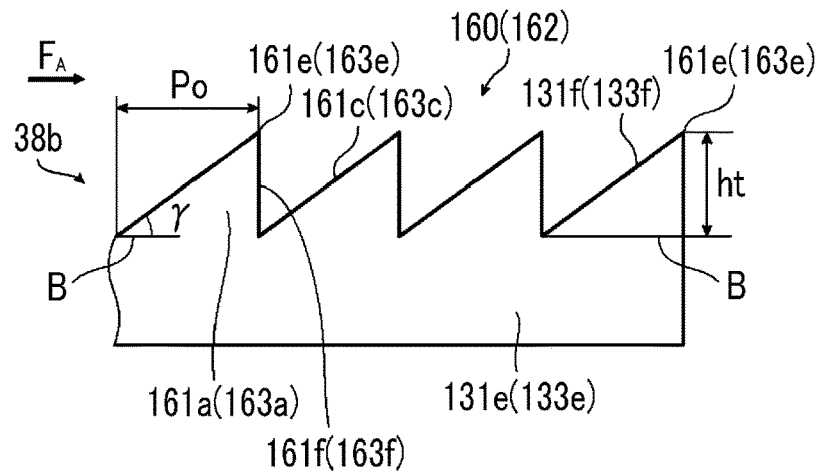
FIG. 28 is a schematic side view illustrating another example of the electrode configuration of the sixth example of the artificial photosynthesis module of the embodiment of the invention.

Additionally, as in the hydrogen generation electrode 160 and the oxygen generation electrode 162 that are illustrated in FIG. 28, a periodic structure in which the protrusions 161a each having the tilted face 161c are continuously disposed with respect to the flow direction $F_A$ of the electrolytic aqueous solution AQ and the height from the surface changes periodically with respect to the flow direction $F_A$ of the electrolytic aqueous solution AQ may be adopted. In this case, the protrusions 161a become the projecting part 138b.

In addition, each protrusion 161a of the projecting part 138b illustrated in FIG. 28 and each the protrusion 161a of the projecting part 138a illustrated in FIGS. 25 and 26 have the same configuration.

Even in this case, any one of the hydrogen generation electrode 160 and the oxygen generation electrode 162 may be configured to have the projecting part 138b illustrated in FIG. 28, and the other remaining hydrogen generation electrode 160 or the other remaining oxygen generation electrode 162 may have the configuration of a so-called solid electrodes having no projecting part 138b. Even in this configuration, the same effects as those of the above-described artificial photosynthesis module 120 can be obtained.

Additionally, although both the projecting part 138a illustrated in FIG. 26 and the projecting part 138b illustrated in FIG. 28 have a tilt angle γ of 90° or less with respect to the flow direction $F_A$ of the electrolytic aqueous solution AQ, the invention is not limited to this. The tilt angle γ may be greater than 90°. In this case, the tilted faces 161c and 163c are tilted against the flow direction $F_A$ of the electrolytic aqueous solution AQ.

The configurations of the projecting parts of the hydrogen generation electrode and then oxygen generation electrode may be configurations shown below.

Figure 29:
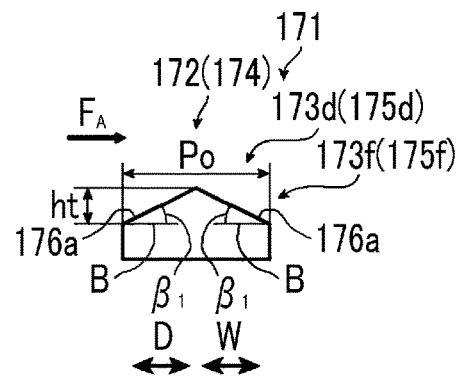
FIG. 29 is a schematic view illustrating a first example of an electrode configuration of a seventh example of the artificial photosynthesis module of the embodiment of the invention.
Figure 30:
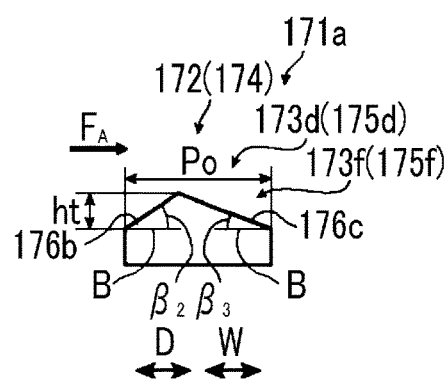
FIG. 30 is a schematic view illustrating a second example of the electrode configuration of the seventh example of the artificial photosynthesis module of the embodiment of the invention.
Figure 31:
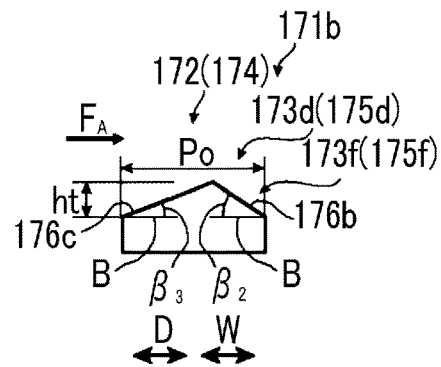
FIG. 31 is a schematic perspective view illustrating a third example of the electrode configuration of the seventh example of the artificial photosynthesis module of the embodiment of the invention.
Figure 32:
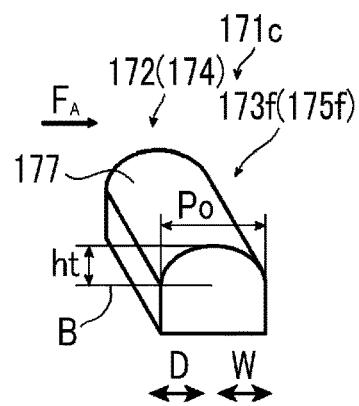
FIG. 32 is a schematic perspective view illustrating a fourth example of the electrode configuration of the seventh example of the artificial photosynthesis module of the embodiment of the invention.
Figure 33:
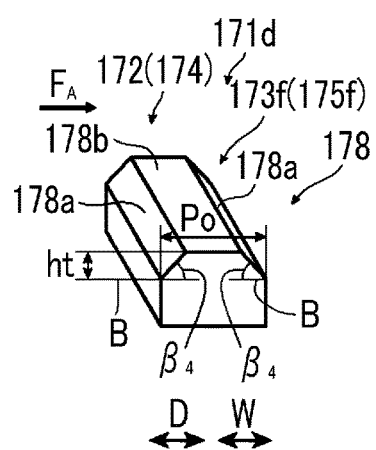
FIG. 33 is a schematic perspective view illustrating a fifth example of the electrode configuration of the seventh example of the artificial photosynthesis module of the embodiment of the invention.
Figure 34:
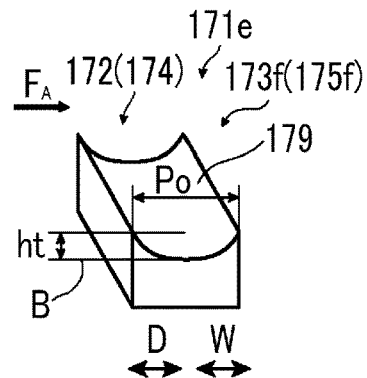
FIG. 34 is a schematic perspective view illustrating a sixth example of the electrode configuration of the seventh example of the artificial photosynthesis module of the embodiment of the invention.

FIG. 29 is a schematic view illustrating a first example of an electrode configuration of the seventh example of the artificial photosynthesis module of the embodiment of the invention, FIG. 30 is a schematic view illustrating a second example of the electrode configuration of the seventh example of the artificial photosynthesis module of the embodiment of the invention, FIG. 31 is a schematic perspective view illustrating a third example of the electrode configuration of the seventh example of the artificial photosynthesis module of the embodiment of the invention, FIG. 32 is a schematic perspective view illustrating a fourth example of the electrode configuration of the seventh example of the artificial photosynthesis module of the embodiment of the invention, FIG. 33 is a schematic perspective view illustrating a fifth example of the electrode configuration of the seventh example of the artificial photosynthesis module of the embodiment of the invention, and FIG. 34 is a schematic perspective view illustrating a sixth example of the electrode configuration of the seventh example of the artificial photosynthesis module of the embodiment of the invention.

In addition, in FIGS. 29 to 34, the same components as those of the artificial photosynthesis module 120 illustrated in FIG. 25 and the hydrogen generation electrode 160 and the oxygen generation electrode 162 that are illustrated in FIG. 26 will be designated by the same reference signs, and the detailed description thereof will be omitted.

A hydrogen generation electrode 172 includes a first photocatalyst layer 173f, and a surface 173d of the hydrogen generation electrode 172 is a surface of the first photocatalyst layer 173f. The oxygen generation electrode 174 includes a second photocatalyst layer 175f, and a surface 175d of the oxygen generation electrode 174 is a surface of the second photocatalyst layer 175f.

As illustrated in FIG. 29, a projecting part 171 has an isosceles triangular prism shape. The hydrogen generation electrode 172 has the surface 173d that is not flat, protrudes, for example, in an isosceles triangular prism shape, and is convex with respect to the flow direction $F_A$ of the electrolytic aqueous solution AQ. That is, the surface of the first photocatalyst layer 173f is convex. In the projecting part 171, tilted faces 176a are equivalent to the first photocatalyst layer 173f of the hydrogen generation electrode 172. Additionally, the tilted faces 176a are equivalent to the second photocatalyst layer 175f of the oxygen generation electrode 174.

A tilt angle $β_1$ is an angle formed between the horizontal line B and each tilted face 176a, similar to the tilt angle γ.

The tilt angle $β_1$ of the tilted face 176a of the isosceles triangular prism illustrated in FIG. 29 is equivalent to the tilt angles γ of the hydrogen generation electrode 160 and the oxygen generation electrode 162 that are illustrated in FIGS. 25 and 26. Similar to the tilt angle γ, each tilt angle $β_1$ is preferably 5° or more and 45° or less, and more preferably, an upper limit value thereof is 30° or less. A lower limit value of the tilt angle $β_1$ is, for example, 5°. In a case where the tilt angle $β_1$ is 45° or less, a high electrolytic current can be obtained.

It is preferable that the length Po of the projecting part 171 in the flow direction $F_A$ of the electrolytic aqueous solution AQ is 1.0 mm or more and 20 mm or less as described above. The height ht is a distance from the horizontal line B passing through the lowermost part of each tilted face 176a to a side where the two tilted faces 176a intersect each other and is preferably 0.1 mm or more and 5.0 mm or less.

Although the tilt angle $\beta_1$ of the tilted faces 176a are the same as each other in the projecting part 171 illustrated in FIG. 29, the invention is not limited to this. As in a projecting part 171a illustrated in FIG. 30 and a projecting part 171b illustrated in FIG. 31, a tilted face 176b of a tilt angle $\beta_2$ and a tilted face 176c of a tilt angle $\beta_3$ that is different angle may be combined. In the projecting part 171a illustrated in FIG. 30 and the projecting part 171b illustrated in FIG. 31, the tilted faces 176b and 176c are equivalent to the first photocatalyst layer 173f and are equivalent to the second photocatalyst layer 175f.

The tilt angles $\beta_2$ and $\beta_3$ are the same as the tilt angle $\gamma$, and the tilt angles $\beta_2$ and $\beta_3$ are angles formed between the horizontal line B and the tilted faces 176a and 176c.

The tilt angles $\beta_1$ and $\beta_3$ are equivalent to the tilt angles $\gamma$ of the hydrogen generation electrode 160 and the oxygen generation electrode 162 that are illustrated in FIGS. 25 and 26. Similar to the tilt angle $\gamma$, the tilt angles $\beta_2$ and $\beta_3$ are preferably 5° or more and 45° or less, and more preferably, upper limit values thereof are 30° or less. Lower limit values of the tilt angles $\beta_2$ and $\beta_3$ are, for example, 5°. In a case where the tilt angles $\beta_2$ and $\beta_3$ is 45° or less, a high electrolytic current can be obtained.

It is preferable that the lengths Po of the projecting part 171a illustrated in FIG. 30 and the projecting part 171b illustrated in FIG. 31 in the flow direction $F_A$ of the electrolytic aqueous solution AQ are 1.0 mm or more and 20 mm or less as described above.

The heights ht of the projecting part 171a illustrated in FIG. 30 and the projecting part 171b illustrated in FIG. 31 are distances from the horizontal lines B passing through the lowermost parts of the tilted faces 176b and 176c to sides where the tilted faces 176b and 176c intersect each other, and is preferably 0.1 mm or more and 5.0 mm or less.

As in the projecting part 171c illustrated in FIG. 32, the surface of the first photocatalyst layer 173f of the hydrogen generation electrode 172 and the surface of the second photocatalyst layer 175f of the oxygen generation electrode 174 may be a convexly curved face 177.

It is preferable that the length Po of the projecting part 171c in the flow direction $F_A$ of the electrolytic aqueous solution AQ is 1.0 mm or more and 20 mm or less as described above. The height ht of the projecting part 171c is a distance from the horizontal line B passing through the lowermost part of the curved face 177 to the highest point of the curved face 177 and is preferably 0.1 mm or more and 5.0 mm or less.

Additionally, as in a projecting part 171d illustrated in FIG. 33, the first photocatalyst layer 173f of the hydrogen generation electrode 172 and the second photocatalyst layer 175f of the oxygen generation electrode 174 may be constituted of a polygonal prism 178 and may have three or more faces. In this case, the polygonal prism 178 is constituted of two tilted faces 178a and a plane 178b. A tilt angle $\beta_4$ is an angle formed between the horizontal line B and each tilted face 178a, similar to the tilt angle $\gamma$.

It is preferable that the length Po of the projecting part 171d in the flow direction $F_A$ of the electrolytic aqueous solution AQ is 1.0 mm or more and 20 mm or less as described above. The height ht of the projecting part 171d is a distance from the horizontal line B passing through the lowermost part of the tilted face 178a to the plane 178b and is preferably 0.1 mm or more and 5.0 mm or less.

The tilt angle $\beta_4$ is equivalent to the tilt angles $\gamma$ of the hydrogen generation electrode 160 and the oxygen generation electrode 162 that are illustrated in FIGS. 25 and 26. Similar to the tilt angle $\gamma$, the tilt angle $\beta_4$ is preferably 5° or more and 45° or less, and more preferably, an upper limit value thereof is 30° or less. A lower limit value of the tilt angle $\beta_4$ is, for example, 5°. In a case where the tilt angle $\beta_4$ is 45° or less, a high electrolytic current can be obtained.

Moreover, as in a projecting part 171e illustrated in FIG. 34, the surfaces may be concave with respect to the flow direction $F_A$ of the electrolytic aqueous solution AQ. That is, the surface of the first photocatalyst layer 173f of the hydrogen generation electrode 172 and the surface of the second photocatalyst layer 175f of the oxygen generation electrode 174 may be a concave surface 179.

It is preferable that the length Po of the projecting part 171e in the flow direction $F_A$ of the electrolytic aqueous solution AQ is 1.0 mm or more and 20 mm or less as described above. The height ht is a distance from the horizontal line B passing through the lowermost part of the concave surface 179 to the highest point of an edge of the concave surface 179 and is preferably 0.1 mm or more and 5.0 mm or less.

A periodic structure in which each of the projecting parts 171, and 171a to 171e illustrated in the above FIGS. 29 to 34 is alternately and repeatedly disposed side by side with a recess having a planar surface in the flow direction $F_A$ of the electrolytic aqueous solution AQ, and the height from the surface changes periodically with respect to the flow direction $F_A$ of the above-described electrolytic aqueous solution AQ may be adopted, and may constitute at least one of a hydrogen generation electrode or an oxygen generation electrode.

Additionally, a periodic structure in which a plurality of the projecting parts in each of the projecting parts 171, and 171a to 171e illustrated in the above FIGS. 29 to 34 are continuously disposed in the flow direction $F_A$ of the electrolytic aqueous solution AQ, and the height from the surface changes periodically with respect to the flow direction $F_A$ of the above-described electrolytic aqueous solution AQ may be adopted, and may constitute at least one of a hydrogen generation electrode or an oxygen generation electrode.

In the respective projecting parts 171, and 171a to 171e illustrated in the above FIGS. 29 to 34, in a case where the length Po in the flow direction $F_A$ of the electrolytic aqueous solution AQ is 1.0 mm or more and 20 mm or less, a high electrolytic current can be obtained as described above. In a case where the height ht is also 0.1 mm or more and 5.0 mm or less as described above, a high electrolytic current can be obtained. Those in which the height of the irregularities, that is, the height ht is 0.1 mm or more is the projecting parts 171 and 171a to 171e.

Moreover, a hydrogen generation electrode and an oxygen generation electrode that have each of the projecting parts 171 and 171a to 171e illustrated in the above FIGS. 29 to 34 may be configured to be tilted with respect with respect to the flow direction $F_A$ of the electrolytic aqueous solution AQ. In this case, the tilt angle is preferably 5° or more and 45° or less, and more preferably, an upper limit value thereof is 30° or less, and a lower limit value thereof is, for example, 5°.

In addition, as a configuration of the projecting parts, as a micro surface shape of surfaces in contact with the electrolytic aqueous solution AQ, it is preferable that the surfaces are rough rather than being flat such that a plurality of projections are present on the surfaces. Due to the rough surfaces, the flow of the electrolytic aqueous solution AQ on the surfaces can be disturbed, a high electrolytic current can be obtained, and excellent energy conversion efficiency can be obtained. In addition, even in a case where the above-described rough surfaces have irregularities, the height of the irregularities is less than 0.1 mm. Regarding a boundary between the irregularities of the shape and the irregularities of the roughness, the height of the irregularities is 0.1 mm.

Additionally, as compared to a curved face, corner parts, such as edges, have a great effect of disturbing the flow of the electrolytic aqueous solution AQ and easily obtain a high electrolytic current. Therefore, in all the above-described projecting parts, it is preferable that there are corner parts with respect to the flow direction $F_A$ of the electrolytic aqueous solution AQ.

Figure 35:
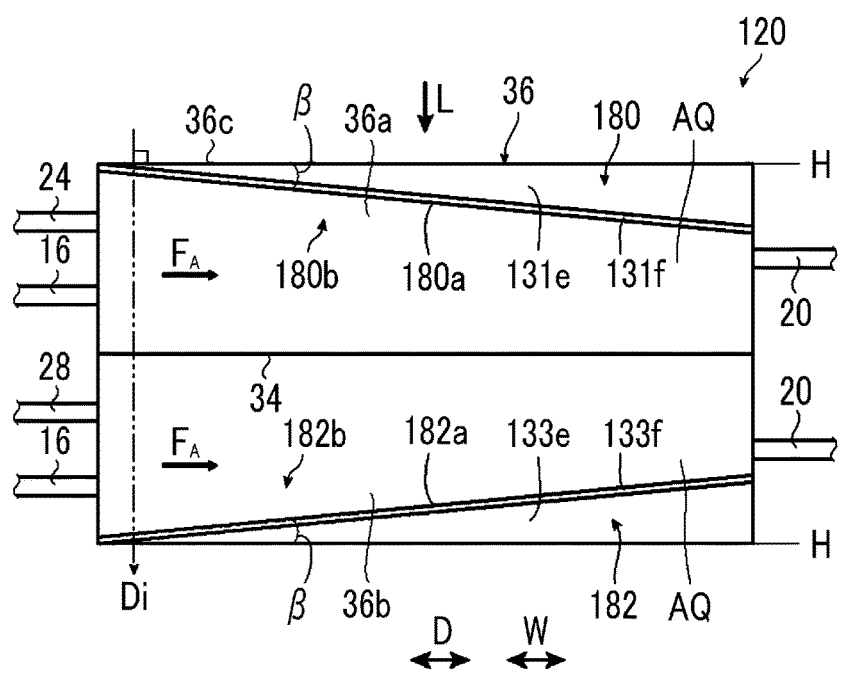
FIG. 35 is a schematic side sectional view illustrating an eighth example of the artificial photosynthesis module of the embodiment of the invention.
Figure 36:
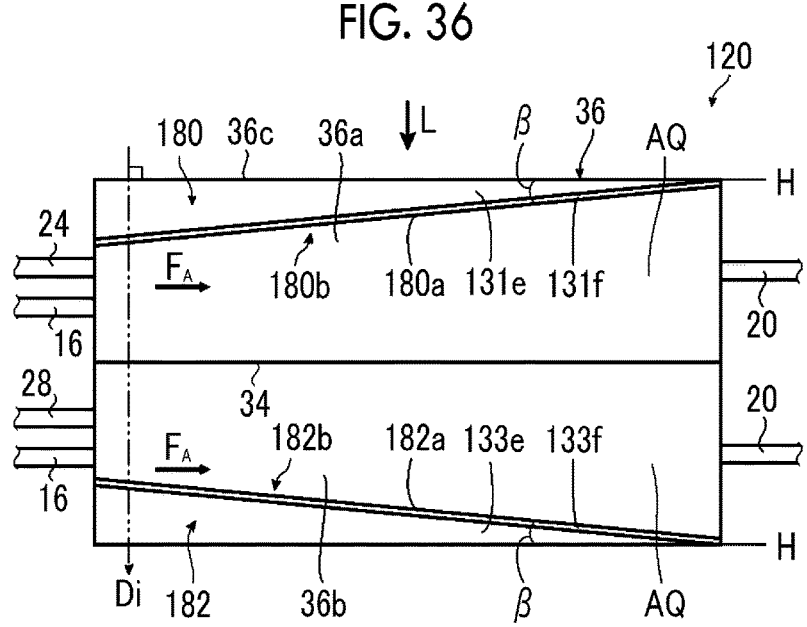
FIG. 36 is a schematic side sectional view illustrating another example of the eighth example of the artificial photosynthesis module of the embodiment of the invention.

Here, FIG. 35 is a schematic side sectional view illustrating an eighth example of the artificial photosynthesis module of the embodiment of the invention, and FIG. 36 is a schematic side sectional view illustrating another example of the eighth example of the artificial photosynthesis module of the embodiment of the invention.

In the artificial photosynthesis module illustrated in FIG. 35 and the artificial photosynthesis module illustrated FIG. 36, the same components as those of the artificial photosynthesis module 120 illustrated in FIG. 22 and the hydrogen generation electrode 130 and the oxygen generation electrode 132 that are illustrated in and FIG. 23 will be designated by the same reference signs, and the detailed description thereof will be omitted.

As compared to the artificial photosynthesis module 120 illustrated in FIG. 22, the artificial photosynthesis module 120 illustrated FIG. 35, the entire surface of a surface 180a of a hydrogen generation electrode 180 is tilted with respect to the flow direction $F_A$ of the electrolytic aqueous solution AQ, and the thickness of the first base material 131e increases in the flow direction $F_A$. The hydrogen generation electrode 180 has a tilted face 180b, and the surface 180a of the hydrogen generation electrode 180 constitutes one tilted face 180b. Additionally, the entire surface of a surface 182a of the oxygen generation electrode 182 is tilted with respect to the flow direction $F_A$ of the electrolytic aqueous solution AQ, and the thickness of the second base material 133e increases in the flow direction $F_A$. The surface 182a of the oxygen generation electrode 182 has a tilted face 182b, and the surface 182a of the oxygen generation electrode 182 constitutes one tilted face 182b.

Tilt angles β of the hydrogen generation electrode 180 and the oxygen generation electrode 182 are angles with respect to a horizontal line H. The tilt angle β of the hydrogen generation electrode 180 is an angle formed between the surface 180a and the horizontal line H. The surface 180a of the hydrogen generation electrode 180 is the surface of the first photocatalyst layer 131f. The tilt angle β of the oxygen generation electrode 182 is an angle formed between the surface 182a and the horizontal line H. The surface 182a of the oxygen generation electrode 182 is the surface of the second photocatalyst layer 133f.

Here, the entire surface of the surface 180a of the hydrogen generation electrode 180 is the entire surface 180a of the hydrogen generation electrode 180. In a case where the total area of the surface 180a of the hydrogen generation electrode 180 is 100, the area of the entire surface of the surface 180a is 100.

Additionally, the entire surface of the surface 182a of the oxygen generation electrode 182 is the entire surface 182a of the oxygen generation electrode 182. In a case where the total area of the surface 182a of the oxygen generation electrode 182 is 100, the area of the entire surface of the surface 182a is 100.

By tilting the hydrogen generation electrode 180 and the oxygen generation electrode 182 with respect to the flow direction $F_A$ of the electrolytic aqueous solution AQ, the flow of the electrolytic aqueous solution AQ that is the laminar flow is disturbed and becomes a turbulent flow. As a result, the electrolytic aqueous solution AQ stagnates on the surface 180a of the hydrogen generation electrode 180 and the surface 182a of the oxygen generation electrode 132, an electrolytic current becomes high as compared to a flat configuration in which both of the electrode portions are not tilted, and excellent energy conversion efficiency is obtained. Here, the electrolytic current is a current value in a case where light having the same light intensity is applied.

In the artificial photosynthesis module 120 illustrated in FIG. 35, the tilt angle β of the oxygen generation electrode 182 and the tilt angle β of the hydrogen generation electrode 180 may be the same as each other or may be different from each other. Additionally, any one of the hydrogen generation electrode 180 and the oxygen generation electrode 182 may have the tilt angle β of 0°, that is, may be in a tilted state. By tilting at least one electrode portion, as compared to the flat configuration in which both of the electrode portions are not tilted, the electrolytic current becomes high, and excellent energy conversion efficiency can be obtained.

The tilt angles β the hydrogen generation electrode 180 and the oxygen generation electrode 182 are equivalent to the tilt angles γ of the hydrogen generation electrode 160 and the oxygen generation electrode 162 that are illustrated in FIGS. 25 and 26. Similar to the tilt angle γ, each tilt angle β is preferably 5° or more and 45° or less, and more preferably, an upper limit value thereof is 30° or less. Lower limit values of the tilt angles $β_2$ and $β_3$ are, for example, 5°. In a case where the tilt angles $β_2$ and $β_3$ is 5° or more and 45° or less, a high electrolytic current can be obtained.

In a case where the tilt angle β is large, the flow resistance of the electrolytic aqueous solution AQ increases, and the flow rate thereof becomes low. In a case where the flow rate of the electrolytic aqueous solution AQ is increased, the energy consumption of a pump or the like of the supply unit 14 (refer to FIG. 1) for supplying the electrolytic aqueous solution AQ increases, and the energy consumption of the supply unit 14 is increased. The increased energy consumption leads to a loss of energy and the loss increases in a case where the flow rate of the electrolytic aqueous solution AQ is increased. For this reason, the total energy conversion efficiency of the artificial photosynthesis module 120 decreases.

In addition, the faster the flow rate of the electrolytic aqueous solution AQ, the better. However, the energy consumption of the pump or the like of the supply unit 14 (refer to FIG. 1) for supplying the electrolytic aqueous solution AQ increases. Even in this case, since the loss resulting from the energy consumption increases, the total energy conversion efficiency of the artificial photosynthesis module 120 decreases.

The tilt angle β of the hydrogen generation electrode 180 is obtained by acquiring a digital image from a side surface direction of the hydrogen generation electrode 180, taking the digital image into a personal computer, displaying the digital image on a monitor, drawing the horizontal line H on the monitor, and finding an angle formed between the horizontal line H and the surface 180a of the hydrogen generation electrode 180.

The tilt angle β of the oxygen generation electrode 182 is obtained by acquiring a digital image from a side surface direction of the oxygen generation electrode 182, taking the digital image into a personal computer, displaying the digital image on a monitor, drawing the horizontal line H on the monitor, and finding an angle formed between the horizontal line H and the surface 182a of the oxygen generation electrode 132.

The artificial photosynthesis module 120 illustrated in FIG. 35 is opposite to the artificial photosynthesis module 120 illustrated in FIG. 36 in terms of the tilt directions of the hydrogen generation electrode 180 and the oxygen generation electrode 182. The thickness of the first base material 131e of the hydrogen generation electrode 180 decreases in the flow direction $F_A$ of the electrolytic aqueous solution AQ. Additionally, the thickness of the second base material 133e of the oxygen generation electrode 182 decreases in the flow direction $F_A$ of the electrolytic aqueous solution AQ.

Since the tilt angles β of the hydrogen generation electrode 180 and the oxygen generation electrode 182 in the artificial photosynthesis module 120 illustrated in FIG. 36 are the same as those of the artificial photosynthesis module 120 illustrated in FIG. 35, the detailed description thereof will be omitted.

Even in the configuration of the artificial photosynthesis module 120 illustrated in FIG. 36, the same effects as those of the artificial photosynthesis module 120 illustrated in the above-described FIG. 35 can be obtained.

Even in the artificial photosynthesis module 120 illustrated in FIG. 36, the tilt angle β of the oxygen generation electrode 182 and the tilt angle β of the hydrogen generation electrode 180 may be the same as each other or may be different from each other.

In the artificial photosynthesis module 120 illustrated in FIG. 35 and the artificial photosynthesis module 120 illustrated in FIG. 36, the tilt directions are different from each other. However, any one of the hydrogen generation electrode 180 and the oxygen generation electrode 182 may be configured to be tilted in the direction illustrated in FIG. 26, and the other remaining hydrogen generation electrode 180 or the oxygen generation electrode 182 may be configured to be tilted in the direction illustrated in FIG. 36. Even in this configuration, the same effects as those of the artificial photosynthesis module 120 illustrated in the above-described FIG. 35 can be obtained.

In addition, since the oxygen generation efficiency is not the same as the hydrogen generation efficiency, the area of the hydrogen generation electrode and the area of the oxygen generation electrode are not necessarily the same. It is preferable to change the area of the hydrogen generation electrode and the area of the oxygen generation electrode, according to the amounts of hydrogen and oxygen intended to obtain.

The invention is basically configured as described above. Although the artificial photosynthesis module of the invention has been described above in detail, it is natural that the invention is not limited to the above-described embodiment, and various improvements and modifications may be made without departing from the scope of the invention.

EXAMPLE 1

Hereinafter, the effects of the artificial photosynthesis module of the invention will be described in detail.

In the present example, in order to confirm the effects of the electrode configuration of the invention, artificial photosynthesis modules of Examples Nos. 1 to 7 and Comparative Example No. 1 illustrated below were made.

In the present example, the artificial photosynthesis modules of Example Nos. 1 to 7 and Comparative Example No. 1 were controlled by a potentiostat such that the current densities of a hydrogen generation electrode and an oxygen generation electrode became 8.13 mA/cm$^2$ while the electrolytic aqueous solution AQ was supplied thereto. Changes in electrolysis voltage were measured from the start of the control, and electrolysis voltages (V) after 10 minutes were obtained. Then, the electrolysis voltages (V) after 10 minutes were set to representative values of the electrolysis voltages of the artificial photosynthesis modules. The results are shown in the following Table 1. HZ-7000 made by HOKUTO DENKO CORP was used for the potentiostat.

In addition, "the electrolysis voltages after 10 minutes" are parameters for evaluating the "energy conversion efficiency". As described above, as the electrolysis voltages for applying a certain amount of electrolytic current such that the current densities became 8.13 mA/cm$^2$ were smaller, the energy conversion efficiency was better.

Hereinafter, the artificial photosynthesis modules of Example Nos. 1 to 7 and Comparative Example No. 1 will be described.

In addition, in all of the artificial photosynthesis modules of Example Nos. 1 to 7 and Comparative Example No. 1, a hydrogen generation electrode and an oxygen generation electrode are disposed within a container in which an electrolytic aqueous solution inlet part and an electrolytic aqueous solution outlet part are provided. Regarding a method of supplying the electrolytic aqueous solution AQ, the electrolytic aqueous solution AQ was made to flow parallel to a surface of the hydrogen generation electrode and a surface of the oxygen generation electrode and a honeycomb straightening plate was provided such that the flow of the electrolytic aqueous solution AQ became laminar flows on the surface of the oxygen generation electrode and on the surface of the hydrogen generation electrode. An electrolytic solution with 0.5 M of Na$_2$SO$_4$ and pH 6.5 was used for the electrolytic aqueous solution AQ.

Additionally, the liquid thickness of the electrolytic aqueous solution AQ was 5 mm. In the hydrogen generation electrode, the liquid thickness of the electrolytic aqueous solution AQ is a length of the space 36a (refer to FIG. 2), having the hydrogen generation electrode 30, of the container 36 (refer to FIG. 2) in the direction orthogonal to the direction W. Additionally, in the oxygen generation electrode, the liquid thickness is the length of the space 36b, having the oxygen generation electrode 32, of the container 36 in the direction orthogonal to the direction W.

EXAMPLE NO. 1

In an artificial photosynthesis module of Example No. 1, a hydrogen generation electrode and an oxygen generation electrode are comb-type electrodes. Electrodes (Exeload EA: JAPAN CARLIT CO., LTD.) obtained by performing platinum plating treatment of a thickness of 1 μm on the surface of a base material made of titanium were used for the hydrogen generation electrode and the oxygen generation electrode.

In the hydrogen generation electrode and the oxygen generation electrode, respectively, in a state where the entire electrodes are in a flat-plate-shaped state, the electrode dimensions are 32 mm×120 mm×Thickness 1.0 mm, comb teeth have Width 3 mm×Length 32 mm×Number of teeth 15, and the width between the comb teeth is 5 mm. In a state where the entire electrodes are in a flat-plate-shaped state, the gap spacing of the hydrogen generation electrode and the oxygen generation electrode in a state where the comb teeth of the hydrogen generation electrode and the oxygen generation electrode are made to enter each other is 1.0 mm in an arrangement direction of the comb teeth.

The hydrogen generation electrode was disposed above a diaphragm between the hydrogen generation electrode and the oxygen generation electrode, and the oxygen generation electrode was disposed below the diaphragm.

In Example No. 1, comb teeth portions of the hydrogen generation electrode and the oxygen generation electrode were tilted, and the tilt angle θ of the comb teeth (refer to FIG. 2) was 10°.

In Example No. 1, the electrolytic aqueous solution AQ was made to flow at a flow rate of 0.5 liter/min in the direction D illustrated in FIG. 2.

EXAMPLE NO. 2

An artificial photosynthesis module of Example No. 2 has the same configuration as Example No. 1 except that the flow rate of the electrolytic aqueous solution AQ is 1.0 liter/min, as compared to Example No. 1. For this reason, the detailed description thereof will be omitted.

EXAMPLE NO. 3

An artificial photosynthesis module of Example No. 3 has the same configuration as Example No. 1 except that the flow rate of the electrolytic aqueous solution AQ is 2.0 liter/min, as compared to Example No. 1. For this reason, the detailed description thereof will be omitted.

EXAMPLE NO. 4

An artificial photosynthesis module of Example No. 4 has the same configuration as Example No. 1 except that the tilt angles of comb teeth of a hydrogen generation electrode and an oxygen generation electrode are 30°, as compared to Example No. 1. For this reason, the detailed description thereof will be omitted.

EXAMPLE NO. 5

An artificial photosynthesis module of Example No. 5 has the same configuration as Example No. 1 except that the flow rate of the electrolytic aqueous solution AQ is 1.0 liter/min and the tilt angles of comb teeth of a hydrogen generation electrode and an oxygen generation electrode are 30°, as compared to Example No. 1. For this reason, the detailed description thereof will be omitted.

EXAMPLE NO. 6

An artificial photosynthesis module of Example No. 6 has the same configuration as Example No. 1 except that the flow rate of the electrolytic aqueous solution AQ is 2.0 liter/min and the tilt angles of comb teeth of a hydrogen generation electrode and an oxygen generation electrode are 30°, as compared to Example No. 1. For this reason, the detailed description thereof will be omitted.

EXAMPLE NO. 7

An artificial photosynthesis module of Example No. 7 has the same configuration as Example No. 1 except that the flow rate of the electrolytic aqueous solution AQ is 4.0 liter/min and the tilt angles of comb teeth of a hydrogen generation electrode and an oxygen generation electrode are 30°, as compared to Example No. 1. For this reason, the detailed description thereof will be omitted.

COMPARATIVE EXAMPLE NO. 1

Figure 37:
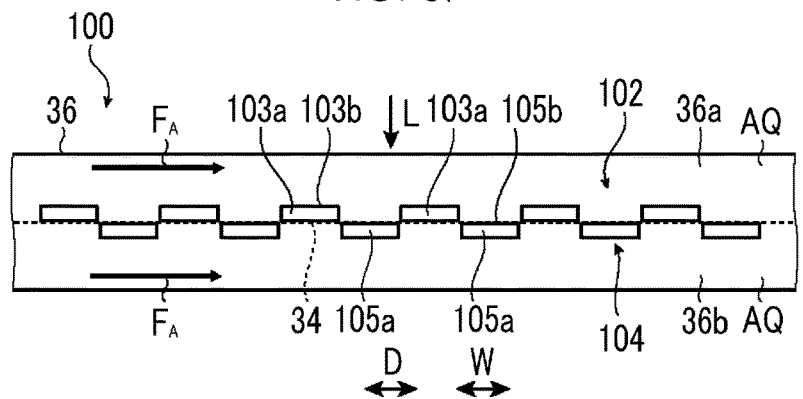
FIG. 37 is a schematic sectional view illustrating an electrode configuration of an artificial photosynthesis module of Comparative Example No. 1.

An artificial photosynthesis module of Comparative Example No. 1 has the configuration illustrated in FIG. 37, and has the same configuration as Example No. 1 except that this artificial photosynthesis module has a flat configuration in which a hydrogen generation electrode and an oxygen generation electrode are not tilted with respect to the diaphragm 34 and the flow direction of the electrolytic aqueous solution AQ, and both of the electrode portions are not tilted. For this reason, the detailed description thereof will be omitted.

In the following Table 1, the tilt angles of Comparative Example No. 1 in which the hydrogen generation electrode and the oxygen generation electrode were not tilted were written as "0°".

In addition, in the configuration of an artificial photosynthesis module 100 illustrated in FIG. 37, the same components as the configuration illustrated in FIG. 2 will be designated by the same reference signs, and the detailed description thereof will be omitted.

In the artificial photosynthesis module 100 illustrated in FIG. 37 of Comparative Example No. 1, a hydrogen generation electrode 102, the diaphragm 34, and an oxygen generation electrode 104 are disposed in this order from the incident ray L side. The hydrogen generation electrode 102 is a comb-type electrode, and a first photocatalyst layer 103b is formed on a first base material 103a. The first base material 103a is made of titanium, and the first photocatalyst layer 103b is a platinum-plated layer having a thickness of 1 µm. The hydrogen generation electrode 102 is disposed such that the first photocatalyst layer 103b is directed to the incident ray L. The oxygen generation electrode 104 is a comb-type electrode, and a second photocatalyst layer 105b is formed on a second base material 105a. The second base material 105a is made of titanium, and the second photocatalyst layer 105b is a platinum-plated layer having a thickness of 1 µm. The oxygen generation electrode 104 is disposed such that the second photocatalyst layer 105b is directed to the incident ray L.

The hydrogen generation electrode 102 and the oxygen generation electrode 104 have the same size, the electrode dimensions are 32 mm×120 mm×Thickness 1.0 mm, comb teeth have Width 3 mm×Length 32 mm×Number of teeth 15, and the width between the comb teeth is 5 mm. The gap spacing of the hydrogen generation electrode 102 and the oxygen generation electrode 104 in a state where the comb teeth of the hydrogen generation electrode 102 and the oxygen generation electrode 104 are made to enter each other is 1.0 mm in an arrangement direction of the comb teeth.

TABLE 1

| | Tilt Angle (°) | Flow Rate (liter/min) | Electrolysis Voltage After 10 Minutes (V) |
|---|---|---|---|
| Example No. 1 | 10 | 0.5 | 2.36 |
| Example No. 2 | 10 | 1.0 | 2.35 |

TABLE 1-continued

| | Tilt Angle (°) | Flow Rate (liter/min) | Electrolysis Voltage After 10 Minutes (V) |
|---|---|---|---|
| Example No. 3 | 10 | 2.0 | 2.34 |
| Example No. 4 | 30 | 0.5 | 2.41 |
| Example No. 5 | 30 | 1.0 | 2.38 |
| Example No. 6 | 30 | 2.0 | 2.35 |
| Example No. 7 | 30 | 4.0 | 2.33 |
| Comparative Example No. 1 | 0 | 0.5 | 2.42 |

As illustrated in Table 1, Example Nos. 1 to 7 had smaller electrolysis voltages and excellent energy conversion efficiency as compared to Comparative Example No. 1.

Although Example No. 1 having a tilt angle of 10° and Example No. 4 having a tilt angle of 30° had the same flow rate, Example No. 1 had a smaller electrolysis voltage. Additionally, although Example No. 2 having a tilt angle of 10° and Example No. 5 having a tilt angle of 30° had the same flow rate, Example No. 2 had a smaller electrolysis voltage. Although Example No. 3 having a tilt angle of 10° and Example No. 6 having a tilt angle of 30° had the same flow rate, Example No. 3 had a smaller electrolysis voltage. In this way, the energy conversion efficiency of the tilt angle was more excellent at the tilt angle of 10° that at the tilt angle of 30°.

EXAMPLE 2

In the second example, in order to confirm the effects of the electrode configuration of the invention, artificial photosynthesis modules of Examples Nos. 10 and 11 and Comparative Example No. 10 illustrated below were made.

Figure 38:
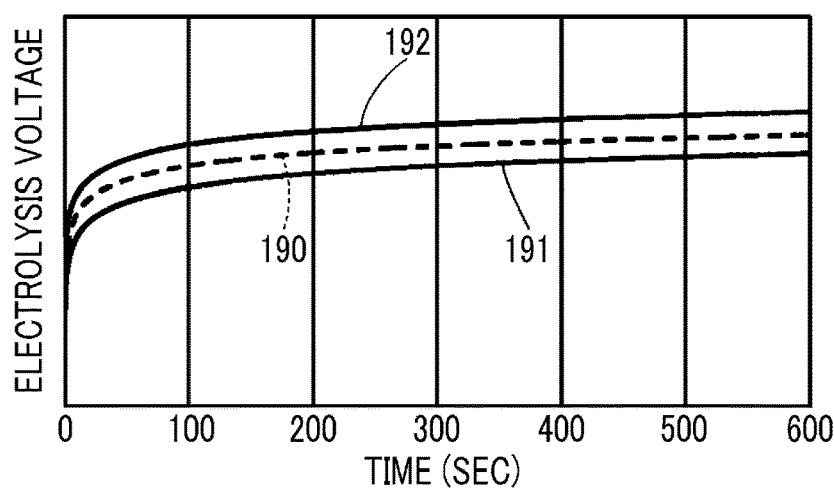
FIG. 38 is a graph illustrating changes in electrolysis voltage of Example No. 10, Example No. 11, and Comparative Example No. 10.

In the present example, the artificial photosynthesis modules of Example Nos. 10 and 11 and Comparative Example No. 10 were controlled by the potentiostat such that the current densities of a hydrogen generation electrode and an oxygen generation electrode became 8.13 mA/cm$^2$ while the electrolytic aqueous solution AQ was supplied thereto. Changes in electrolysis voltage were measured from the start of the control, and electrolysis voltages (V) after 10 minutes were obtained. The results are illustrated in FIG. 38. HZ-7000 made by HOKUTO DENKO CORP was used for the potentiostat.

In addition, "the electrolysis voltages after 10 minutes" are parameters for evaluating the "energy conversion efficiency". As described above, as the electrolysis voltages for applying a certain amount of electrolytic current such that the current densities became 8.13 mA/cm$^2$ were smaller, the energy conversion efficiency was better.

Hereinafter, the artificial photosynthesis modules of Example Nos. 10 to 11 and Comparative Example No. 10 will be described. In addition, in all of the artificial photosynthesis modules of Example Nos. 10 and 11 and Comparative Example No. 10, a hydrogen generation electrode and an oxygen generation electrode are disposed within a container in which an electrolytic aqueous solution inlet part and an electrolytic aqueous solution outlet part are provided. A diaphragm was disposed between the hydrogen generation electrode and the oxygen generation electrode. A distance Wd, that is, a spacing, between a surface of the hydrogen generation electrode and a surface of an oxygen generation electrode was 4 mm. The container was disposed to be tilted at 45°.

Regarding a method of supplying the electrolytic aqueous solution AQ, the electrolytic aqueous solution AQ was made to flow parallel to a surface of the hydrogen generation electrode and a surface of the oxygen generation electrode and a honeycomb straightening plate was provided such that the flow of the electrolytic aqueous solution AQ became laminar flows on the surface of the oxygen generation electrode and on the surface of the hydrogen generation electrode. An electrolytic solution with 0.5 M of $Na_2SO_4$ and pH 6.5 was used for the electrolytic aqueous solution AQ.

EXAMPLE NO. 10

In an artificial photosynthesis module of Example No. 10, a hydrogen generation electrode and an oxygen generation electrode are flat plates, and are referred to as solid electrodes. Electrodes (Exeload EA: JAPAN CARLIT CO., LTD.) obtained by performing platinum plating treatment of a thickness of 1 µm on the surface of a flat base material made of titanium and having electrode dimensions of 150 mm×150 mm were used for the hydrogen generation electrode and the oxygen generation electrode.

In the hydrogen generation electrode and the oxygen generation electrode, respectively, an irregular structure having quadrangular protrusions was adopted, the pitch of irregularities was 4 mm, and the height ht (refer to FIG. 24) of the protrusions was 2 mm. In Example No. 10, the length Po (refer to FIG. 23) of the protrusions and the length Pc (refer to FIG. 23) of recesses were 2 mm, respectively.

In Example No. 10, the electrolytic aqueous solution AQ was made to flow at a flow rate of 1.0 liter/min in the direction D illustrated in FIG. 22.

EXAMPLE NO. 11

An artificial photosynthesis module of Example No. 11 was the same as Example No. 10 except that the pitch of irregularities of the hydrogen generation electrode and the oxygen generation electrode was 2 mm and the length Po (refer to FIG. 23) of protrusions, and the length Pc (refer to FIG. 23) of recesses was 1 mm, as compared to Example No. 10. For this reason, the detailed description thereof will be omitted.

COMPARATIVE EXAMPLE NO. 10

An artificial photosynthesis module of Comparative Example No. 10 had the same configuration as Example No. 10 except that this module gas a flat configuration in which a hydrogen generation electrode and an oxygen generation electrode was tilted with respect to the flow direction of the electrolytic aqueous solution AQ. For this reason, the detailed description thereof will be omitted. A hydrogen generation electrode and an oxygen generation electrode of Comparative Example No. 10 have a configuration referred to as a solid electrodes.

In Comparative Example No. 10, Electrodes (Exeload EA: JAPAN CARLIT CO., LTD.) obtained by performing platinum plating treatment of a thickness of 1 µm on the surface of a flat base material made of titanium and having electrode dimensions of 150 mm×150 mm were used for the hydrogen generation electrode and the oxygen generation electrode.

Reference sign 190 of FIG. 38 designates Example No. 10, reference sign 191 designates Example No. 11, and reference sign 192 designates Comparative Example No. 10. Electrolysis voltages of FIG. 38 are standardized with predetermined voltage values. As illustrated in Table 38, Example Nos. 10 and 11 made smaller electrolysis voltages and excellent energy conversion efficiency as compared to Comparative Example No. 10.

EXAMPLE 3

Figure 39:
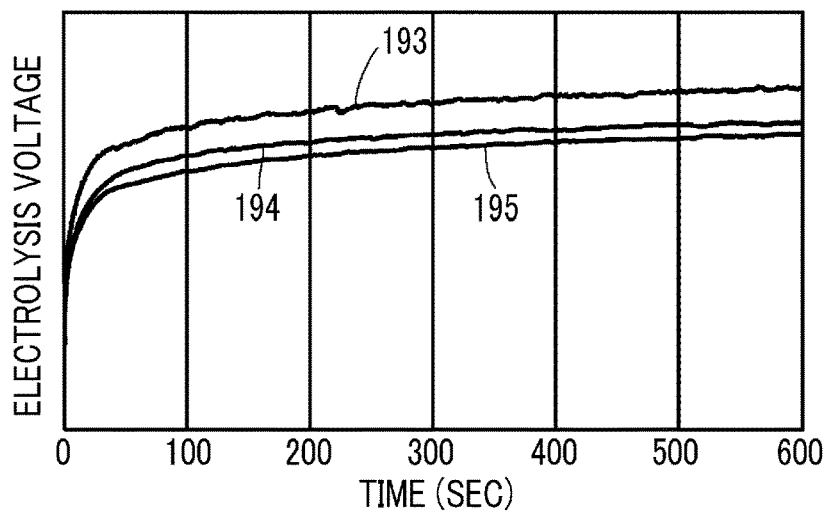
FIG. 39 is a graph illustrating changes in electrolysis voltage in a case where a flow direction of an electrolytic aqueous solution is changed.

In a third example, artificial photosynthesis modules of Example Nos. 12 to 14 having different flow directions of the electrolytic aqueous solution were controlled by the potentiostat such that the current densities of a hydrogen generation electrode and an oxygen generation electrode became 8.13 mA/cm$^2$ while the electrolytic aqueous solution AQ was supplied thereto. Changes in electrolysis voltage were measured from the start of the control, and electrolysis voltages (V) after 10 minutes were obtained. The results are illustrated in FIG. 39. HZ-7000 made by HOKUTO DENKO CORP was used for the potentiostat.

Hereinafter, the artificial photosynthesis modules of Example Nos. 12 to 14 will be described.

In addition, in all of the artificial photosynthesis modules of Example Nos. 12 to 14, a hydrogen generation electrode and an oxygen generation electrode are disposed within a container in which an electrolytic aqueous solution inlet part and an electrolytic aqueous solution outlet part are provided. A diaphragm was disposed between the hydrogen generation electrode and the oxygen generation electrode. The distance Wd, that is, the spacing, between a surface of the hydrogen generation electrode and a surface of an oxygen generation electrode was 4 mm. The container was disposed to be tilted at 45°.

EXAMPLE NO. 12

In an artificial photosynthesis module of Example No. 12, a hydrogen generation electrode and an oxygen generation electrode are flat plates, and are referred to as solid electrodes. Electrodes (Exeload EA: JAPAN CARLIT CO., LTD.) obtained by performing platinum plating treatment of a thickness of 1 μm on the surface of a flat base material made of titanium and having electrode dimensions of 150 mm×150 mm were used for the hydrogen generation electrode and the oxygen generation electrode.

In the hydrogen generation electrode and the oxygen generation electrode, respectively, an irregular structure having quadrangular protrusions was adopted, the pitch of irregularities is 10 mm, and the height ht (refer to FIG. 24) of the protrusions was 0.5 mm. In Example No. 12, the length Po (refer to FIG. 23) of the protrusions and the length Pc (refer to FIG. 23) of recesses were 10 mm, respectively.

In Example No. 12, the electrolytic aqueous solution AQ was made to flow at a flow rate of 1.39 liter/min in total from two directions of a direction parallel to an arrangement direction of irregularities and a direction of the arrangement direction of the irregularities.

EXAMPLE NO. 13

The artificial photosynthesis module of Example No. 13 was the same as Example No. 12 except that the flow direction of the electrolytic aqueous solution was the direction orthogonal to the arrangement direction of the irregularities and the electrolytic aqueous solution AQ is made to flow at a flow rate of 1.39 liter/min. For this reason, the detailed description thereof will be omitted.

EXAMPLE NO. 14

The artificial photosynthesis module of Example No. 14 was the same as Example No. 12 except that the flow direction of the electrolytic aqueous solution was the direction parallel to the arrangement direction of the irregularities and the electrolytic aqueous solution AQ is made to flow at a flow rate of 1.39 liter/min. For this reason, the detailed description thereof will be omitted.

In FIG. 39, reference sign 193 designates Example No. 12, reference sign 194 designates Example No. 13, and reference sign 195 designates Example No. 14. Electrolysis voltages of FIG. 39 are standardized with predetermined voltage values. As illustrated in FIG. 39, the electrolysis voltages changed depending on the flow directions of the electrolytic aqueous solution. In a case where the flow direction of the electrolytic aqueous solution was the direction parallel to the arrangement direction of the irregularities, the electrolysis voltages were small and the energy conversion efficiency is excellent.

EXAMPLE 4

Figure 40:
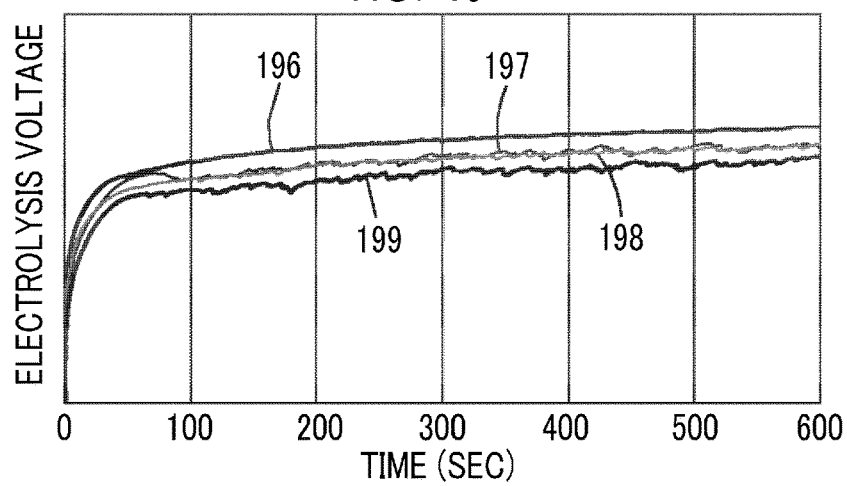
FIG. 40 is a graph illustrating changes in electrolysis voltage in a case where the pitch of a projecting part is changed.

In a fourth example, artificial photosynthesis modules of Example Nos. 15 to 18 having different pitches were controlled by the potentiostat such that the current densities of a hydrogen generation electrode and an oxygen generation electrode became 8.13 mA/cm$^2$ while the electrolytic aqueous solution AQ was supplied thereto. Changes in electrolysis voltage were measured from the start of the control, and electrolysis voltages (V) after 10 minutes were obtained. The results are illustrated in FIG. 40. HZ-7000 made by HOKUTO DENKO CORP was used for the potentiostat.

Hereinafter, the artificial photosynthesis modules of Example Nos. 15 to 18 will be described.

In addition, in all of the artificial photosynthesis modules of Example Nos. 15 to 18, a hydrogen generation electrode and an oxygen generation electrode are disposed within a container in which an electrolytic aqueous solution inlet part and an electrolytic aqueous solution outlet part are provided. A diaphragm was disposed between the hydrogen generation electrode and the oxygen generation electrode. The distance Wd, that is, the spacing, between a surface of the hydrogen generation electrode and a surface of an oxygen generation electrode was 4 mm. The container was disposed to be tilted at 45°.

EXAMPLE NO. 15

In an artificial photosynthesis module of Example No. 15, a hydrogen generation electrode and an oxygen generation electrode are flat plates, and are referred to as solid electrodes. Electrodes ((Exeload EA: JAPAN CARLIT CO., LTD.) obtained by performing platinum plating treatment of a thickness of 1 μm on the surface of a flat base material made of titanium and having electrode dimensions of 150 mm×150 mm were used for the hydrogen generation electrode and the oxygen generation electrode.

In the hydrogen generation electrode and the oxygen generation electrode, respectively, an irregular structure having quadrangular protrusions was adopted, the pitch of irregularities was 10 mm, and the height ht (refer to FIG. 24) of the protrusions was 0.5 mm. In Example No. 15, the length Po (refer to FIG. 23) of the protrusions and the length Pc (refer to FIG. 23) of recesses were 10 mm, respectively.

In Example No. 15, the electrolytic aqueous solution AQ was made to flow at a flow rate of 1.39 liter/min from the direction parallel to the arrangement direction of the irregularities.

EXAMPLE NO. 16

The artificial photosynthesis module of Example No. 16 was the same as Example No. 15 except that the pitch of the irregularities was 5 mm and the height ht (refer to FIG. 24) of protrusions was 0.5 mm. For this reason, the detailed description thereof will be omitted. In Example No. 16, the length Po (refer to FIG. 23) of the protrusions and the length Pc (refer to FIG. 23) of recesses were 5 mm, respectively.

EXAMPLE NO. 17

The artificial photosynthesis module of Example No. 17 was the same as Example No. 15 except that the pitch of the irregularities was 3 mm and the height ht (refer to FIG. 24) of protrusions was 0.5 mm. For this reason, the detailed description thereof will be omitted. In Example No. 17, the length Po (refer to FIG. 23) of the protrusions and the length Pc (refer to FIG. 23) of recesses were 3 mm, respectively.

EXAMPLE NO. 18

The artificial photosynthesis module of Example No. 18 was the same as Example No. 15 except that the pitch of the irregularities was 2 mm and the height ht (refer to FIG. 24) of protrusions was 0.5 mm. For this reason, the detailed description thereof will be omitted. In Example No. 18, the length Po (refer to FIG. 23) of the protrusions and the length Pc (refer to FIG. 23) of recesses were 5 mm, respectively.

In FIG. 40, reference sign 196 designates Example No. 15, reference sign 197 designates Example No. 16, reference sign 198 designates Example No. 17, and reference sign 199 designates Example No. 18. Electrolysis voltages of FIG. 40 are standardized with predetermined voltage values. As illustrated in FIG. 40, as the pitch is smaller, the electrolysis voltages were smaller and the energy conversion efficiency was better.

EXAMPLE 5

Figure 41:
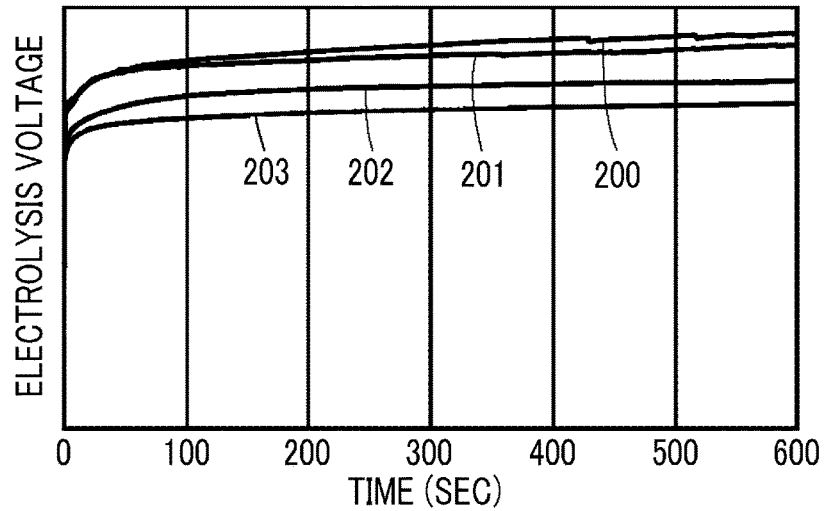
FIG. 41 is a graph illustrating changes in electrolysis voltage in a case where the shape and pitch of the projecting part are changed.

In a fifth example, artificial photosynthesis modules of Example Nos. 20 to 23 having different projecting part shapes were controlled by the potentiostat such that the current densities of a hydrogen generation electrode and an oxygen generation electrode became 8.13 mA/cm$^2$ while the electrolytic aqueous solution AQ was supplied thereto. Changes in electrolysis voltage were measured from the start of the control, and electrolysis voltages (V) after 10 minutes were obtained. The results are illustrated in FIG. 41. HZ-7000 made by HOKUTO DENKO CORP was used for the potentiostat.

Hereinafter, the artificial photosynthesis modules of Example Nos. 20 to 23 will be described.

In addition, in all of the artificial photosynthesis modules of Example Nos. 20 to 23, a hydrogen generation electrode and an oxygen generation electrode are disposed within a container in which an electrolytic aqueous solution inlet part and an electrolytic aqueous solution outlet part are provided. A diaphragm was disposed between the hydrogen generation electrode and the oxygen generation electrode. The distance Wd, that is, the spacing, between a surface of the hydrogen generation electrode and a surface of an oxygen generation electrode was 4 mm. The container was disposed to be tilted at 45°.

EXAMPLE NO. 20

In an artificial photosynthesis module of Example No. 20, a hydrogen generation electrode and an oxygen generation electrode are flat plates, and are referred to as solid electrodes. Electrodes (Exeload EA): JAPAN CARLIT CO., LTD.) obtained by performing platinum plating treatment of a thickness of 1 μm on the surface of a flat base material made of titanium and having electrode dimensions of 150 mm×150 mm were used for the hydrogen generation electrode and the oxygen generation electrode.

In the hydrogen generation electrode and the oxygen generation electrode, respectively, an irregular structure having a right-angled triangular shape was adopted, the pitch of protrusions having a right-angled triangular shape was 2 mm, and the height ht (refer to FIG. 26) of the right-angled triangular shape was 2 mm. In Example No. 20, the length Po (refer to FIG. 26) of protrusions and the length Pc (refer to FIG. 26) of recesses were 2 mm, respectively.

In Example No. 20, perpendicular faces of the protrusions were disposed to be provided in the flow direction, and the electrolytic aqueous solution AQ was made to flow at a flow rate of 2.2 liter/min from the direction parallel to the arrangement direction of the irregularities.

EXAMPLE NO. 21

The artificial photosynthesis module of Example No. 21 was the same as Example No. 20 except that an irregular structure having quadrangular protrusions was adopted, the pitch of the quadrangular protrusions was 2 mm, and the height ht (refer to FIG. 24) was 2 mm. For this reason, the detailed description thereof will be omitted. In Example No. 21, the length Po (refer to FIG. 24) of protrusions and the length Pc (refer to FIG. 24) of recesses were 2 mm, respectively.

EXAMPLE NO. 22

The artificial photosynthesis module of Example No. 22 was the same as Example No. 20 except that an irregular structure having a right-angled isosceles triangular shape of an angle of 45° was adopted, the pitch of protrusions having a right-angled isosceles triangular shape was 2 mm, the height ht (refer to FIG. 26) was 2 mm, and tilted faces of the protrusions were disposed to be provided toward the flow direction. For this reason, the detailed description thereof will be omitted. In Example No. 22, the length Po (refer to FIG. 26) of the protrusions and the length Pc (refer to FIG. 26) of recesses were 2 mm, respectively.

EXAMPLE NO. 23

The artificial photosynthesis module of Example No. 23 was the same as Example No. 20 except that a quadrangular irregular structure was adopted, the pitch of quadrangular protrusions was 2 mm, and the height ht (refer to FIG. 24) was 0.25 mm. For this reason, the detailed description thereof will be omitted. In Example No. 23, the length Po (refer to FIG. 24) of the protrusions and the length Pc (refer to FIG. 24) of recesses were 2 mm, respectively.

In FIG. 41, reference sign 200 designates Example No. 20, reference sign 201 designates Example No. 21, reference sign 202 designates Example No. 22, and reference sign 203 designates Example No. 23. Electrolysis voltages of FIG. 41 are standardized with predetermined voltage values. As illustrated in FIG. 41, in a case where the height ht was the same and in a case where the tilt angle was 45° rather than 90°, the electrolysis voltages were smaller and the energy conversion efficiency was better. Additionally, as the height h is lower, the electrolysis voltages were smaller and the energy conversion efficiency was better.

EXPLANATION OF REFERENCES

10: water electrolysis system, system
12, 12a, 12b, 12c, 100, 120: artificial photosynthesis module
14, 16: supply unit
18, 20: recovery unit
22: hydrogen gas recovery unit
24: hydrogen pipe
26: oxygen gas recovery unit
28: oxygen pipe
30, 62, 64, 70, 102, 130: hydrogen generation electrode
31a, 63a, 65a, 71a, 73, 73a: first electrode portion
31b: first gap
31c: base part
31d, 32d, 33d, 40a, 42a, 45a, 46a, 61d, 63d, 65d, 67d, 69d, 71d, 73d, 75d, 82a, 84a, 94a: surface
31e, 103a, 131e: first base material
31f, 44, 63f, 65f, 71f, 73f, 103b, 173f: first photocatalyst layer
32, 60, 66, 68, 104, 132: oxygen generation electrode
32a, 33a, 61a, 66a, 67, 67a, 69, 69a, 75, 75a, 105a: second electrode portion
33b: second gap
33c: base part
33e, 105a, 133e: second base material
33f, 45, 61f, 67f, 69f, 75f, 105b, 133f, 175f: second photocatalyst layer
34: diaphragm
35: wiring line
36: container
36a, 36b: space
40: insulating substrate
40b, 61e, 63e: back surface
42: conductive layer
46: functional layer
48, 54: co-catalyst
50: p-type semiconductor layer
52: n-type semiconductor layer
65g: base
66: oxygen generation electrode
67f: second photocatalyst layer
67g: base
69g: base
71g: base
72: hydrogen generation electrode
73f, 131f: first photocatalyst layer
76a, 76b, 76c, 78a, 92a: tilted face
77: curved face
78: polygonal prism
78b: plane
79: concave surface
80, 90: projecting part
82, 92: protrusion
84, 94: recess
92c: side
94d: face
131a, 133a, 161a, 163a: protrusion
131b, 133b, 161b, 163b: recess
131c, 131d, 133c, 133d, 161d, 173d, 175d, 180a, 182a: surface
138, 138a, 138b: projecting part
160, 172, 180: hydrogen generation electrode
161c, 163c: tilted face
161e: side
161f: face
162, 174, 182: oxygen generation electrode
171, 171a, 171b, 171c, 171d, 171e: projecting part
161c, 163c, 176a, 176b, 176c, 178a, 180b, 182b: tilted face
177: curved face
178: polygonal prism
178b: plane
179: concave surface
AQ: electrolytic aqueous solution
B: horizontal line
D: direction
Di: traveling direction
$F_A$: direction
L: incident ray
M: direction
W: direction
d: thickness
h, ht: height
$t_1, t_2, t_3$: width
$\alpha_1, \alpha_2, \alpha_3, \alpha_4, \alpha_5$: tilt angle
$\beta, \beta_1, \beta_2, \beta_3, \beta_4$: tilt angle
$\theta, \theta_1, \theta_2$: tilt angle

What is claimed is:

1. An artificial photosynthesis module comprising:
a hydrogen generation electrode that includes a first base material and a first photocatalyst layer and has a plurality of first electrode portions electrically connected to each other;
an oxygen generation electrode that includes a second base material and a second photocatalyst layer and has a plurality of second electrode portions electrically connected to each other; and
a diaphragm provided between the hydrogen generation electrode and the oxygen generation electrode, the hydrogen generation electrode and the oxygen generation electrode being electrically connected to each other,
wherein the oxygen generation electrode is present opposite to the hydrogen generation electrode across the diaphragm,
wherein the plurality of first electrode portions of the hydrogen generation electrode are disposed side by side with a gap between each of the side by side portions, and each of the plurality of second electrode portions of the oxygen generation electrode is disposed respectively in one of the gaps between each of the side by side portions as seen from the hydrogen generation electrode side with respect to the diaphragm, and
wherein the first photocatalyst layer is formed as part of at least one of the first electrode portions or the second electrode portion, and is tilted with respect to a flow direction of an electrolytic aqueous solution, or a projecting part is provided on a surface of the first photocatalyst layer of at least one of the first electrode portions of the hydrogen generation electrode or a surface of the second photocatalyst layer of at least one of the second electrode portions of the oxygen generation electrode.

2. The artificial photosynthesis module according to claim 1,
wherein a tilt angle of the photocatalyst layer of at least one electrode portion of the hydrogen generation electrode or the oxygen generation electrode is 5° or more and 45° or less with respect to the flow direction of the electrolytic aqueous solution.

3. The artificial photosynthesis module according to claim 1,
wherein the photocatalyst layer of 50% or more electrode portions among all the electrode portions of the hydrogen generation electrode or the oxygen generation electrode is tilted with respect to the flow direction of the electrolytic aqueous solution.

4. The artificial photosynthesis module according to claim 1,
wherein, where a length of a side, in the flow direction of the electrolytic aqueous solution, of the first electrode portions and the second electrode portions is a width of the electrode portions, the width of the electrode portions is 10 μm to 10 mm.

5. The artificial photosynthesis module according to claim 1,
wherein a height of the projecting part from the surface on which the projecting part is provided is 0.1 mm or more and less than 1.0 mm.

6. The artificial photosynthesis module according to claim 1,
wherein the projecting part has a periodic structure in which a height from the surface changes periodically with respect to the flow direction of the electrolytic aqueous solution, and a pitch of the periodic structure with respect to the flow direction of the electrolytic aqueous solution is 1.0 mm or more and less than 10 mm.

7. The artificial photosynthesis module according to claim 1,
wherein the projecting part has a face parallel to the flow direction of the electrolytic aqueous solution.

8. The artificial photosynthesis module according to claim 1,
wherein the projecting part has a tilted face tilted with respect to the flow direction of the electrolytic aqueous solution, and a tilt angle of the tilted face with respect to the flow direction of the electrolytic aqueous solution is 5° or more and 45° or less.

9. An artificial photosynthesis module comprising:
a hydrogen generation electrode that includes a first base material and a first photocatalyst layer and has a plurality of first electrode portions electrically connected to each other;
an oxygen generation electrode that includes a second base material and a second photocatalyst layer and has a plurality of second electrode portions electrically connected to each other; and
a diaphragm provided between the hydrogen generation electrode and the oxygen generation electrode, the hydrogen generation electrode and the oxygen generation electrode being electrically connected to each other,
wherein the oxygen generation electrode is present opposite to the hydrogen generation electrode across the diaphragm,
wherein the plurality of first electrode portions of the hydrogen generation electrode are disposed side by side with a gap between each of the side by side portions, and each of the plurality of second electrode portions of the oxygen generation electrode is disposed respectively in one of the gaps between each of the side by side portions as seen from the hydrogen generation electrode side with respect to the diaphragm, and
wherein the first photocatalyst layer is formed as part of at least one of the first electrode portions or the second electrode portion, and is tilted with respect to a flow direction of an electrolytic aqueous solution, or a projecting part is provided on a surface of the first photocatalyst layer of at least one of the first electrode portions of the hydrogen generation electrode or a surface of the second photocatalyst layer of at least one of the second electrode portions of the oxygen generation electrode.

10. The artificial photosynthesis module according to claim 9,
wherein a tilt angle of the photocatalyst layer of at least one electrode portion of the hydrogen generation electrode or the oxygen generation electrode is 5° or more and 45° or less with respect to the diaphragm.

11. The artificial photosynthesis module according to claim 9,
wherein the photocatalyst layer of 50% or more electrode portions among all the electrode portions of the hydrogen generation electrode or the oxygen generation electrode is tilted with respect to the diaphragm.

12. The artificial photosynthesis module according to claim 9,
wherein, where a length of a side, in the flow direction of the electrolytic aqueous solution, of the first electrode portions and the second electrode portions is a width of the electrode portions, a width of the electrode portions is 10 μm to 10 mm.

13. The artificial photosynthesis module according to claim 9,
wherein a height of the projecting part from the surface on which the projecting part is provided is 0.1 mm or more and 5.0 mm or less.

14. The artificial photosynthesis module according to claim 9,
wherein the projecting part has a periodic structure in which a height from the surface changes periodically with respect to the flow direction of the electrolytic aqueous solution, and a pitch of the periodic structure with respect to the flow direction of the electrolytic aqueous solution is 1.0 mm or more and less than 10 mm.

15. The artificial photosynthesis module according to claim 9,
wherein the projecting part has a face parallel to the flow direction of the electrolytic aqueous solution.

16. The artificial photosynthesis module according to claim 9,
wherein the projecting part has a tilted face tilted with respect to the flow direction of the electrolytic aqueous solution, and a tilt angle of the tilted face with respect to the flow direction of the electrolytic aqueous solution is 5° or more and 45° or less.

17. An artificial photosynthesis module comprising:
an oxygen generation electrode that decomposes an electrolytic aqueous solution with light to generate oxygen and a hydrogen generation electrode that decomposes the electrolytic aqueous solution with the light to generate hydrogen,
wherein the oxygen generation electrode has a first substrate that is a flat plate, a first conductive layer provided on the first substrate, and a first photocatalyst layer provided on the first conductive layer,
wherein the hydrogen generation electrode has a second substrate that is a flat plate, a second conductive layer provided on the second substrate, and a second photocatalyst layer provided on the second conductive layer, wherein at least one projecting part that protrudes with respect to a conductive layer surface of a conductive layer is provided on the at least one surface, and wherein the projecting part has a periodic structure in which a height from the surface changes periodically with respect to the flow direction of the electrolytic aqueous solution, and a pitch of the periodic structure with respect to the flow direction of the electrolytic aqueous solution is 1.0 mm or more and 20 mm or less.

18. The artificial photosynthesis module according to claim 17, wherein a plurality of the projecting parts are provided with respect to the flow direction of the electrolytic aqueous solution.

19. The artificial photosynthesis module according to claim 17, wherein a height of the projecting part from the surface on which the projecting part is provided is 0.1 mm or more and 5.0 mm or less.

20. The artificial photosynthesis module according to claim 17, wherein the projecting part has a face parallel to the flow direction of the electrolytic aqueous solution.

21. The artificial photosynthesis module according to claim 17, wherein the projecting part has a tilted face tilted with respect to the flow direction of the electrolytic aqueous solution, and a tilt angle of the tilted face with respect to the flow direction of the electrolytic aqueous solution is 5° or more and 45° or less.

22. The artificial photosynthesis module according to claim 17, wherein the projecting part is provided within a range of 50% or more of the area of the surface on which the projecting part is provided.

23. The artificial photosynthesis module according to claim 17, wherein the oxygen generation electrode and the hydrogen generation electrode are disposed in series in a traveling direction of the light.

24. The artificial photosynthesis module according to claim 17, wherein the light is incident from the oxygen generation electrode side, and the first substrate of the oxygen generation electrode is transparent.

* * * * *